US008856891B2

(12) United States Patent
Whitcomb

(10) Patent No.: US 8,856,891 B2
(45) Date of Patent: *Oct. 7, 2014

(54) PROXY AUTHENTICATION NETWORK

(75) Inventor: Michael J. Whitcomb, Portland, OR (US)

(73) Assignee: Iamsecuronline, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/197,640

(22) Filed: Aug. 3, 2011

(65) Prior Publication Data

US 2011/0289314 A1    Nov. 24, 2011

Related U.S. Application Data

(63) Continuation of application No. 11/423,565, filed on Jun. 12, 2006, now Pat. No. 8,028,329.

(60) Provisional application No. 60/690,548, filed on Jun. 13, 2005.

(51) Int. Cl.
| G06F 7/04 | (2006.01) |
| H04L 9/08 | (2006.01) |
| H04L 29/06 | (2006.01) |
| H04L 9/32 | (2006.01) |
| G06F 21/33 | (2013.01) |

(52) U.S. Cl.
CPC ......... *H04L 63/0884* (2013.01); *H04L 2209/76* (2013.01); *H04L 9/0861* (2013.01); *H04L 63/08* (2013.01); *H04L 9/085* (2013.01); *H04L 63/0853* (2013.01); *H04L 9/321* (2013.01); *H04L 9/0894* (2013.01); *G06F 21/33* (2013.01); *H04L 63/0407* (2013.01)
USPC ............................................................ 726/5

(58) Field of Classification Search
CPC ..... H04L 9/32; H04L 63/0869; H04L 63/107; H04W 12/00; H04W 12/06; G06F 21/31
USPC ...................... 726/5, 12; 713/155
See application file for complete search history.

(56) References Cited

U.S. PATENT DOCUMENTS 6,009,177 A    12/1999 Sudia
6,044,205 A    3/2000 Reed et al.
(Continued)

FOREIGN PATENT DOCUMENTS

EP    1233593    8/2002

OTHER PUBLICATIONS

Aalto, "IPv6 Authentication Header and Encapsulated Security Payload", Seminar Presentation, Helsinki University of Technology, May 1996, 17 pages.

(Continued)

*Primary Examiner* — Ellen Tran
(74) *Attorney, Agent, or Firm* — Marger Johnson & McCollom PC

(57) ABSTRACT

A Proxy Authentication Network includes a server that stores credentials for subscribers, along with combinations of devices and locations from which individual subscribers want to be authenticated. Data is stored in storage: the storage can be selected by the subscriber. The data stored in the storage, which can be personally identifiable information, can be stored in an encrypted form. The key used to encrypt such data can be divided between the storage and server. In addition, third parties can store portions of the encrypting key. Subscribers can be authenticated using their credentials from recognized device/location combinations; out-of-band authentication supports authenticating subscribers from other locations. Once authenticated, a party can request that the encrypted data be released. The portions of the key are then assembled at the storage. The storage then decrypts the data, generates a new key, and re-encrypts the data for transmission to the requester.

38 Claims, 36 Drawing Sheets

(56) References Cited

U.S. PATENT DOCUMENTS

| | | |
|---|---|---|
| 6,934,858 B2 | 8/2005 | Woodhill |
| 7,496,751 B2 | 2/2009 | de Jong et al. |
| 2002/0116647 A1 | 8/2002 | Mont et al. |
| 2003/0028621 A1 | 2/2003 | Furlong et al. |
| 2003/0070068 A1 | 4/2003 | Medvinsky |
| 2004/0049687 A1 | 3/2004 | Orsini et al. |
| 2004/0205243 A1 | 10/2004 | Hurvig et al. |
| 2005/0198536 A1 | 9/2005 | Brickell et al. |

OTHER PUBLICATIONS

Korhonen, "IPv6 Key Management", Seminar Presentation, Helsinki University of Technology, May 1996, 13 pages.

Cameron, "The Laws of Identity", May 11, 2005, 12 pages.

"Proxy Server", http://www.webopedia.com/TERM/proxy_server.html, retrieved May 4, 2010, 5 pages.

| Field Name | Data Type | Description |
|---|---|---|
| ID | AutoNumber | |
| INTRID | Number | Internet Database Row Identifier |
| Sovereign_Identifier | Text | The globally unique system identifier for an identity |
| Master_Location_ID | Text | The Location Identifier of the Sovereign Data |
| Master_Location_Foreign_Ke | Text | The Foreign Key to the Location Table |

FIG.5

| Field Name | Data Type | Description |
|---|---|---|
| odatapk | Text | Original Data Primary Key |
| odata1 | Text | Original Data Field 1 of Primary Key |
| odata2 | Text | Original data Field 2 of Primary Key (To create a unique identifier this could be more fields) |
| odata_ALL | Text | Represents Balance of Original Data - Will be many fields storing additional identity data |
| odata_encryption_key | Text | Encryption Key used for Encrypted Data Table |
| odatapk_encryption_key | Text | Encryption Key used to encrypt Primary Key |
| odata_hash | Text | Hashed Encryption key for Encrypted Data Table - Foreign Key Data |
| odatapk_hash | Text | Hashed Encryption Key for Primary Key - Foreign Key Lookup |
| hash_time_stamp | Date/Time | Original Data time of Entry - Used to salt hash of encryption key |
| time_mod_stamp | Date/Time | Time stamp of any modification to original data - in reality a new row is copied with changes |
| modified_invalid | Yes/No | Data no longer valid. Used to archive a row. |
| odata_valid | Yes/No | Data is available and valid. A 'NO' marks the data for deletion like entity closed/deceased/JPE directed |
| master_slave | Yes/No | Master Account = Yes Slave Account = No (May not be necessary) |
| master_account_valid | Yes/No | Is Master account valid |
| slave_account_fkey | Yes/No | Foreign Key to List of Slave accounts table |
| suspended | Yes/No | Is account suspended |
| overseen | Yes/No | Is account being monitored by JPE module |
| TABLE_NOTE | Text | The rows (data) of this table will normally be stored on optical media in a safe location. It is only recalled for Disaster Recovery. |

FIG.6

| Column Name | Data Type | Length | Allow Nulls | Description |
|---|---|---|---|---|
| INTRID | uniqueidentifier | 16 | | Internet Row Identifier |
| SSPID | char | 50 | ✓ | Secure Storage Provider ID |
| SSPLOC | char | 50 | ✓ | Secure Storage Provider Location Code |
| SSP_IP6 | char | 50 | ✓ | Secure Storage Provider IPv6 Address |
| SSP_IP4 | char | 50 | ✓ | Secure Storage Provider IPv4 Address |
| SSP_PKEY | char | 50 | ✓ | Secure Storage Provider Primary Shared Secret |
| SSP_2KEY | char | 50 | ✓ | Secure Storage Provider Secondary Shared Secret |

FIG.7

| Column Name | Data Type | Length | Allow Nulls | Description |
|---|---|---|---|---|
| INTRID | uniqueidentifier | 16 | | Internet Row Identifier |
| DID1 | uniqueidentifier | 16 | | Device Primary ID in Vault Server |
| DID2 | uniqueidentifier | 16 | | Device Primary ID assigned at NAS |
| DID3 | uniqueidentifier | 16 | | Device Row Identifier at Storage Provider |
| SID1 | uniqueidentifier | 16 | ✓ | Device State in NAS Row Identifier (Many Table) |
| SSPID | char | 50 | | Secure Storage Provider ID |
| SSPLOC | char | 50 | | Secure Storage Provider Location ID |
| SSP_IP6 | char | 128 | ✓ | Secure Storage Provider IPv6 Address |
| HID1 | uniqueidentifier | 16 | | Hashed DID1 |
| HID2 | uniqueidentifier | 16 | | Hashed DID2 |
| HID3 | uniqueidentifier | 16 | | Hashed DID3 |
| GID1 | uniqueidentifier | 16 | | GUID for DID1 |
| GID2 | uniqueidentifier | 16 | | GUID for DID2 |
| GID3 | uniqueidentifier | 16 | | GUID for DID3 |
| LUDSID | uniqueidentifier | 16 | | Last Used Device Secondary ID (Prime Derivative) |
| LUDLOC | uniqueidentifier | 16 | | Last Used Device Location ID |
| LUINTRID | uniqueidentifier | 16 | | Last Used |
| LKIS | binary | 1 | ✓ | |
| TS | timestamp | 8 | ✓ | |
| CCMON | varchar | 16 | | Control Center Monitoring Agent |
| LUKID | uniqueidentifier | 16 | | Last Used Kernel ID |
| LUSMARS | uniqueidentifier | 16 | | Last Used Secondary ID for MARS |

FIG. 8

| Column Name | Data Type | Length | Allow Nulls | Description |
|---|---|---|---|---|
| INTRID | uniqueidentifier | 16 | | Internet Row Identifier |
| PID1 | uniqueidentifier | 16 | | Primary Identity ID in Vault Server |
| PID2 | uniqueidentifier | 16 | | Primary Identity Input ID |
| PID3 | uniqueidentifier | 16 | | Row Identifier at Storage Provider |
| SSPID | char | 50 | | Secure Storage Provider ID |
| SSPLOC | char | 50 | | Secure Storage Provider Location ID |
| SSP_IP6 | char | 128 | ✓ | Secure Storage Provider IPv6 Address |
| HID1 | uniqueidentifier | 16 | | Hashed PID1 |
| HID2 | uniqueidentifier | 16 | | Hashed PID2 |
| HID3 | uniqueidentifier | 16 | | Hashed PID3 |
| GID1 | uniqueidentifier | 16 | | GUID for PID1 |
| GID2 | uniqueidentifier | 16 | | GUID for PID2 |
| GID3 | uniqueidentifier | 16 | | GUID for PID3 |
| LUDID | uniqueidentifier | 16 | | Last Used Device ID |
| LUDLOC | uniqueidentifier | 16 | | Last Used Device Location ID |
| LUINTRID | uniqueidentifier | 16 | | Last User Row ID for Seed Value |
| LKIS | binary | 1 | ✓ | Last Known Identity State |
| TS | timestamp | 8 | ✓ | DID Time Stamp |
| INTERVIEWER | varchar | 16 | | Matrix ID of Interviewer in input process |
| LUKID | uniqueidentifier | 16 | | Last Used Authentication Receipt Sequence Number |
| LUMARS | uniqueidentifier | 16 | | Last Used Mutual Authentication Receipt Sequence Number |

| SPI Integer 4 Byte PVB | Location Identifier 8 Bytes LID | Module ID 4 Byte CMD | Packet Type 8 Bytes MSG | ID Payload 64-128 Bytes xID | Validation ID 32 Bytes IAM | Reserved 8 Bytes N/A |
|---|---|---|---|---|---|---|

PVB — Packet Validation Bit

FIG.24

| Location Identifier | Time Stamp | System Entity ID String | Node Access Device ID String | Third Party Authentication Reference Number |
|---|---|---|---|---|

FIG.25

| Location Identifier | Time Stamp | Requesting System Entity ID | Responding System Entity ID | Table Input Sequence Number | Log Location | Third Party Authentication Reference |
|---|---|---|---|---|---|---|

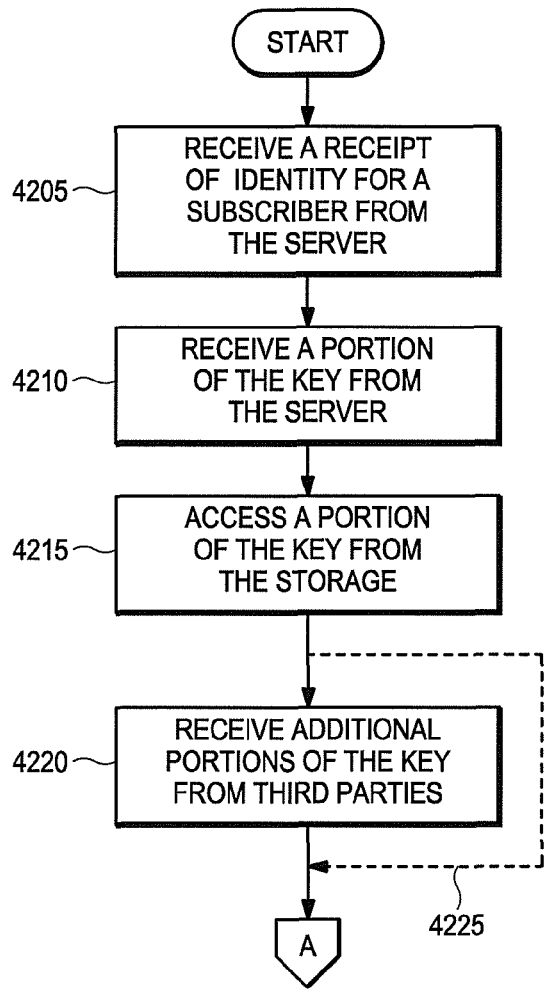
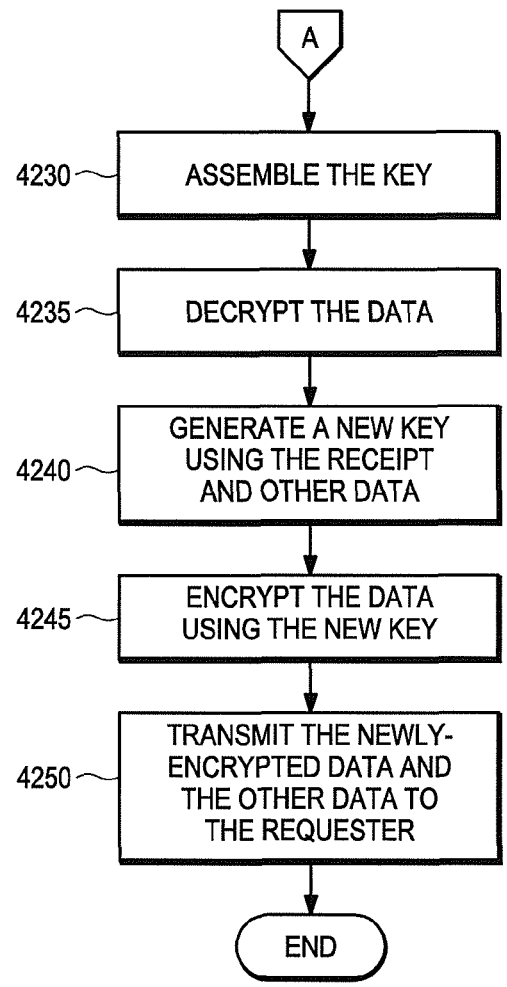
FIG.42A
FIG.42B

PROXY AUTHENTICATION NETWORK

RELATED APPLICATION DATA

This application is a continuation of U.S. patent application Ser. No. 11/423,565, filed Jun. 12, 2006, now U.S. Pat. No. 8,028,329, issued Sep. 27, 2011, which claims the benefit of U.S. Provisional Patent Application Ser. No. 60/690,548, filed Jun. 13, 2005, both of which are incorporated herein by reference.

FIELD OF THE INVENTION

This invention pertains to identity verification, and more particularly to the controlled release of identity information.

BACKGROUND OF THE INVENTION

In communications networks today, the devices that are used by persons or through which users are authenticated to a network are themselves in some way authenticated to a network. For example, in a typical Microsoft Active Directory-based network (or other network that employs a directory) a computer attached to the network receives a software-based token stored on the device, and is joined (i.e., authenticated) to the network. Then, when a user needs access to either the computer or resources on the network, he authenticates with a username or password that is compared to what is stored in the directory. In many business scenarios this method has proved to provide adequate security to the network.

But in more secure environments, this approach to authentication has not proven secure enough. Companies such as RSA Security, Verisign, Oblix, SafeNet, and others have provided expensive two-factor authentication using token or token-less based add-ons that further expand on this principle. Most of these solutions use public key cryptography to encrypt the transmission or token data, in order to secure the elements of the identity. But these systems have proven expensive to deploy, difficult and costly to maintain, lack scalability for every user on the Internet, and are too complicated for the typical end user.

Another drawback to these systems is the processing overhead. In his book, *Applied Cryptography*, Second Edition, John Wiley & Sons, New York, 1996, Bruce Schneier states: "Public-key algorithms are slow. Symmetric algorithms are generally at least 1000 times faster than public-key algorithms". This fact introduces limitations to widespread use of small or low processing powered devices such as cell phones, personal digital assistants (PDAs) or 802.1x wireless devices.

A current standard for encryption of data on the Internet is through the use of X.509 Certificates. Certificates employ public key cryptography and typically expire, making them a recurring maintenance cost. The methodology behind verification of certificate-based authentication is the use of a Certificate Authority (CA). The idea is that a user or application can present a certificate to a Certifying Authority to validate the authenticity and validity of the certificate. Presently, many companies compete in this space and there is no available scalable and affordable method to distribute certificates to every user on the Internet. Due to the need for security, the use of Certificates has caused identities to proliferate. Many companies may have more than one certificate from more than one Certificate Authority, making this methodology cumbersome and inadequate. Of even greater concern is the fact that digital certificates can be forged and copied.

On the a global communications network of connected networks such as the Internet, different mechanisms exist for an Internet Service Provider (ISP) to allow access to their privately owned and controlled network that is connected to the Internet backbone. These mechanisms typically employ both a username and password using the Remote Authentication Dial In User Service (RADIUS) protocol for wireless networks, a username and password for Point-to-Point Protocol over Ethernet (PPPoE) protocol for Digital Subscriber Line (DSL), or a network interface physically stored identifier (such as a Media Access Control (MAC) address) as typically used in cable networks. Many other combinations of authentication and access to an Internet connected network also exist.

But none of these methods accurately identify the user of the device connected to the network. Frequently, many users utilize a single connection to purchase network access to other Internet connected networks. In order for the Internet to function, each device connected to it must have an assigned number. The U.S.-based Defense Advanced Research Projects Agency (DARPA) project that created the Internet has created standards of communication and control bodies by which numbers are assigned for American Registry for Internet Numbers (ARIN), Internet Assigned Numbers Authority (IANA), and others. The original design of the Internet was for research facilities through out the world to share information easily. But the commercial value of connecting all communications networks soon became a more dominant use. Again, as above, the device or network does not necessarily authenticate the user.

In 1994, the Internet Engineering Task Force (IETF) released its first draft for IPv6, the replacement for the current Internet standard protocol. Within the draft of the proposal, the IETF formed a security methodology for secure communications. Identified in the document was a deficiency for the exchange of public keys. At the time, it was pointed out that "an Internet-wide public-key infrastructure is required". The encryption methodology for the secure component of IPv6 recommended in this draft is public key cryptography. Public key cryptography typically uses a method for employing the encryption known as a digital certificate (X.509 standard). But there is another method of encryption that could be used, known as a shared secret. In his paper attached as Appendix A, Timo Aalto states, "[i]n manual key management, the system's own keys, and also the keys of the communicating systems are configured manually to the system. This may work in a small and static environment, but does not scale". Thus, manually configured shared secrets are useless as a standard, as every website would have to share a secret with its users. So today digital certificates issued by Certificate Authorities are the current standard of distribution. However, Timo Aalto also states, "[w]idespread use of IP security will require an Internet standard scalable key management protocol. A number of candidates of the key management protocols have been proposed: ISAKMP ["*Internet Security Association and Key Management Protocol*"], SKIP ["*Simple Key-management For Internet Protocols*"], Oakley, Photuris, and SKEME; so far none of them has been adopted as a standard. A more descriptive information about IPv6 key management protocols can be found" attached as Appendix B. The lack of a standard has prevented widespread use and adoption of IPv6.

In the current world of identity communication, X.509 digital certificates are being used to provide credentials for identity. These certificates can be purchased through a Certificate Authority that assumes the responsibility of managing the certificate's expiration. These systems involve "Web of Trust" based trust models. In order to obtain a trusted system, the scheme involves a public accounting firm to be chosen to audit a Certificate Authority that an entity chooses to trust. Certificate Authorities issue certificates to entities through a variety of means, the most prevalent being an e-commerce application that does not verify the entity except through the payment instrument. Since payment instruments can be forged or stolen, without an in person interview there is no way to positively identify the applicant. The certificate model is flawed in several ways:

The process to obtain the certificate is subject to computer fraud.

Certificates can be forged, copied, and stolen.

Certificates require frequent "root server updates" to validate the certificate.

Self Signed Certificates can be issued and generated by anyone using Open SSL, an open source version, and do not require a Certificate Authority to function.

In the "Identity Commons" trust model, derived from the Intermind Corporation U.S. Pat. No. 6,044,205, the user is only registering a globally unique name with the system. As in the CA trust model, typically the only identity verification is through the payment instrument. While "Identity Commons" is useful for single sign-on to trusted systems, anyone armed with the name and password can steal the identity.

An additional problem posed by most systems in use today is there is no positive way to identify the user of a device. For example, in the cell phone network, typically devices are authenticated for use by an identifier stored in the device. However, in this example, there is no positive way to identify the user of the device. The device typically has a way to lock the keypad with a code only known to the user to prevent unauthorized use; but to date, there is no positive way to identify the user. Inventions exist to tie the device to a user, such as token-less biometric sampling, the use of a personal identification code or number (PIC or PIN), a token such as a credit card, and other token or token-less methods and combinations thereof. But in the case of a cell phone, these inventions have proven to be cumbersome, expensive, defeatable, or for other reasons not implemented.

In the telephone network a number is assigned to wires run to a home or business. As above, there is no positive way to guarantee the user's identity.

In the Automated Teller Machine (ATM) network, an ATM is authenticated and monitored through software. But since most of these networks rely on the use of a token, such as a credit card, that can be passed to another user or stolen, once again there does not exist a method to verify the authenticity of the user of the token. Biometric devices are seen as the solution to this problem. But biometric devices have seen slow adoption for a variety of reasons that are primarily behavioral in nature (fear of germs, etc.), not to mention that the reasonably priced models can be readily defeated.

Identity theft is another problem area resulting from software intrusion that captures an end user's keyboard input and can capture screen shots of the user's personal computers allowing them to pose as the identity. In fact, many of these intruder programs are sophisticated enough to turn on an attached camera or microphone and actually listen to or view what is in the room with the computer! The number one intrusion is capturing a user's keystrokes as they input a username and password, to access financial or other data.

Another form of identity theft comes from what are referred to as "phishing emails". These emails are carefully crafted and contain a link to a false web site masquerading as the real site. When the user authenticates to (what he or she thinks is) the real site, the false site is able to capture the user's credentials. Today, there is no simple, reliable way to communicate to the unsophisticated user that they have accessed an application that does not belong to the entity they believe it to be.

Accordingly, a need remains for a way to authenticate users without relying on certificates, usernames and passwords, and other techniques that can be intercepted, forged, or captured by deception that addresses these and other problems associated with the prior art.

SUMMARY OF THE INVENTION

One embodiment of the invention includes a system and method for performing a transaction. Subscribers register with the system and are provided credentials. The subscribers can be authenticated using their credentials. A receipt can be provided to the subscribers. The receipt identifies the two subscribers without providing any personally identifying information about the subscribers.

Another embodiment of the invention provides for the release of data encrypted by a key. The key is divided among a number of participants. When the data is to be released, the key is assembled from the various portions. The data can then be decrypted. The data can be re-encrypted using another key for transmission to a requester of the data, to protect the data.

BRIEF DESCRIPTION OF THE DRAWINGS

FIG. 5 shows the master ID table used in the Proxy Authentication Network of FIG. 1.

FIG. 6 shows an input schema used in the Proxy Authentication Network of FIG. 1.

FIG. 7 shows the location table used in the Proxy Authentication Network of FIG. 1.

FIG. 8 shows a schema for devices used in the Proxy Authentication Network of FIG. 1.

FIG. 9 shows an identity table used in the Proxy Authentication Network of FIG. 1.

FIG. 23 shows the use of the location identifier in the Proxy Authentication Network of FIG. 1.

FIG. 24 shows a string representing a fully authenticated identity in the Proxy Authentication Network of FIG. 1.

FIG. 25 shows a mutual authentication receipt generated in the Proxy Authentication Network of FIG. 1.

FIGS. 42A-42B show a flowchart of the procedure to access data in the Proxy Authentication Network of FIG. 1.

DETAILED DESCRIPTION

Figure 1:
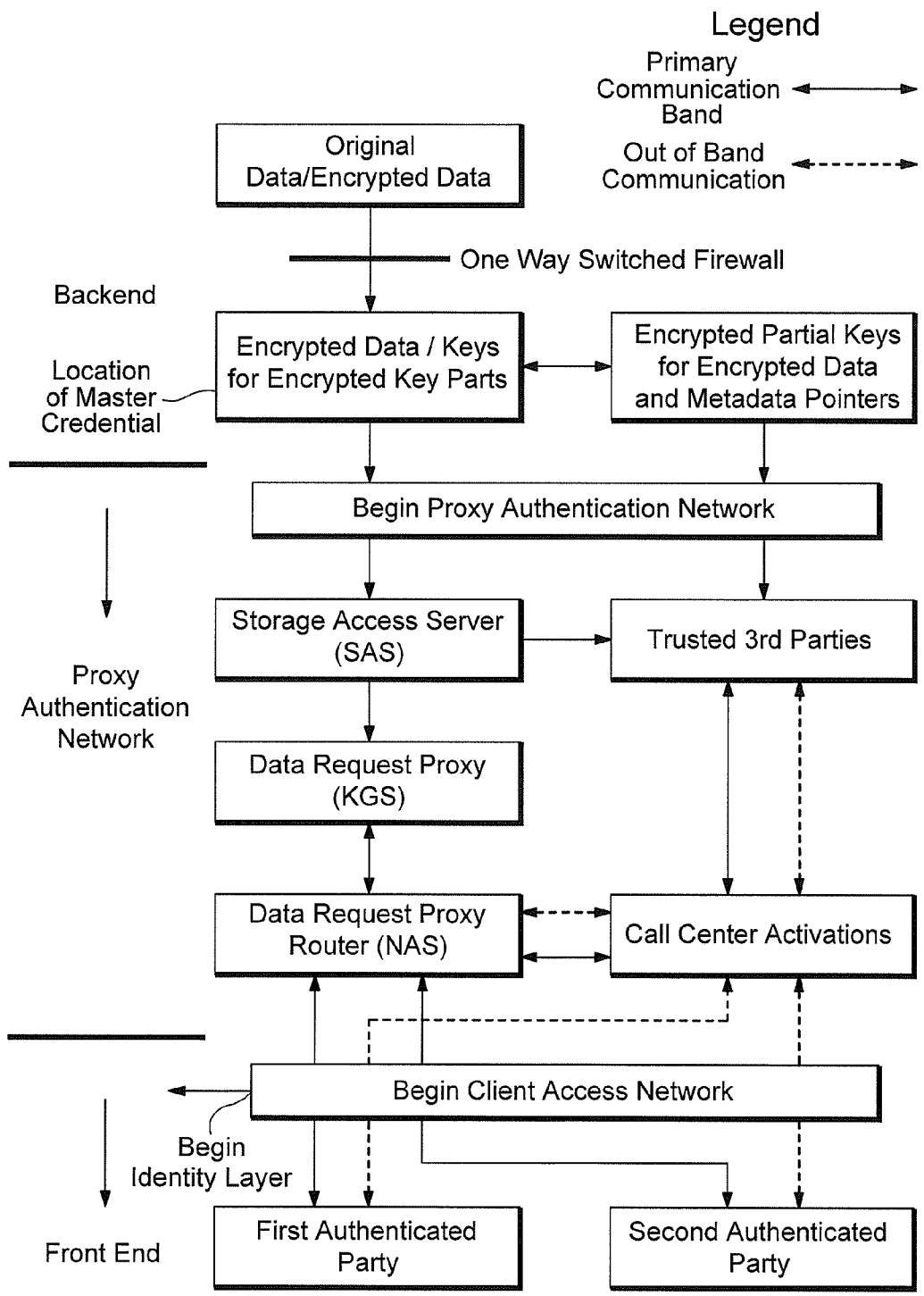
FIG. 1 shows a Proxy Authentication Network, according to an embodiment of the invention.

Microsoft Corporation, in an article appearing on the Internet as of May 11, 2005, titled "The Laws of Identity" by Kim Cameron, attempts to define digital identity. Within this published work are the following references: "Problem Statement—The Internet was built without a way to know who and what you are connecting to". Additionally, Microsoft published "[s]ince this essential capability is missing, everyone offering an Internet service has had to come up with a workaround. It is fair to say that today's Internet, absent a native identity layer, is based on a patchwork of identity one-offs".

There is not a single authoritative system and methods for establishing a "sovereign digital identity". The problem is the abstraction of digital identity itself as it is only a representation of a real person. A myriad of "identity one-offs" exist as valid credentials to represent oneself to a network system. Usernames and passwords, digital certificates, smartcards, tokens, biometric devices and other methods exist in the form of credentials and each credential is unique to that system.

Kim Cameron has made available a paper titled "The Laws of Digital Identity" which further confuses the actual reality of "digital identity". It is an attempt to "systemize" identity. Digital Identity, as defined here, is the presentation of valid credentials to a system that recognizes you and can verify you outside the medium of connectivity.

Kim Cameron also states "[i]n summary, as grave as the dangers of the current situation may be, the emergence of a single simplistic digital identity solution as a universal panacea is not realistic."

A global system of identity credentials embedded in the entity that are in constant communication with a system connected to a Global Positioning System that tracks the actual entity in reality is not desirable from the standpoint of privacy, and is not possible when the entity is a commercial entity like a corporation or partnership. Therefore, a system needs to be in place to allow for a sovereign identity representation of the entity with sufficient methods to verify the actual entity in reality with the entity having the ability and control to terminate such a representation.

The Proxy Authentication Network is a system and method to establish an "identity layer" where an entity claims and controls the credentials to access the layer as sovereign: that is, no other set of credentials is more representative of themselves in the medium of access. The system also prevents an entity from presenting to the system more than one set of credentials at one time. The system optionally stores a master credential for use by the entity or those authorized for the purpose of automatically scheduled payments or other methods of conducting digital communication or digitally signing documents. This master credential can be used by other authorized entities within the system, under control of the owning entity, when the entity is connected or not connected to the system. The Proxy Authentication Network provides this control.

Figure 34:
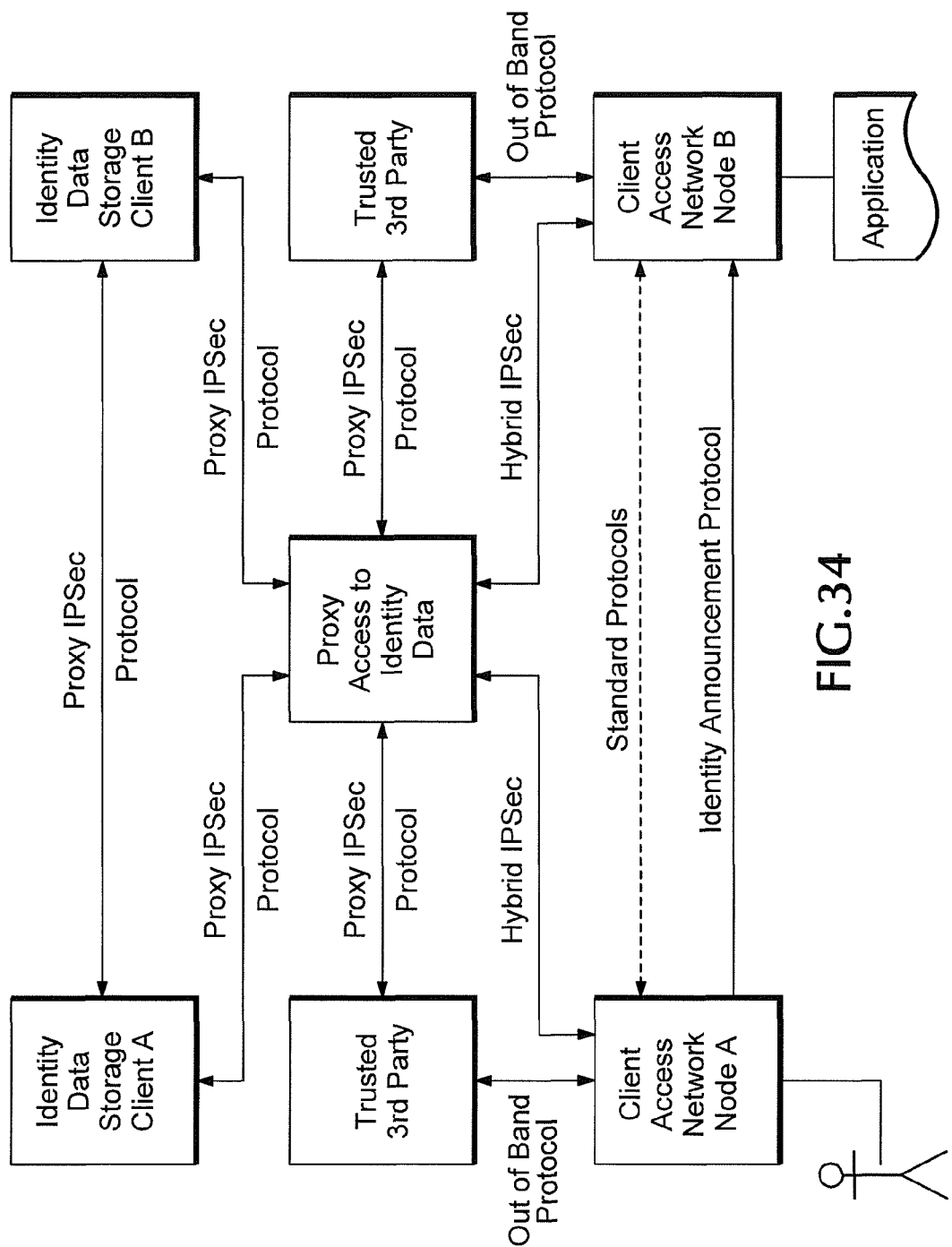
FIG. 34 shows a protocol model usable with the Proxy Authentication Network of FIG. 1.

A set of credentials, in the context of the Proxy Authentication Network, is a user configurable set of tokens or tokenless input, the device accessing the medium and the physical point of connection to the medium. To verify these credentials, as they can and will change, a system is in place to verify the identity outside the medium of connection. The medium of access can be any network connected to the Proxy Authentication Network. For instance, if the user were on a cell phone network connected to the Proxy Authentication Network and wished to authenticate, they could use a computer connected to the Internet to verify the cell phone medium. Out-of-band authentication to a proxy network acting on behalf of the entity who has declared this to be their sovereign representation of themselves within the access medium and system to positively authenticate the entity in the real world is new. FIG. 1 shows an embodiment of the invention. FIG. 34 shows the protocol model, depicting an embodiment communication structure. Of note is the Hybrid IPSec acting as a barrier to the actual Proxy Authentication Network.

Figure 2:
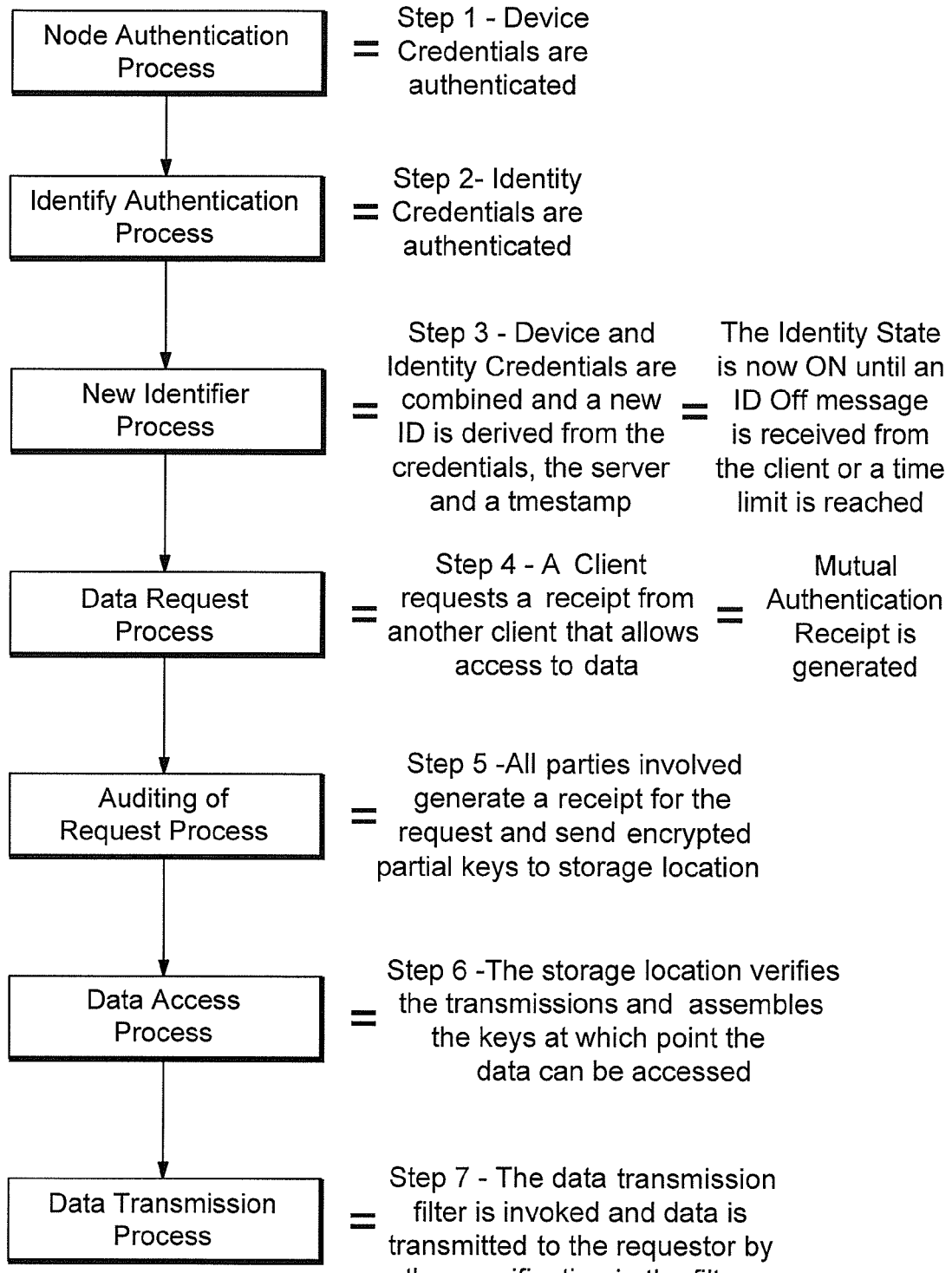
FIG. 2 shows the steps used in authenticating an entity using the Proxy Authentication Network of FIG. 1.
Figure 3:
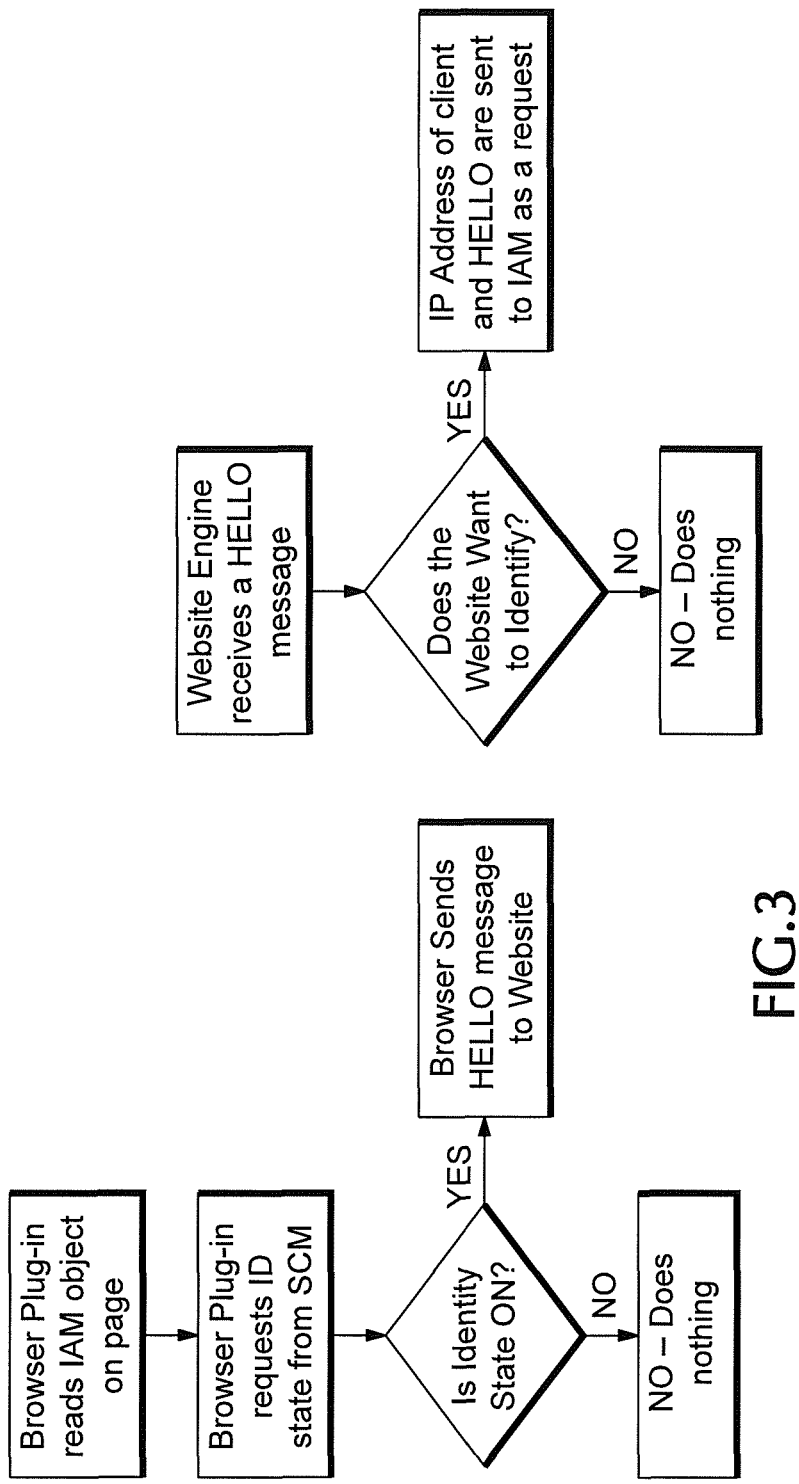
FIG. 3 shows the steps used in the identity announcement protocol using the Proxy Authentication Network of FIG. 1.

FIG. 2 shows the steps of a typical authentication process within an embodiment of the invention. In step 201, under control of the entity, the client software is initialized and the various identifiers used to differentiate the device from other devices attached to the network are authenticated by the node access server process. In step 202, under control of the entity, the client software requests the credentials identified in the entity credential profile table stored by the system. In step 203, the access device and entity credentials are stored on a key server and the server writes the derived identity credentials into the volatile memory of the server creating a RAM based state table. This identifier is used in mutual authentication by the system to quickly authenticate a user who wishes to access their master or slave data storage locations and generate an audit trail. The identifier is parseable and is logged. In step 204 a client, as illustrated in FIG. 3, has invoked the mutual authentication receipt method. This process takes the new authentication identifier from RAM on the appropriate key generation server of each authenticating entity and combines them together to form an authorized receipt. This receipt can then be presented to a data access method and the requesting entities can accept or reject the transfer of information. The transfer of information can be in the form of simple fields displayed to the entity from a basic data request method or it can invoke a transaction interface that is linked to the proxy authentication network transaction method interface.

Returning to FIG. 2, in step 205, the client has requested data according to one of the afore mentioned processes, after querying the access policy filter for a method, in this case the "unlock location" method is called and the participating servers send the encrypted partial keys to the appropriate master or slave location where they are assembled for verification and the data access is granted. In step 206, the access policy filter is requested again and calls the appropriate method for the release of data. In this step, the actual data can be displayed to the user for verification. In step 207, the negotiated amount of data is sent to the requesting entities.

Figure 17:
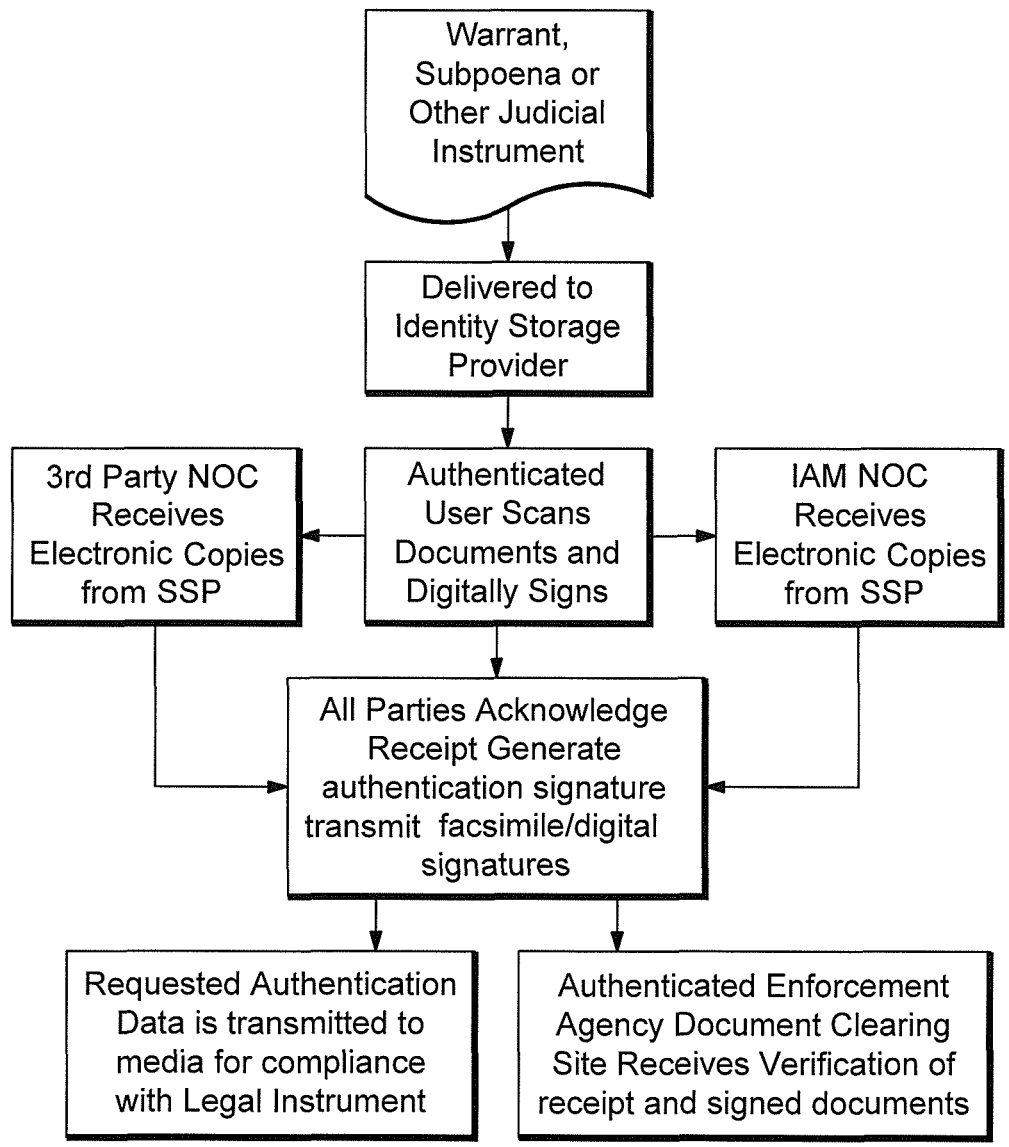
FIG. 17 shows how the Proxy Authentication Network of FIG. 1 can be used by law enforcement to access authentication log data.

The guiding principles of embodiments of the invention are:

1. Store an identity in only one location.
2. Create a central authority for authenticating the entity
3. Create a storage provider for the entities identity and personal information
4. Use metadata and pseudo data so that the central authority does not know the true identity of the entities contained in the storage provider facility.
5. Optionally, introduce a third party to prevent collusion between the central authority and the storage provider. An appropriate metaphor is the Judicial, Legislative, and Executive branches of the United States of America.
6. Introduce a method of logging and access to prevent abuses by any party participating in the process including collusion between all three parties.
7. Introduce a method whereby an enforcement body can receive log data of mutual authentications for enforcement or other use. An example is depicted in FIG. 17.
8. All devices, users, sites, and hosts (objects) are authenticated at all times into an "authenticated identity virtual network matrix".
9. In order to safeguard entry into the proxy network any authentication request is denied or ignored unless it comes directly from a previously authorized device. A client server based authentication sequence is initiated between a plurality of servers depending on the type of authentication request.
10. In some embodiments, network countermeasures are invoked to protect the proxy network from Denial of Service Attacks or unauthorized intrusion.
11. Utilize hardened, highly secure servers with intrusion detection systems, self-destruct on intrusion, and triple redundant safeguards to defend and insure a projected 99.99% uptime. Each server is installed in a "cluster" consisting of two identical servers that are connected by a "heartbeat" program that in the event of any failure in the primary server automatically the other server begins processing, providing a projected 100% uptime for the network itself. Additionally, another cluster of servers that is duplicated through an imaging protocol exists in another location, should the first location become unavailable.
12. Prevent the client from accessing the network directly using a "reverse firewall".
13. Allow sub storage of additional information such as medical records, additional financial information, or documents generated by the user.
14. Use discrete functionality as in an embedded system that is usually low in system resources in a system with plentiful processing resources.
15. Use a database structure for client requests that responds directly to a network.

Embodiments of the Invention consist of a proxy authentication network of servers that have databases containing information unique to the user or site and the hosted devices but possesses no personally identifiable information other than an age group identifier for users to assist in complying with an "Internet use law" that is required (adult, under 13 or 13 to adult) or in another embodiment where a site entity may possess a website content rating. Additional information stored on servers can include a derived network identifier and a location table that is used by the system to assist in locating the user/device pairing. This is a unique identifier and is known only to the system. The network access code is an internal security measure to assist in insuring against false authentication attempts. The first server process controls communication to users and devices and has an ad hoc state table that joins the user/site to the device and "virtualizes" the pair into a time stamped matrix. From this point on an authentication request is fulfilled when a client request matches the kernel state table. In the event an authentication request is received and in the event a site or other object requests personally identifiable data concerning the user, a request for data is initiated and directed to the client that transmits the request after receiving a special key called the mutual authentication receipt sequence from a server. A second (or conceivably the same) server exists in close proximity to the personal information data store, usually a network known as a "DMZ network" that exists between the internal private storage network and the Internet. The server is connected to the Internet or a firewall device at the Internet and contains data access security and requests methods. All servers are connected through a virtual private network and under control of a network operations center program to manage the network.

The system is a voluntary identification computer system framework wherein all objects are identified and authenticated whose use is intended for determining an individual's or business's or device's identity and granting access to personal or business information from examination of one or more token or token less identifiers gathered at the time of use of the computer system and comparison with previously recorded or assigned data gathered during a registration step, wherein the individual, device, or entity is authenticated to the system and the system grants access to information as previously determined during the registration step or modification of those terms as amended from time to time by the user comprising an in person input process, a sovereign storage location, control methods for access to the storage location, a remote validation authority for access to the storage location, a method of reporting false attempts to authenticate or generate a transaction or creation of an identity that is forwarded to appropriate law enforcement, a plurality of servers that store identifiers that are a pseudonym for real data and coded identifiers to identify the credentials of both the user and the device used to access the system.

Trust Model

Figure 4:
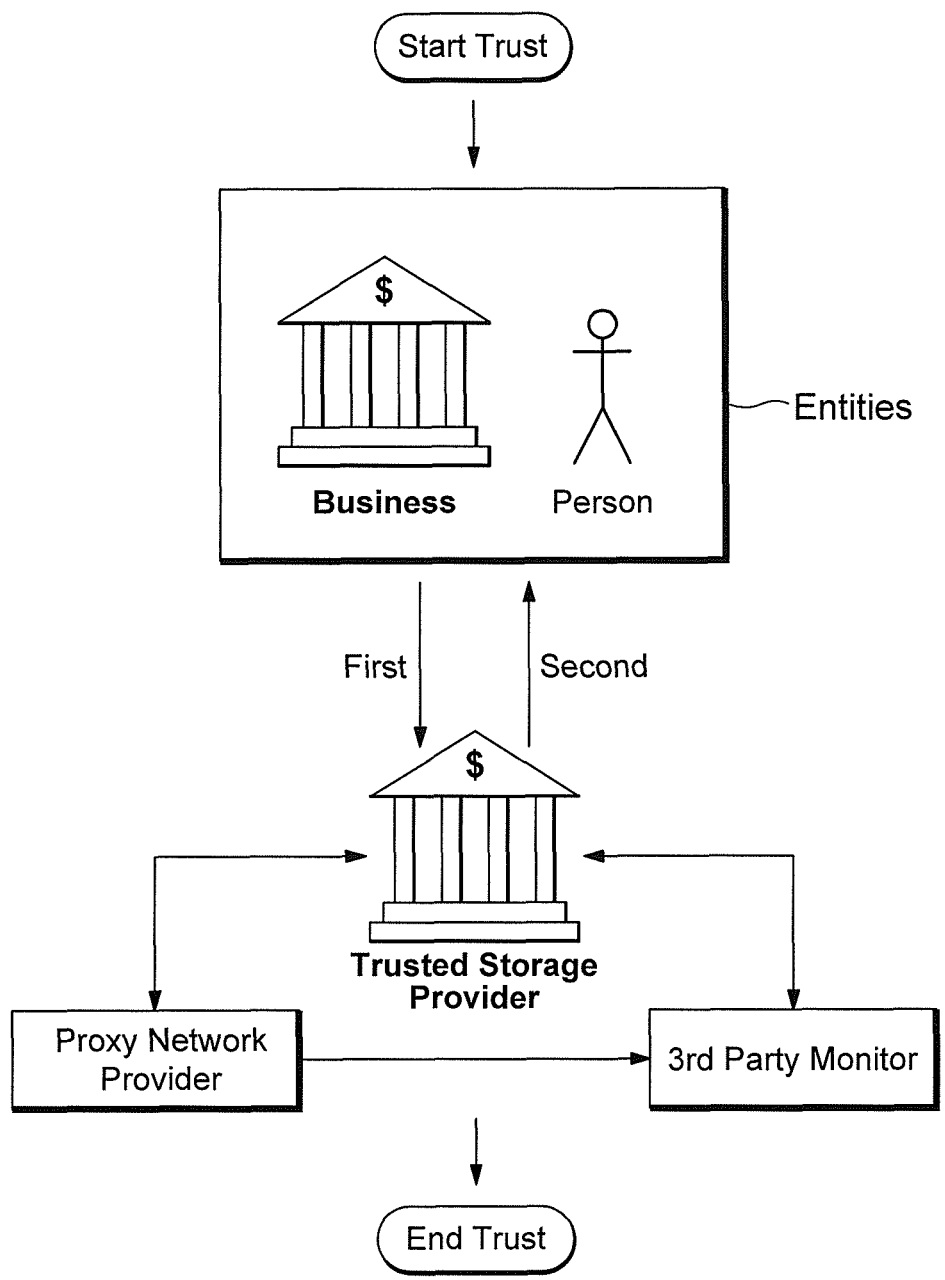
FIG. 4 shows a trust model implemented using the Proxy Authentication Network of FIG. 1.

In the Proxy Authentication Network trust model, illustrated in FIG. 4, the entity implicitly trusts the identity storage location and through a verifiable identity process at the storage location, the storage provider subsequently trusts the identity. The storage provider either trusts or partially trusts the proxy network provider and the proxy network provider trusts or partially trusts the identity storage provider. In the case of partial trust they introduce a third party to monitor and audit authentications and access to the identity storage location. The proxy network provider does not trust the entity and the third party auditor does not trust the proxy network. The entity only trusts the proxy network with authenticating their existence and if implemented this existence can be verified outside of the primary medium of communication—out of band confirmation of authentication.

In whatever location an entity's identity related data is physically stored, the entity must first establish a single instance of trust to the proxy network before access to identity data is located or to obtain the "keys" to another trusted storage location. Because the entity does not trust the proxy network with identity data, the proxy network does not possess identity data beyond unique identifiers that comprise the authentication data, and in one embodiment an age group identifier. The proxy network provider only shares in "key management" and authentication of the entity. In this way, relative anonymity can be maintained for the entity. Access to the identity storage location requires a set of "keys" that are shared by the proxy network, the third party (if implemented) and the storage provider. All of the "keys" must come together in one location in order to "unlock" the identity data. This is required before access to the data is granted to and by the proxy network provider on behalf of the entity.

In this identity scheme, the identity is tied to user configurable credentials that are instantiated at one place in time and optionally, the "identity" or master credential can be stored in a remote physical storage location. To provide relative anonymity to the entity, the system uses a proxy network that possesses little or no personal information about the user. In the case of a business entity, the entity is tied to authorized credentials of individuals and managed by a policy filter.

Data Operations

Master Identity

The proxy authentication network system possesses a master database (though this may be distributed in nature) with a single reference identifier, for accessing data that is the "Master Identity" storage location. This identifier could be, for example, an entity's social security number that is affected by a one way transform, which supplies the necessary unique identifier required by the system. However, additional storage of entity related data can be linked to the master location. The sovereign location holds the rights, and can hold any subsequent policy right for another slave location for any access of slave data. This provides centralized control to the user over their digital assets. A simple database of entity identifiers and the identifiers authorized to access is maintained. The control interface is most likely a web application outside the embodiment of the invention. The process to link slave data is performed at the sovereign location. A simple table, such as shown in FIG. 5 is used.

Generating Globally Unique Identifiers (GUID)

Figure 16:
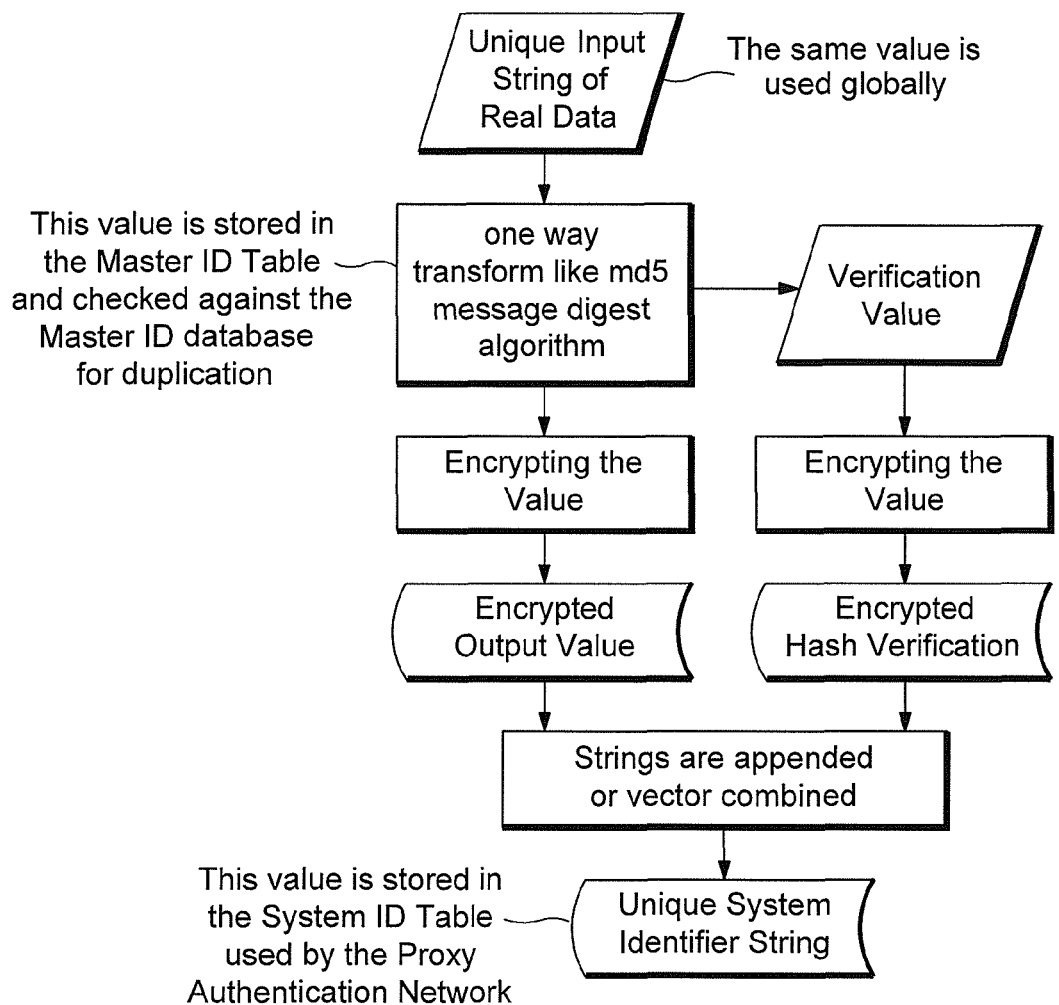
FIG. 16 shows how identities can be created in the Proxy Authentication Network of FIG. 1 using a Sovereign System Identifier.

Globally unique identifiers that tie the entity to the system are used. There are two important identifiers, the Master Entity Identifier and the System Entity Identifier. One way to create these identifiers is depicted in FIG. 16. The Master Entity Identifier is used in the input process. There is an input process at some place like a bank (Input Authority) where a user's identity is verified in the real world (photo id etc.). At the time of the verification there is also the possibility of collecting a biometric. A biometric is simply a mathematical statement of a unique identifier, so it is possible to create a unique identifier through the input process without using biometrics. This globally unique system identifier is in a master database that is referenced by the input application so that anyone who tries to maintain more than one "master" entity identifier is prevented from doing this. The input process collects personally identifiable information and a series of questions and answers that the identity would be confident few people would know the answer to and more importantly it would be unlikely anyone would know all the answers to. Mother's maiden name, last pet, favorite color, etc. are also collected. In the instance of a commercial entity, the questions could be something like tax id, mother's maiden name of contact principle, registered agent or other questions unique to a business and the businesses registered entity (person). This is a little more difficult because public entities have a lot of public information. These questions are important because both an automated and a non-automated call center will query the identity of the user and pose these questions to verify the identity of the user. In a larger corporation there can also be a company hosting a plurality of web sites, and in the process each separate site, including mirror sites, would receive a unique identifier. Business entity identifiers are the entity's primary identifiers and the person registered to perform authentication for the entity. In the case of a distributed website the authentication mechanism can be a USB or other token that is connected to the computer. To authenticate the website to the system will require a duly authorized administrator who is known by the system to authenticate first, and then with an out of band verification insert the token representing the business entity. In this way, a business entity maintains control of the credentials used.

Through out the proxy network and in the fulfillment center are metadata keys. These are unique strings that point to key fields in various tables. For example "Master Encryption Keys" are parsed into pieces and encrypted with different keys for each row of data. The master keys are then deleted from the tables destined for the storage access server. Each row of data has a unique master key that is only stored with the original data.

FIG. 24 depicts the fully authenticated identity. The string is stored in the RAM of the key generation server and contains the Location ID which is the server RAM it is stored on, a timestamp that is used by the server to remove identities after a determinate time period of inactivity, it is also part of the audit log, and is used for transmission in when a mutual authentication receipt is requested. The balance of the string represents the authenticated device used for the system id pairing of device to entity system master id. The string also contains the identifier generated from a transaction where by an out of medium authentication takes place.

Registration Process

In one embodiment, entities register with the system through an in person interview process. Employees of a business entity that is registered with the system each register separately, and utilization of the proxy authentication network by a business entity can be considered a slave location.

The primary use of the registration process for a business is to allow an application server, such as a website, to be authenticated to the proxy authentication network so that the system's authentication and subsequent data request methods can be called to obtain authentication and information from entities who invoke the Identity Announcement Protocol depicted in FIG. 3 when accessing the application. A representation of the table is depicted in FIG. 6.

Database Schemas

The schemas involve storing encrypted entity data and encrypted partial keys for the data. The keys to decrypt the data are broken into key parts and encrypted then separated amongst operators of the system to make theft more difficult. The actual data key parts themselves are encrypted with a key stored with the encrypted entity data. The master key is stored in the original database and not with the encrypted data. This assists in assuring the wrong entity data is not released, for when the key parts come together at the storage access server, the data cannot be decrypted if the wrong key or entity were selected. Those skilled in the art will see that the schema designs place only metadata onto the proxy network provider and optionally a third party control and key storage server. There are tables for communications, credentials and credential management. FIG. 7 is an example of the table used for locating servers or storage locations. Those skilled in the art will quickly see that the tables in the proxy network provider's databases contain no personally identifiable information regarding an entity. In one embodiment an age group identifier may be collected for minor children in the interview process, to assist in protecting children who attempt to access applications of entity sites for which they may be forbidden by law. FIG. 8 is an example of a schema for each device. FIG. 9 is an example of an Identity table. It is through a relational design by those skilled in the art that the identifiers are appropriately stored to provide the functional design of the system.

Figure 10:
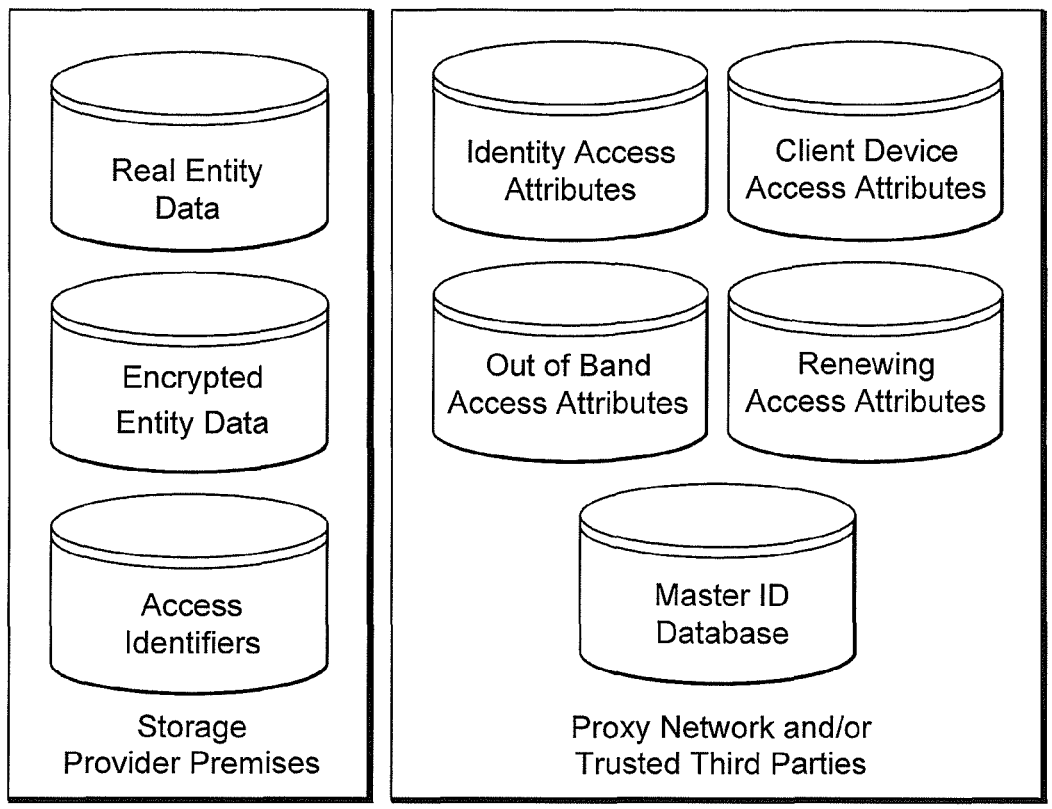
FIG. 10 shows the topology of identifier data in the Proxy Authentication Network of FIG. 1.
Figure 11:
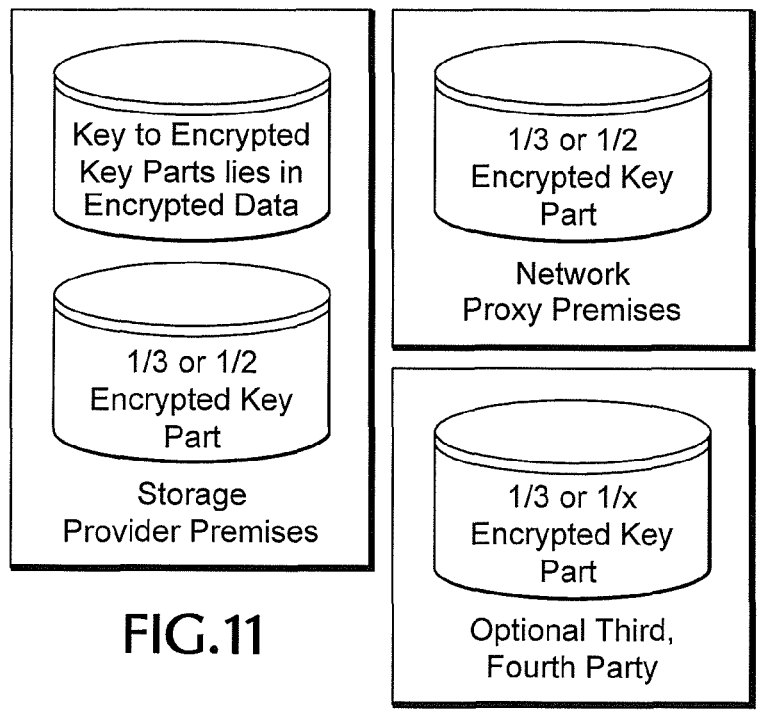
FIG. 11 shows the topology of encryption keys in the Proxy Authentication Network of FIG. 1.
Figure 12:
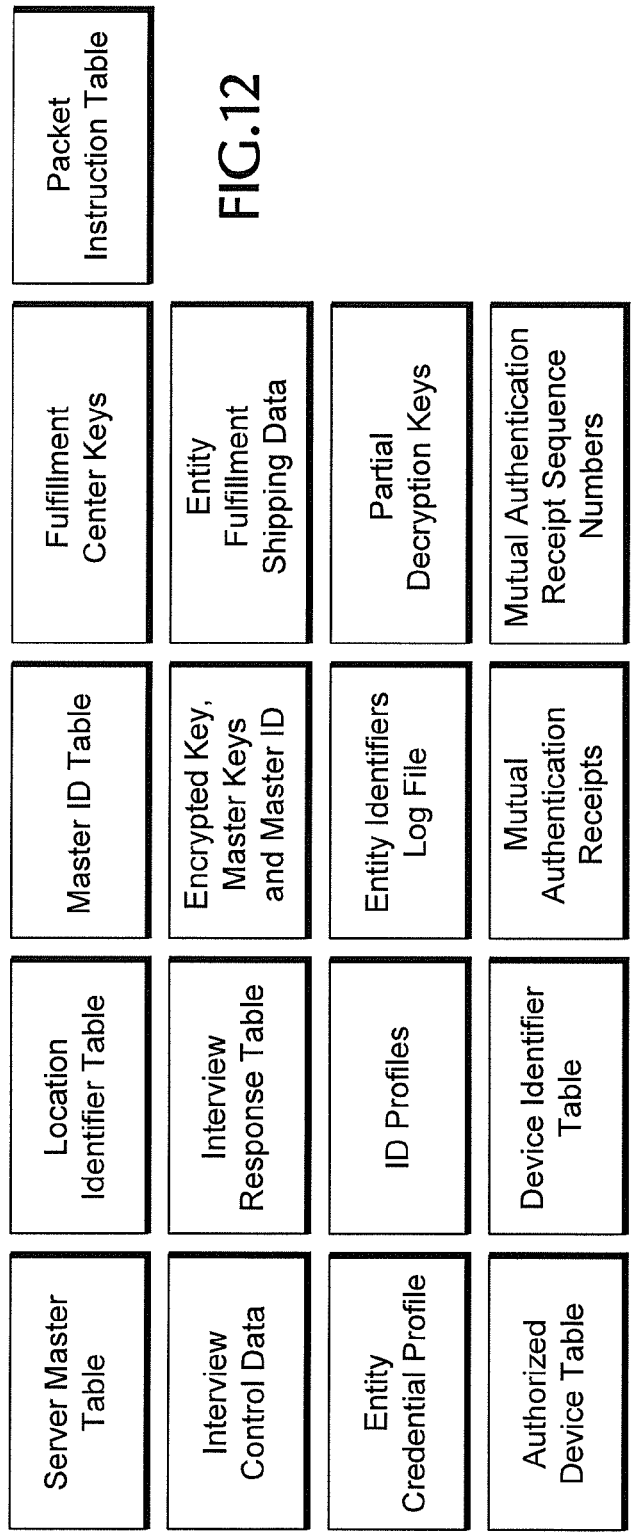
FIG. 12 shows some of the tables used in the Proxy Authentication Network of FIG. 1.

The schemas relate to one another, while creating layers of protection. FIG. 10 depicts the first layer, separating the identifiers used in the storage provider from the proxy network provider and optional trusted third party. In FIG. 11 the separation of the encryption keys stored by the system is depicted. The number of key parts and participating entities is only limited by reasonable response time for transmitting the data. In FIG. 12, the system tables are depicted for an embodiment of the invention.

Logging Functions

Logging functions, while captured on the proxy network provider server are, as in the network born key parts, stored amongst the members participating in the management of the network and are similarly encrypted and parted. This is to aid in the prevention of log harvesting and to prevent the possibility of an intruder capturing log data from the system and eventually decrypting log data to gain an advantage in the system.

Credential Input Profile Changes

In one embodiment users have control over their input credentials through a secure web based application hosted at their respective primary data storage locations. When a user reconfigures their input identifier profile or if somehow a user input profile were modified, the database calls a stored procedure that alerts the system to a profile change. If the entity is authenticated, a message is passed to the user interface, notifying them of the change, in addition to the web credential management dialog confirming the changes. This is to aid in client intrusion. If the entity is not authenticated and a change takes place a system intrusion alert is sent, and the profile and entity is taken off line until a verified authentication take place.

Out of Medium Authentication

Automated Call Center

An automated call center is the first out of band authentication confirmation mechanism. The call center out of band verification process can be configured a number of ways. A modem bank can be configured at the center to receive and transmit data directly to a PC through telephone lines if the primary medium is a broadband connection. An entity can also dial a telephony application that allows the entity to input the desired information. In another embodiment a cellular telephone can be used, and this can be an application on the cellular phone communicating with the call center on the Internet through a web application. While the medium of access is technically the same, the authenticating device is different, providing an exemplary embodiment of the invention by illustrating the authentication verifying device being separate from the device to be authenticated. In this embodiment, the control of the authentication is from two distinct devices and the call center verifies each device communication through an input request, effectively providing an out of band authentication as the confirmation is controlled through two different devices providing a mutual authentication with appropriate input strings. In practice, for security reasons, this embodiment will also require input of the fulfillment center re-authentication string.

Manual Call Center

Figure 13:
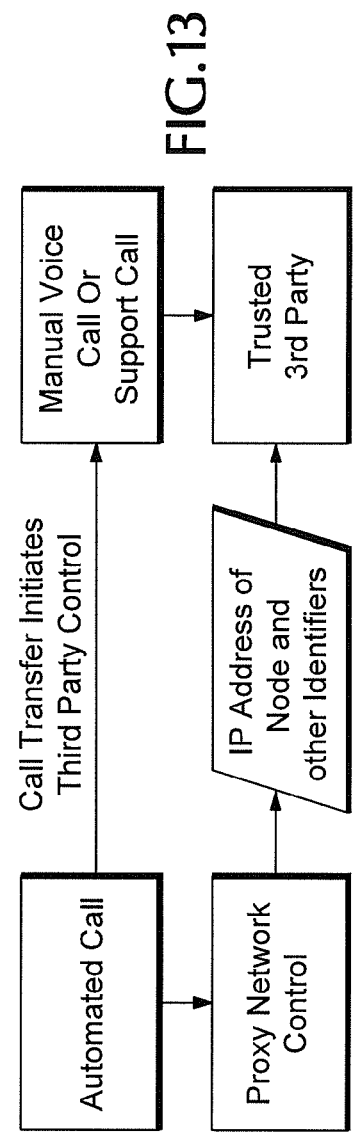
FIG. 13 shows how a call can be transferred to an operator in the Proxy Authentication Network of FIG. 1.

The manual call center is available when the automated system fails. The manual call center can be configured to transfer the request for answers to the personal questions from the interview to a third party, effectively preventing the proxy network provider from gathering any personal information regarding the entity. Optionally, in the interview process, an alias for the entity can be gathered for the proxy network provider to address the entity that prevents the proxy authentication network or optional third party monitor from knowing the true name of the entity whose personal information is being queried. When a third party verification transfer takes place the logging sequence is changed to aid in the verification of the entity, and to allow for the gathering of information suitable for confirming the call. An embodiment is depicted in FIG. 13. As in the regular logging sequence, upon completion the log data is encrypted and redistributed.

Multiple Medium Access

Regardless of the medium of access, only one device/identity pairing can be authenticated at one time. For example if a user is "online" i.e., fully authenticated at their computer, and they attempt to authenticate with their cellular phone to a web portal the authentication will be denied and the system will register a message to the "online" device that an access by "device friendly name" has been attempted. In another example if the user is authenticated on their cellular phone or work computer and someone attempts to use a registered device a message is displayed on the online device "device friendly name" has attempted to authenticate. The security benefit outweighs the inconvenience and this is required as the cellular phone can also be used as a separate medium of distributing pre-shared keys.

Key Distribution and Verification Methods

In one embodiment of the invention a cryptographic key management protocol where the shared cryptographic secret for two hosts to communicate with each other across a network medium A is generated and encrypted then distributed through medium A to the first host and delivered through medium B to the second host and the transmission is then verified through medium C. This is depicted in FIG. 14.

Figure 14:
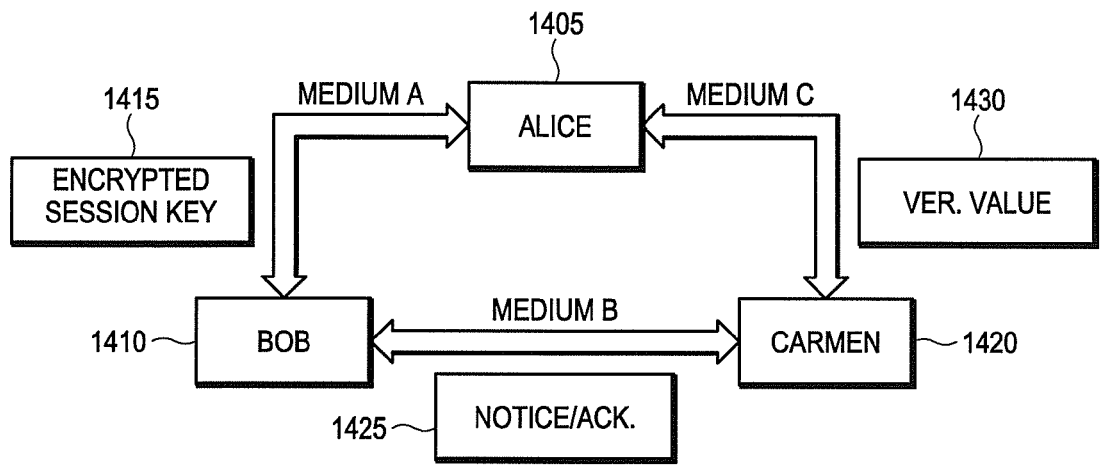
FIG. 14 shows how a shared cryptographic secret can be distributed in one embodiment of the Proxy Authentication Network of FIG. 1.

In FIG. 14, Alice 1405 sends Bob 1410 encrypted session key 1415. Encrypted session key 1415 is sent through a medium A. For example, medium A could be a postal service. But a person skilled in the art will recognize that medium A could be any other desired medium, such as a secured connection or a telephone call, as could all other mediums used in other implementations. Further, although the various mediums are given labels, it is not required the mediums be different. For example, Alice 1405, Bob 1410, and Carmen 1420 could all be communicating across the same medium.

The Proxy Authentication Network checks to see if encrypted session key 1415 is in the table for Bob 1410. If not, then Bob 1410 sends Alice 1405 a notice that the key is invalid. Bob 1410 then does not accept communication from Alice 1405 without confirmation from Carmen 1420.

Assuming that encrypted session key 1415 is in the table for Bob 1410, then Bob 1410 sends Carmen 1420 notice 1425 via medium B that Alice 1405 wants to set up a cryptographic tunnel. Carmen 1420 sends Bob 1410 an acknowledgement (shown in FIG. 14 as part of Notice/Acknowledgement 1425) of the request, and waits for Alice 1405 to communicate with Carmen 1420 through medium C. Bob 1410 also decrypts encrypted session key 1415, and uses the decrypted key to send Alice 1405 an encrypted message explaining how to confirm the key with Carmen 1420.

Alice 1405 then sends Carmen 1420 verification value 1430. Carmen 1420 verifies verification value 1430 with Bob 1410, which confirms that Alice 1405, Bob 1410, and Carmen 1420 are communicating.

Where a channel needs to be secure, a person skilled in the art will recognize that the channel can be secured in different ways. For example, the channel can be a physically secure channel, where no unauthorized party can interfere with the channel. Or the channel can be a physically insecure channel over which a secure encrypted communication is occurring. A person skilled in the art will recognize other ways in which channels can be secured.

A cryptographic key management protocol where a secret value to generate a cryptographic secret for two hosts to communicate across medium A is generated and encrypted and delivered to one host through medium B and to another host through medium A whereby Alice initiates communication with Carmen through medium C and a value is given to Carmen and Carmen transmits a matching value to Bob through medium A confirming host communication. This is depicted in FIG. 15.

Figure 15:
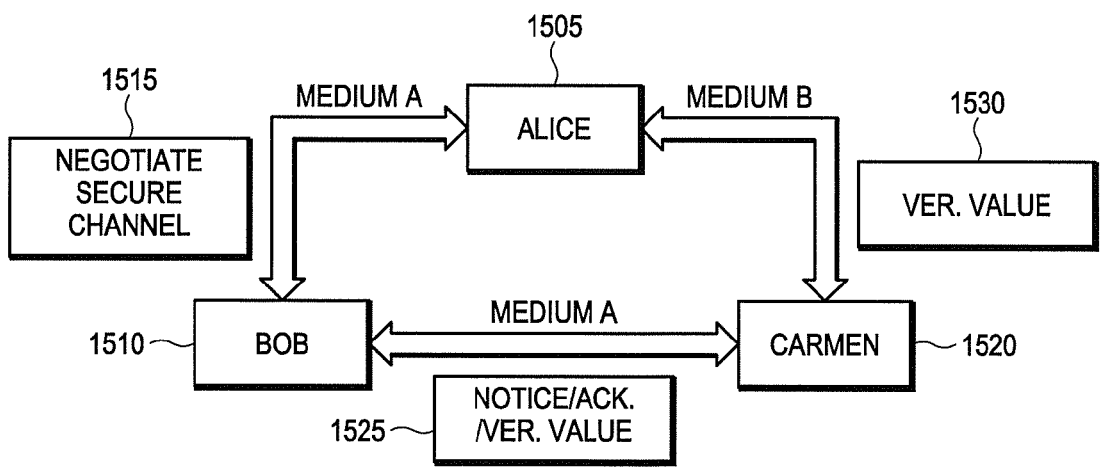
FIG. 15 shows how a shared cryptographic secret can be distributed in another embodiment of the Proxy Authentication Network of FIG. 1.

In FIG. 15, Alice 1505 and Bob 1510 negotiate secure channel 1515. Negotiated secure channel 1515 can use any known technique to secure a channel across medium A. Bob 1510 then sends Carmen 1520 notice 1525. Bob 1510 also sends Alice 1505 an encrypted message explaining how to confirm the communication with Carmen 1520. Carmen 1520 sends Bob 1510 an acknowledgement (shown in FIG. 15 as part of Notice/Acknowledgement 1525) of the request, and waits for Alice 1505 to communicate with Carmen 1520 to confirm the communication.

Alice 1505 then sends Carmen 1520 verification value 1530 across medium B. Carmen 1520 transmits a value to Bob 1510 that confirms that Alice 1505 and Bob 1510 are communicating. Carmen 1520 can also issue new shared secrets to Alice 1505 and Bob 1510, across the mediums.

Alice and Bob need to authenticate securely and absolutely, that is they both need to determine that the digital representation of each other exist in a single point of time by reference to the primary access medium they are communicating through. Alice and Bob also need the ability to turn off access to their unique digital identity (UDI). Alice and Bob agree to allow Carmen to proxy their requests to the location of their unique digital identity. Alice and Bob also agree to allow Carmen to pinpoint the access of one another and limit the access to a single point of access and decide whether Alice and Bob do indeed exist by querying outside the medium which they are communicating through. At the same time new encryption keys can be generated for Alice and Bob and distributed both "in and out of band". It is understood that Bob and Carmen are able to communicate securely over medium A or any other medium.

Credential Proxy Request

Alice and Bob agree to allow Carmen to be the proxy through which Alice and Bob communicate with themselves and Diaz, where the actual UDI is stored. In order to accomplish this goal a different medium is introduced to pass authentication messages to the system. Because Alice and Bob wish to pass messages or data to each other and have that message authenticated into reality, Alice and Bob realize they must declare a sovereign digital identity (SDI) for themselves. Alice and Bob agree to store their SDI in only one location. Alice and Bob agree to trust Carmen implicitly for communication between Alice and Bob and agree to use Diaz or whomever Carmen trusts as the storage provider for their sovereign digital identity data. However, Alice and Bob also agree that a fourth, fifth or sixth party, Evelyn, Frank, and Giuseppe, could all or more confirm access by Carmen to their SDI as well as prevent Diaz from disseminating their SDI. Diaz splits the information necessary to obtain access to the SDI between the number of parties required to satisfy the authentication requirements of Alice and Bob respectively. Alice and Bob also agree to perform an in person interview whereby they give Diaz (or any additional entity that Carmen trusts) the actual data comprising their sovereign digital identity. The digital identity is then encrypted by Diaz (or any additional entity that Carmen trusts) and Diaz separates the keys required apportioned to the number of fourth parties Alice and Bob agree to. Alice and Bob simply choose to separate their declared sovereign digital identity and agree to give Carmen proxy rights for communicating requests for authentication and of the existence of Alice and Bob in reality at the time of their creation of any digital representation of themselves.

Alice, Bob, Carmen, and Diaz all trust each other. In another embodiment of the invention Alice could trust Evelyn with the interview and Alice, Bob, Carmen, Diaz, and Evelyn could trust Frank with authenticating the communication from Alice, Bob, Carmen, Diaz and Evelyn. It is important to understand that the invention allows multiple Diazes and Franks.

In RFC 2627—Key Management for Multicast: Issues and Architectures section 5.1 MANUAL KEY DISTRIBUTION, it states: "[t]hrough manual key distribution, symmetric key is delivered without the use of public key exchanges." It further states that "[t]he Net Keys would be distributed to each individual group participant, often through some centralized physical intermediate location. At some predetermined time, all group participants would switch to the new Net Key." In this scenario, an alternate key is also discussed in the event a compromise of the original key is made, and that said alternate key would also be delivered "out of band", suggesting perhaps that the key would be delivered in the same process as the original key.

Alice and Bob are authenticated in reality to a trusted system by an in person interview with Carmen whereby they declare a sovereign digital identity and agree to have Carmen store their sovereign identity. Alice and Bob are given a matching session key from a trusted third party Diaz and pass messages through trusted third party Evelyn who is trusted by Alice, Bob, Carmen and Diaz. The actual data is stored at Carmen. Carmen and Diaz confirm the messages from Evelyn for data on behalf of Alice and Bob.

In another embodiment of the invention Alice and Bob need to authenticate securely and absolutely, that is they both need to determine that the digital representation of each other exist in reality. Alice and Bob are authenticated to a trusted system by an in person interview with Carmen whereby they create a sovereign digital identity. Alice and Bob are given a matching session key from a trusted third party Diaz who Alice, Bob and Carmen trusts and pass messages through Diaz. The actual data is stored at Carmen. Carmen and Diaz confirm the messages from Alice and Bob for authentication requests from Carmen for data on behalf of Alice and Bob.

Alice and Bob need to authenticate securely and absolutely, that is they both need to determine that the digital representation of each other exist in reality. Alice and Bob decide to trust Carmen with the storage of their data and Carmen encrypts the data from Alice and Bob. Alice and Bob also trust Diaz with communicating with Carmen on behalf of Alice and Bob and decide to trust Evelyn with keeping Carmen and Diaz honest. Carmen gives Diaz and Evelyn a partial key and a row identifier for Alice and Bob in Carmen's database. If Alice and Bob decide they could also invite Frank and Gordon or more into their circle of trust to expand the number of keys required for greater security. In this way additional parties are introduced for the sharing of partial keys to allow access to their data.

In order to protect against flooding attacks from devices to node access servers, the AH of IPv4 tunneled IPSEC or the AH of IPv6 is used, depending on what IP protocol is available for communication. Typically, other protocols employ the use of a cookie as in IBM's patent incorporated in RC2522, or in the Kerberos protocol, the TLS 1.0, and others. This is because these protocols deal with peer-to-peer communication and may not know the device they are communicating with. In the Proxy Authentication Network, the device used to authenticate the identity is assigned at the initial authentication by Carmen and Diaz. Shared secrets are known (or expected) before communications begins.

Self Authentication

An example of this embodiment follows. The user is attempting to authenticate to a public terminal: for instance, an ATM machine. The user has inserted the token and entered the PIN, however, the user has specified in their in person interview that they want ATMs that are connected to the proxy authentication network to require an additional Proxy Authentication Network verified receipt. The account is flagged as a Proxy Authentication Network account in the main processor of the ATM. In order to finish the authentication, the ATM machine would have to possess the necessary hardware to authenticate the user with their Proxy Authentication Network token or Tokenless choice of authentication or combination thereof. However, if the ATM machine is an Proxy Authentication Network authenticated device, without the additional hardware, or a telephone link to the call center, the user could utilize a cellular phone to contact the call center and select "I am at an Proxy Authentication Network enabled public terminal" from the automated menu, at which point the cellular phone would require authentication through the users cellular pass code (or biometric or token or all three) and the ATM would display a code to be entered into the cell phone confirming an authentication to ones self Another variant is if the cellular phone is not a Proxy Authentication Network enabled device the user could still authenticate to the call center through voice interaction and provide the ATM designator. This method would require the correct answer to a minimum of one security question from the original in person interview. In either of these cases two authentication receipts would be given, one for the cellular phone call to the call center and one for the ATM.

Other devices could also be used like a PDA that has a wireless connection to the Internet could logon to the web-based call center and perform a full authentication, enter the ATM machine code at which time the ATM will display a code to be entered into the PDA and the authentication would be granted. Two authentication receipts would be generated under this scenario as well.

Yet other devices with which the system can be used might include a Session Initiation Protocol (SIP) phone that has a wired or wireless connection to the Internet. The SIP phone can be a device that has credentials of its own managed by the system, and can be identified by the system.

System Messages

Most system messages are predetermined and read from a table stored on the server that the client or server is accessing. There are two groups of messages, control messages used by the various software modules on the server and security messages which are transmitted by the network operations center. A security message is created anytime there is a security event, which is defined as any event that halts normal processing. The Network Operations Module depicted in FIG. 18 under control of the network operations center transmits the message to the client and if appropriate other servers or a law enforcement agency.

Address Registration

The Proxy Authentication Network does not use DNS for establishing communications between servers. Network control of the destination of a packet is controlled through the use of location identifiers. This is done as much for speed as for security, since the network databases contain the location of all servers and are local, no DNS request is necessary. This further enhances system security as the location of servers is not publicly known, and requests for a name cannot be intercepted. Each server that comes online, and joins the network, performs the following procedures. The server is assigned a network location identifier (i.e. name) by the network operations center. This is an arbitrary identifier that is unique to each server. This identifier can be used in the SA portion of the SPI for IPv6 communications. Every server's allowed communications table in its operational database is then updated with the actual IPv6 or IPv4 address and the location identifier. This identifier is sufficiently long to allow up to 999,999,999 million servers to participate in the network. The location identifier is depicted in FIG. 23.

Server Data Replication

The databases stored on the proxy authentication networks are updated and replicated using an encrypted shard based data model. This minimizes traffic and allows security of the data. This technique is used by Google and others. Only changed data is replicated. The unique aspect of this implementation is the shard coordination algorithm stored in the database under control of the network operations center. New data is broken into shards that are an element of the data and is encrypted and a reassembly index is generated. The data is then routed with a dynamic update table under control of the network operations center. The network operations module on the server also monitors the activity at the server and updates are given a priority based on the table being updated. In this way a load balancing is accomplished and data that requires immediate updating is given the highest priority.

Router Architecture

Figure 18:
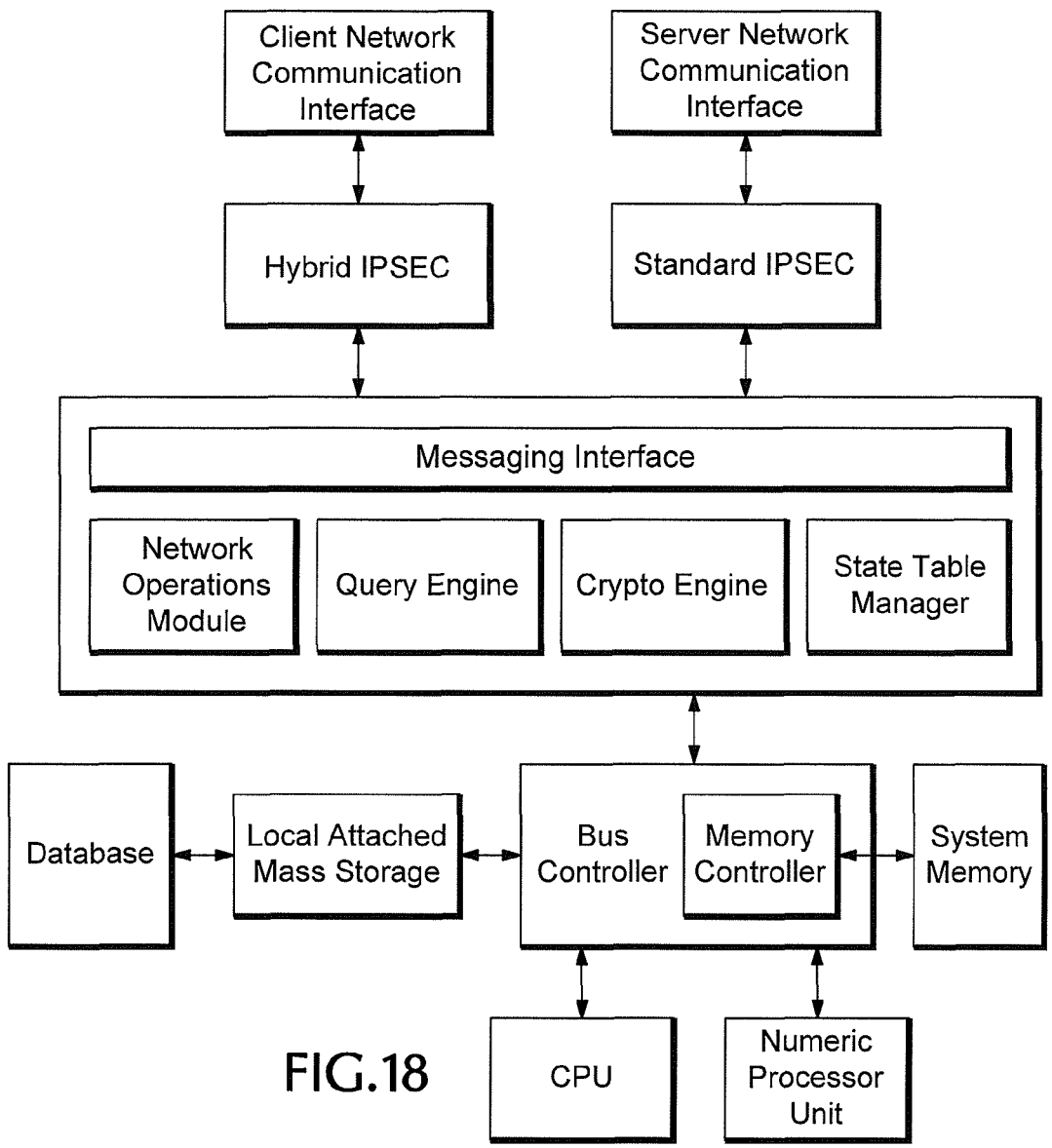
FIG. 18 shows a network operations module can be used in the Proxy Authentication Network of FIG. 1.
Figure 19:
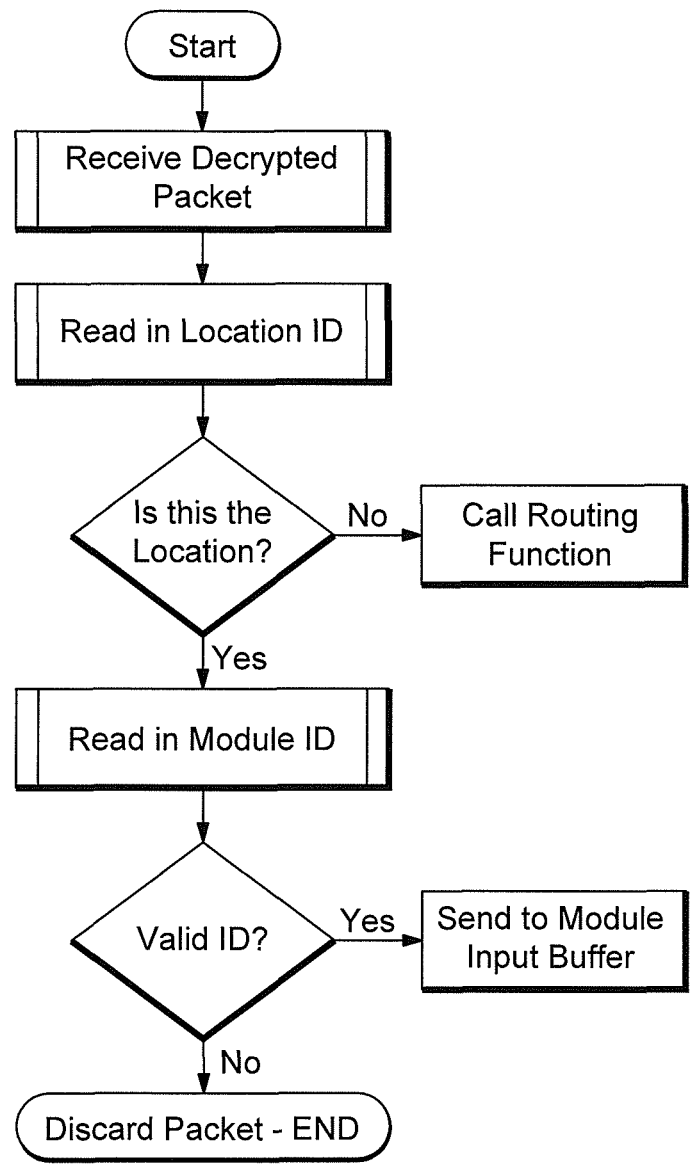
FIGS. 19-20 show the operation of the messaging interface of FIG. 18.
Figure 20:
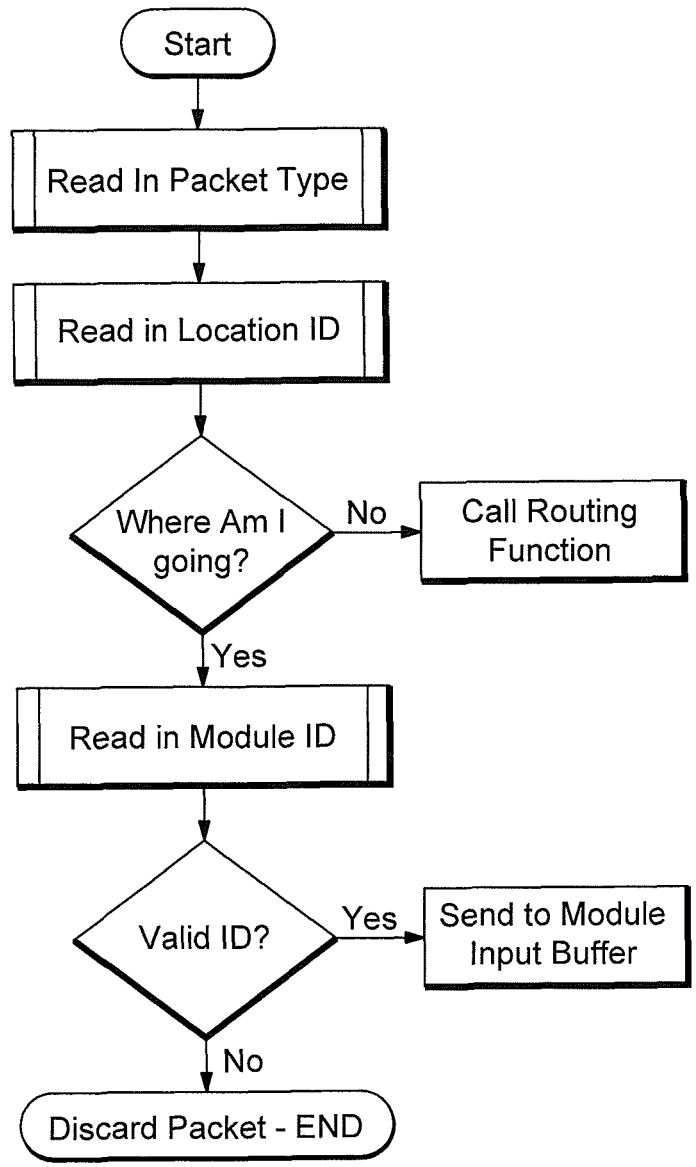

The node access server functions as a "reverse firewall" to the proxy authentication network for client requests. Unlike most firewalls, the IP stack is modified to only allow traffic from client data packets. In a normal firewall, as a connection is made to a resource outside the firewall a table as in IPF or OpenBSD's pf the software maintains a connection table. In a node access server, the table is reversed and contains authenticated device identifiers. In FIG. 18, the Hybrid IPSec process examines the packet to see if it has a valid construction. In IPv4 to IPv6 tunneling it also performs fragmentation and reassembly. Upon determining the packet is valid it hands the packet to the messaging interface. The messaging interface examines and optionally decrypts the payload and determines what to do with it. In FIGS. 19 and 20, the two variants are depicted. Those skilled in the art will see that the scheme involves examining the packet and if it is not destined to the location, that is the server performing the processing, the packet is sent on to the appropriate location. In the case of a node access server, the packet is reconstructed, effectively preventing communication from a client to any other server except a node access server. This is a function of the Proxy Authentication Network.

Key Generation Server

Figure 21:
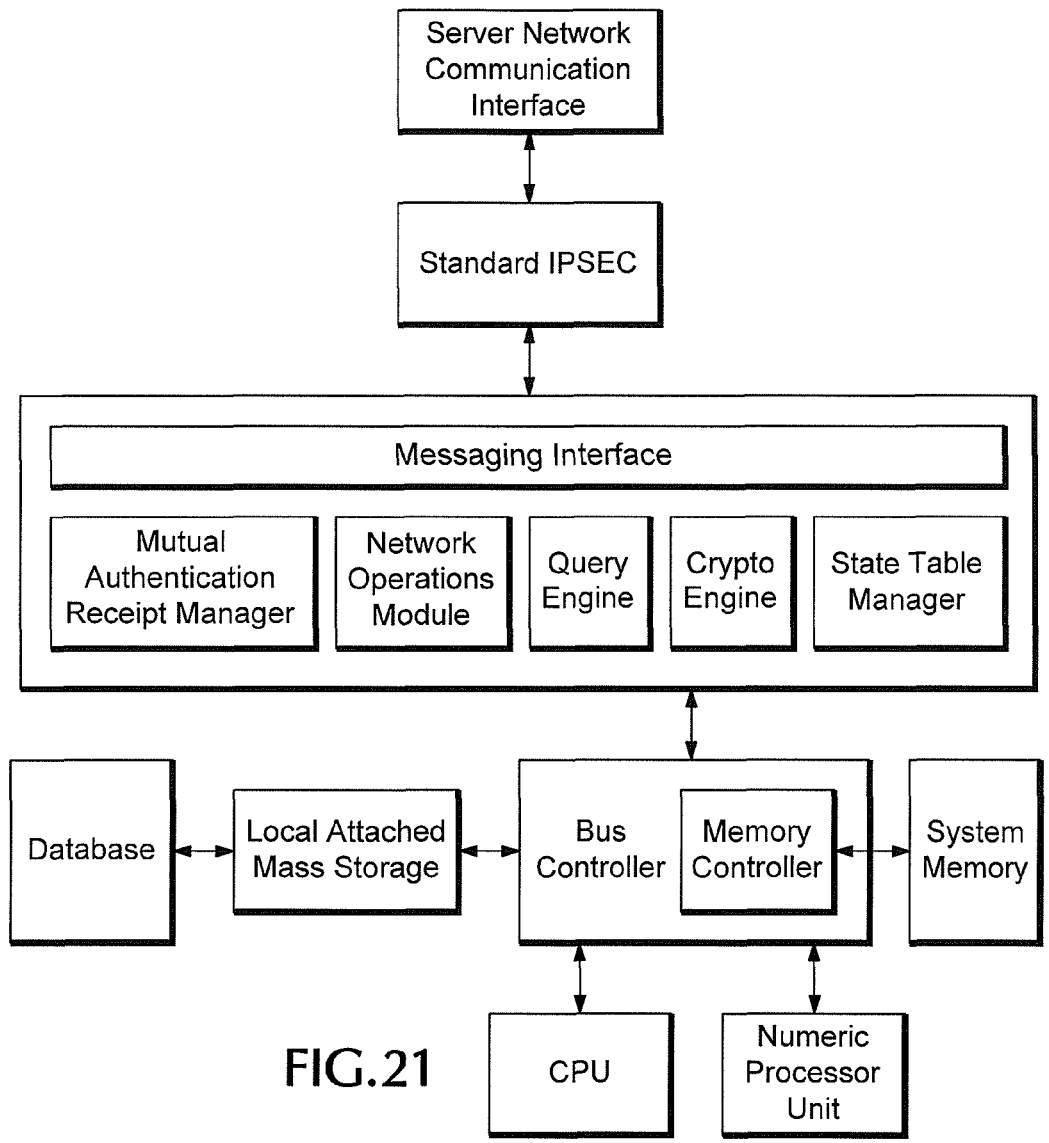
FIG. 21 shows key generation in the Proxy Authentication Network of FIG. 1.

FIG. 21 depicts the difference in functionality from the other servers. The node access server performs client and device routing and authentication. The key generation server is where the pairing of entity credentials to device takes place. It also confirms requests for an entity authentication and generates mutual authentication receipts. FIG. 25 depicts the construction of the receipt containing the information necessary to allow access to data or a master entity credential.

Storage Access Server

Figure 22:
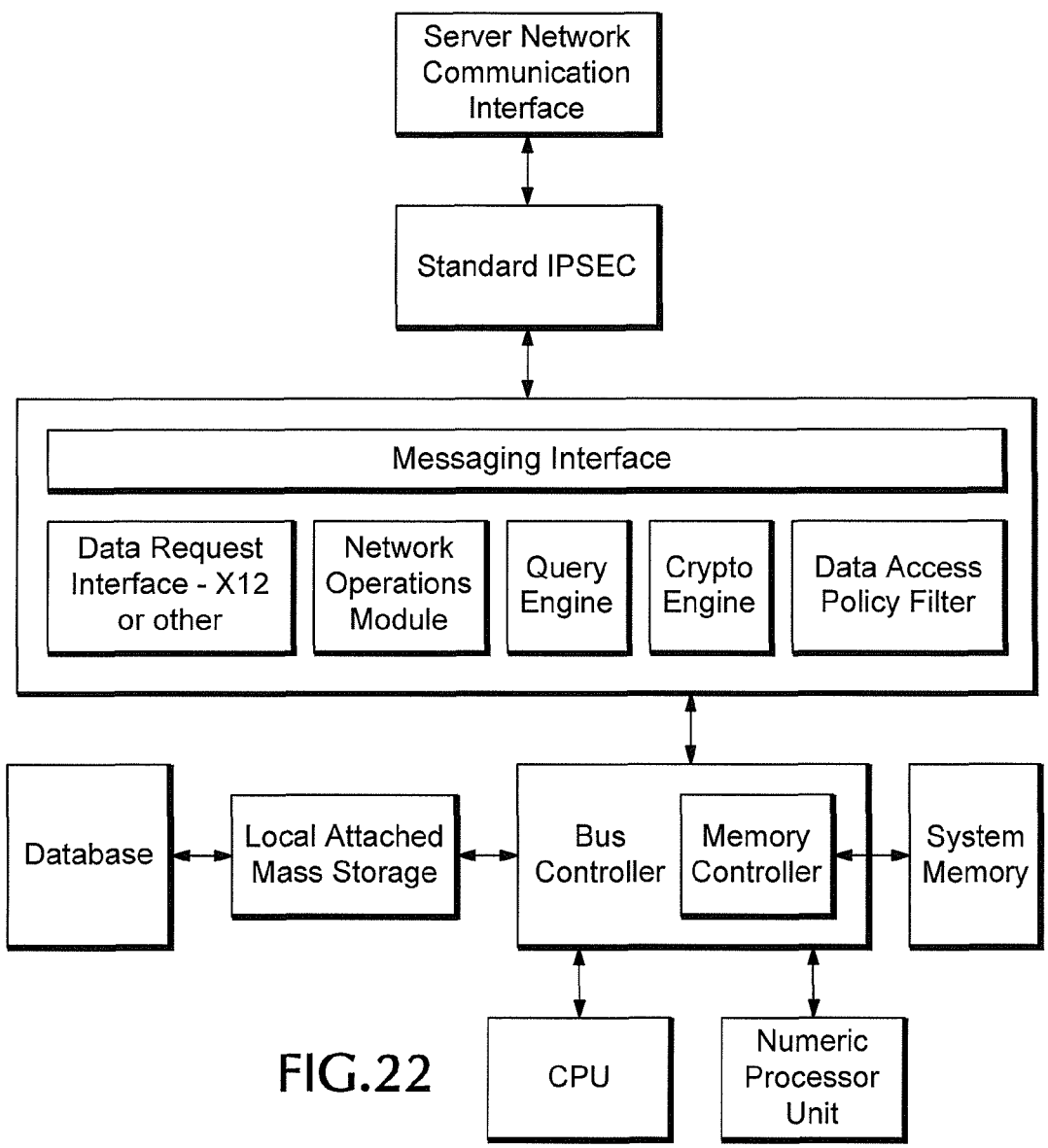
FIG. 22 shows the storage access server in the Proxy Authentication Network of FIG. 1.

FIG. 22 depicts the difference in functionality from the other servers. The Data Access Policy Filter is the component that manages requests for data. The database is queried for the appropriate string and if the entity string exists, the appropriate level of access is granted. In the case of a business or other entity a sub table of strings linked to the entity master table and is queried as well. After determining the request for data is from a valid entity, the request is passed to the Data Request interface where appropriate processing takes place based upon the type of request received.

ESP Packet Construction

Figure 26A:
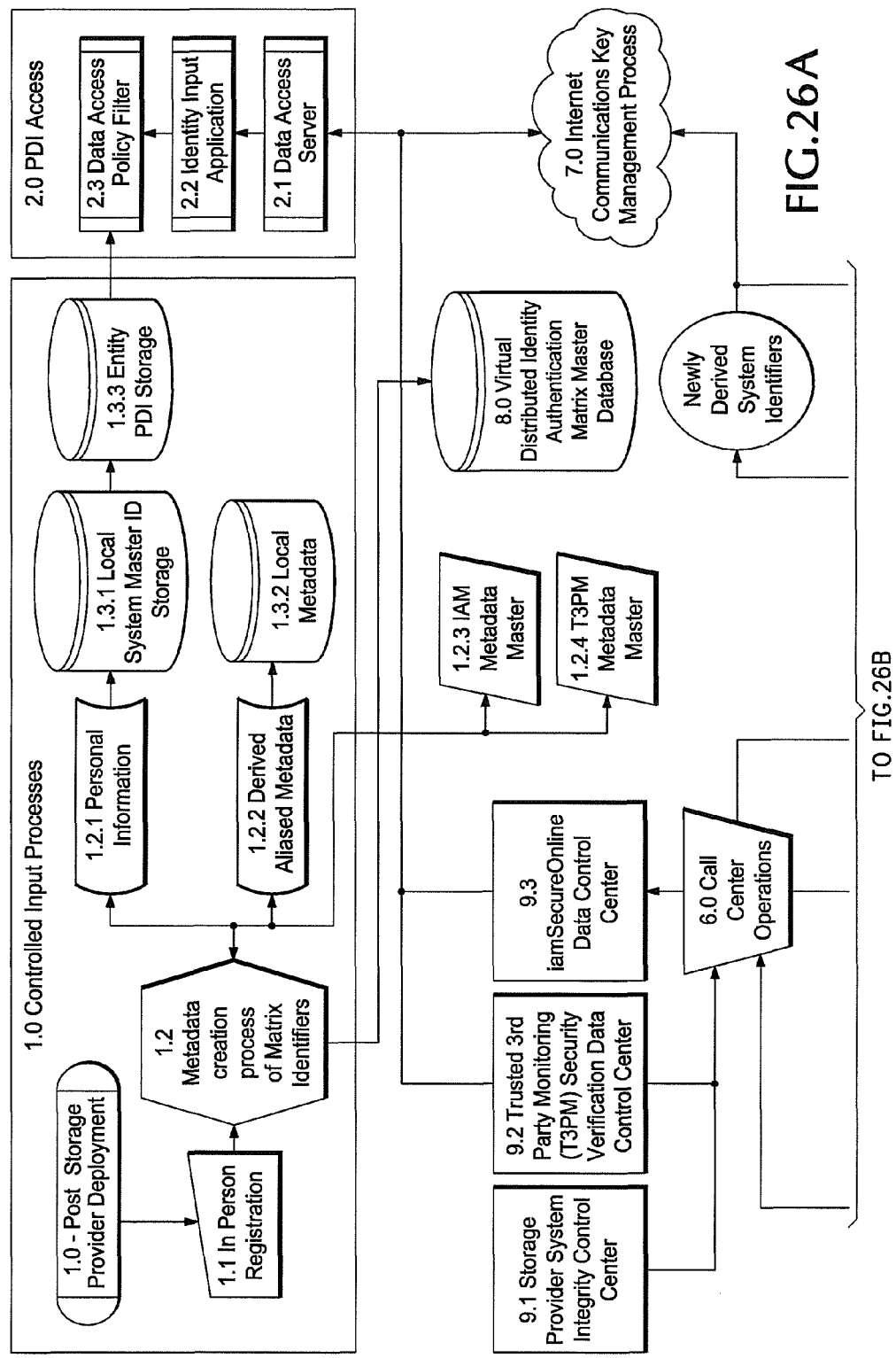
FIGS. 26A-26B show a method of use of the Proxy Authentication Network of FIG. 1.
Figure 26B:
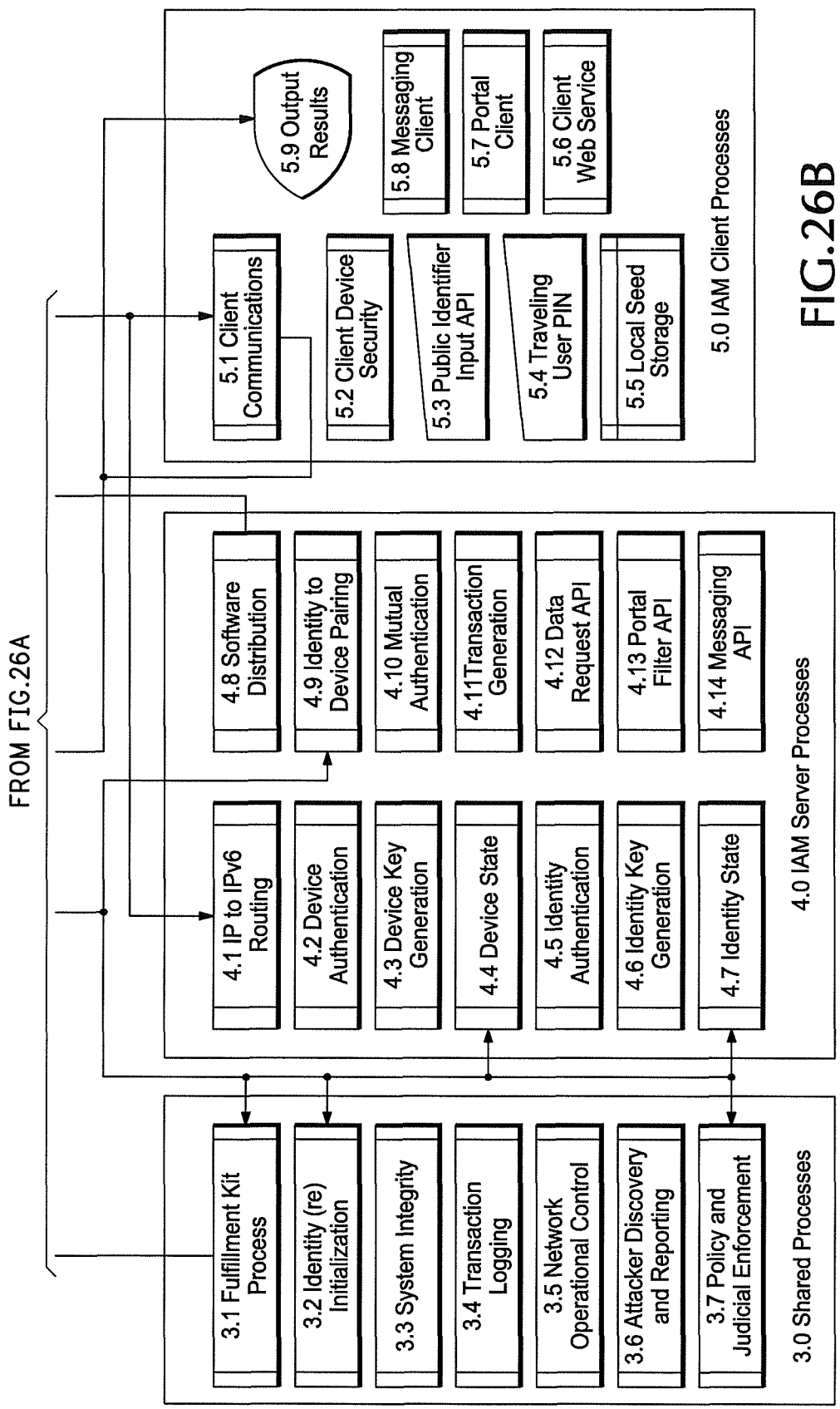

The Encapsulated Security Payload (ESP) is depicted in FIG. 23. A packet validation bit is used to verify the packet was constructed by an authenticated device. Within the Hybrid IPSec stack is an algorithm that allows this value to be calculated. The location identifier is the destination of the packet. The module ID is used by the messaging interface to determine which software module needs to process the rest of the packet. The Packet Type is an instruction for the destination module. The ID payload is used when processing device or entity identifiers. The validation ID is used in various ways to determine the validity of the instruction or the identifier. A portion of the packet is reserved for future use in a contemplated messaging application programming interface for signing messages and a contemplated portal surfing interface to be used in combination with the age group identifier. These are depicted in FIGS. 26A-26B at 4.13 and 4.14. The matching client functionality is depicted at 5.7 and 5.8. The benefit of having a unique signing of a message is that an audit trail can be used. The benefit of portal surfing allows sites to maintain a content rating that can be tied to the age group identifier.

Client Operations

Software Startup

Figure 27:
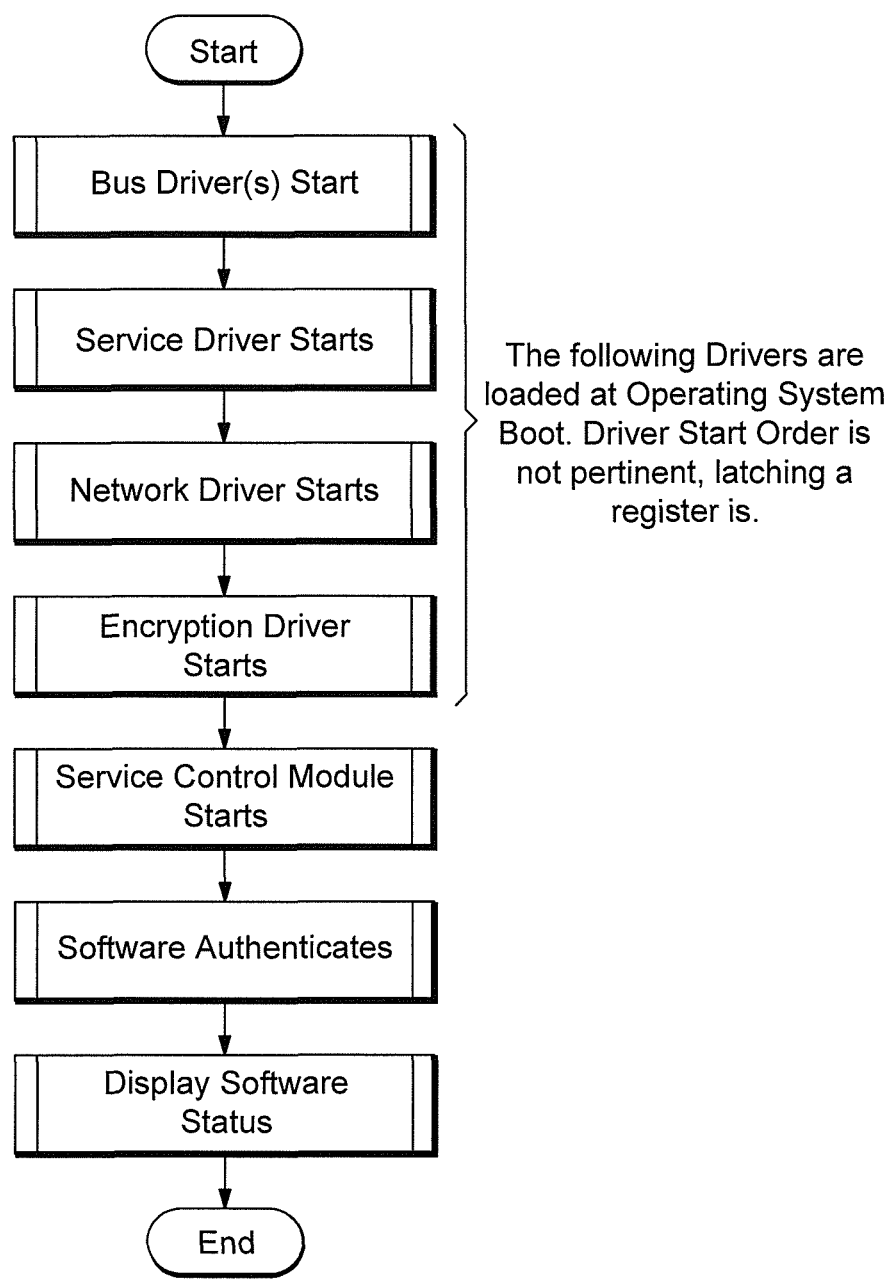
FIG. 27 shows the start-up process for a client using the Proxy Authentication Network of FIG. 1.
Figure 28:
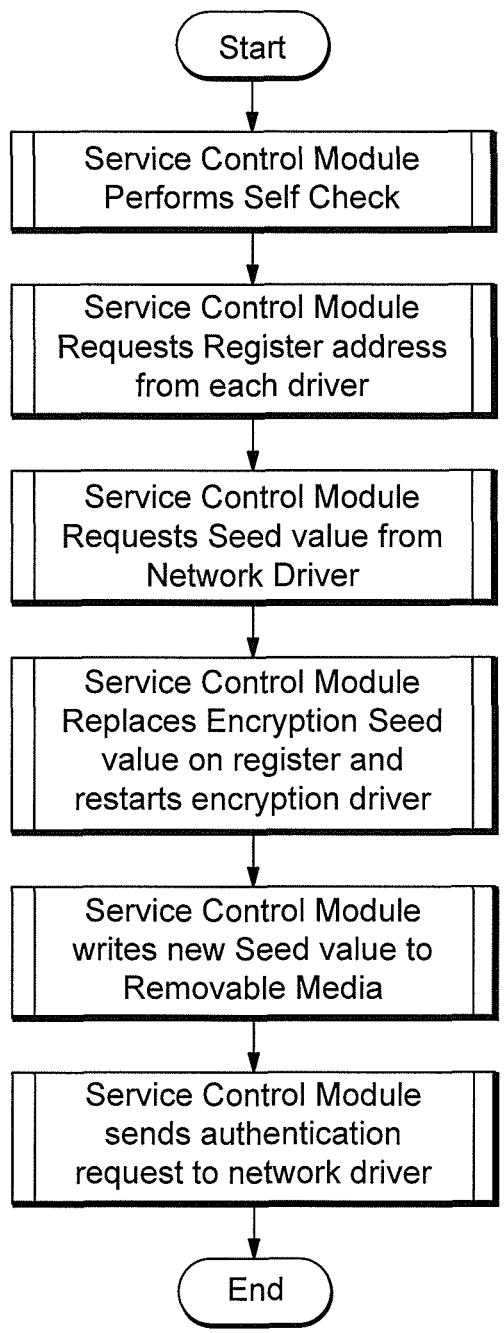
FIG. 28 shows the start-up process for a service control module in the Proxy Authentication Network of FIG. 1.
Figure 29:
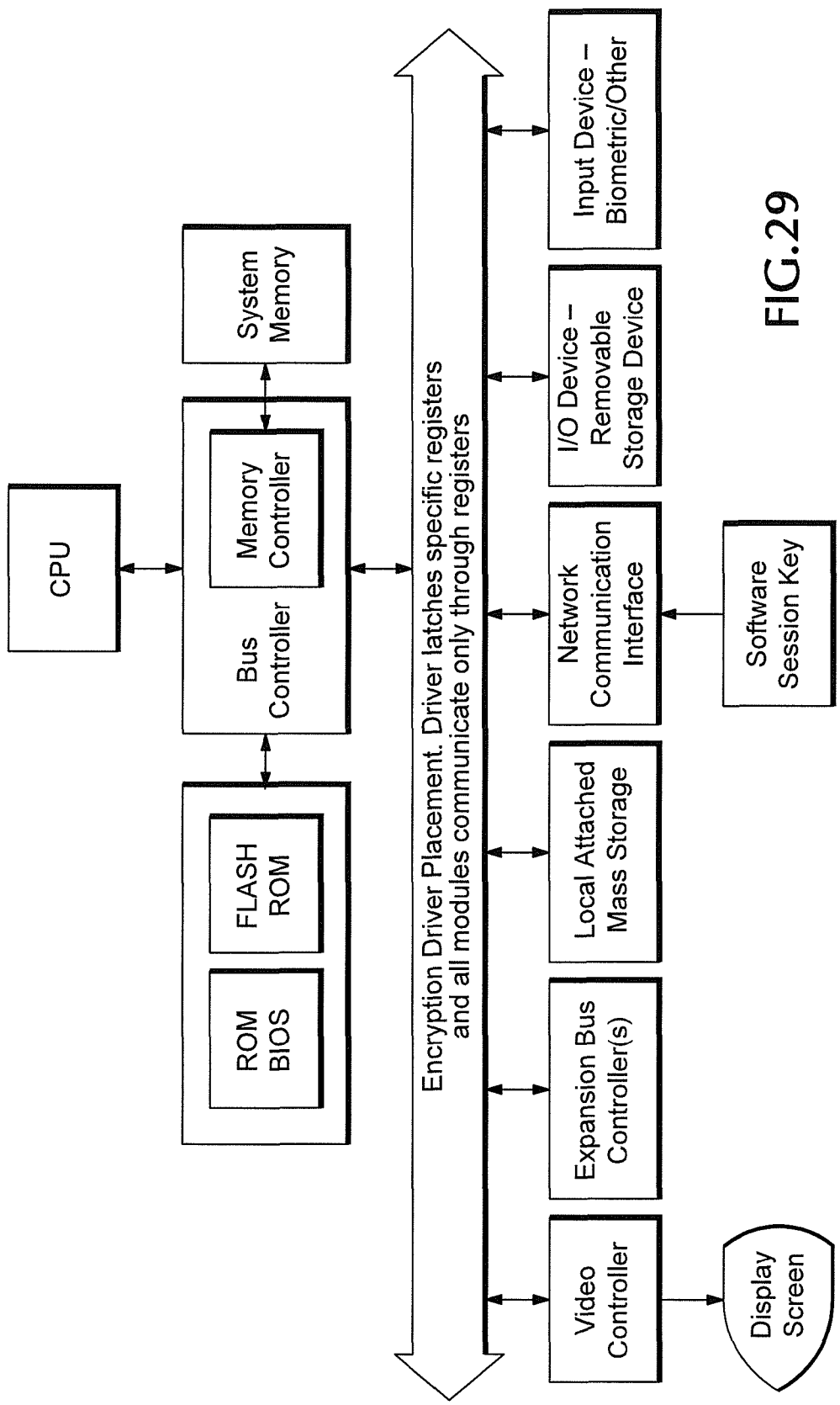
FIG. 29 shows the location of the encryption driver in a personal computing using the Proxy Authentication Network of FIG. 1.

In FIG. 27, the various components of one embodiment are depicted. The drivers are started with the operating system to provide a greater degree of protection. The other reason for this is because each driver will latch a register and be prepared for the calling of the driver from the service control module. The drivers await instruction from the service control module after operating system boot. Once the service control module starts as depicted in FIG. 28, the software authenticates to the node access server in a process separate from device authentication. In this process, the software receives seed values for the encryption process that is optionally running on the client device. The diagrams depict a typical personal computer software installation. The seed value is a method for determining that device or network changes have not affected the communication process. This is used in normal operation when all device and network identifiers are determined to be the same as the last device authentication. All movement of identifiers are encrypted in RAM on the client device in this embodiment. FIG. 29 depicts the location of the encryption driver relative to a personal computer. This allows control of the calls from the software. Values are written encrypted into system memory for storage and data that is to be processed by the CPU can be written directly or subsequently unencrypted from system memory before the CPU performs an operation. Additionally, the encryption driver can detect intrusions into the process. Address registers are used to pass the data.

Figure 31:
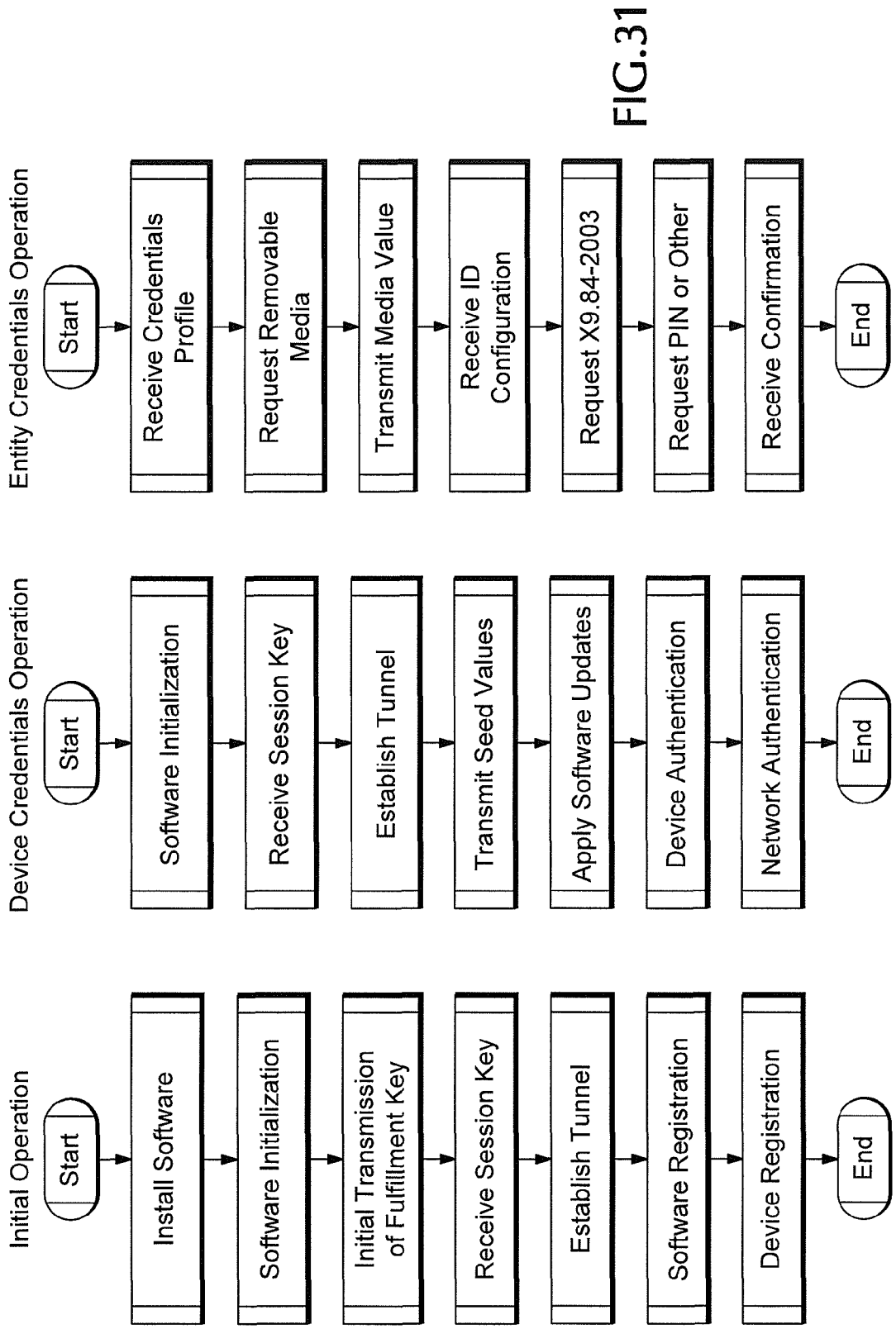
FIG. 31 shows the start-up process for a client using the Proxy Authentication Network of FIG. 1.
Figures 32, 33:
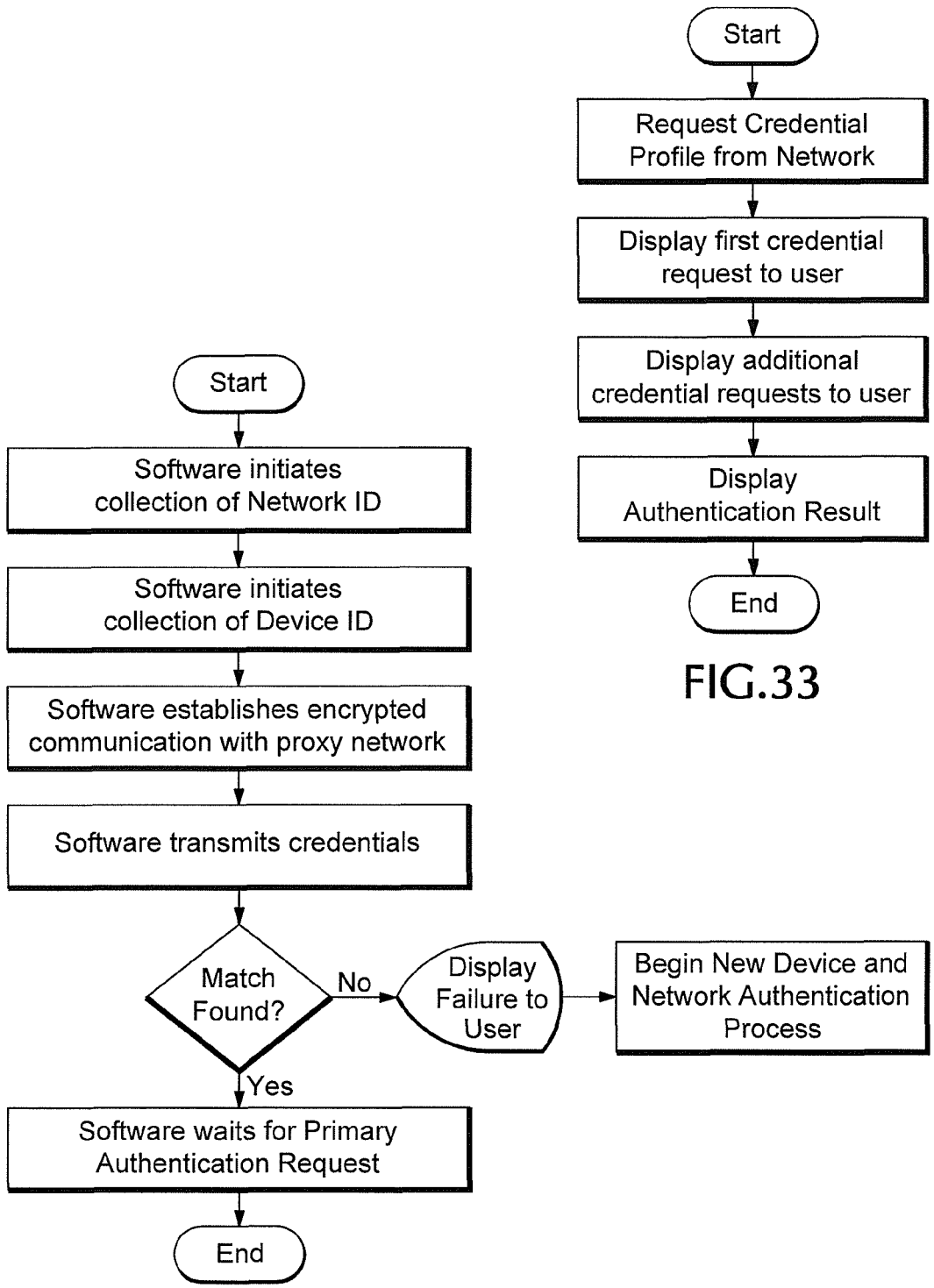
FIG. 32 shows an initial credential process using the Proxy Authentication Network of FIG. 1.
FIG. 33 shows a primary credential process using the Proxy Authentication Network of FIG. 1.

The operation of the startup, device and entity software processes are depicted in FIG. 31. For the device to begin an entity authentication the process depicted in FIG. 32 are performed.

"One Off" Mathematics

One off math is an obfuscation of keys and a client/server process to generate a new key based on a preliminary calculation from the client side. This is used to prevent someone from creating a digital copy of the data and programs comprising a client machine or authentication device and submitting those values from a different piece of hardware. Without the actual seed value that is derived from the hardware used in the first authentication process, the algorithm in place on the client side encrypting program will not create the correct identifier thereby invalidating the data received by the server.

Those skilled in the art will see that this process may be implemented in a variety of ways. For example, after a secure communication channel is created using the keys generated from an out of band authentication, during the initial device registration process, the client program can generate values derived from one or more addressable hardware components such as a processor serial number, hard drive serial number, trusted platform module or such combination. Each value generated can be stored in a locked register of the processor. As long as no other program attempts to read the values in the locked register, the client program can then securely transmit these original values from the locked register to a server where it is stored. A server process can then generate a second value using the original device registration process values that are used by the client encryption process which is then stored on the client. During subsequent authentications of the device, the client uses the server generated values and the values it generates from a hardware detection process that is based on the new values, and transmits them to a server process that can then use these values to determine whether the data transmitted is in fact coming from the same hardware device. This same process can be used in validating the authentication device process. Those skilled in the art will readily see that this process could be implemented in a variety of methods including downloading a replacement client encrypting executable program that stores the values required to arrive at the required value or other such implementations. In this manner, the client generates values derived from hardware that are securely transmitted to the server, and a server process creates new values derived from those values that are sent back to the client. With subsequent authentications of the device, the client uses a different process using the values sent from the server to generate values which are sent back to the server and run against a server process that functions similar to a checksum.

Entity Authentication

Figure 30:
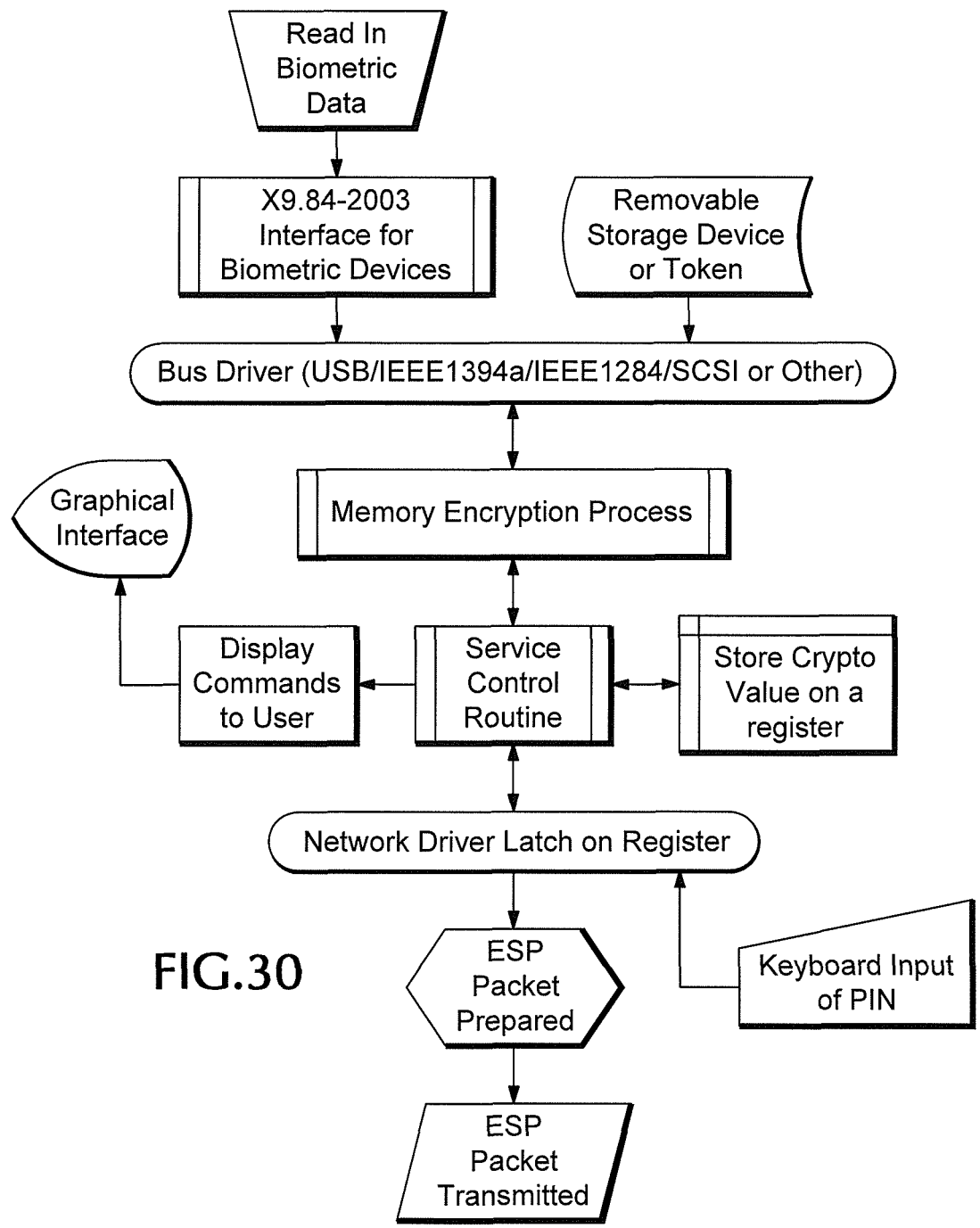
FIG. 30 shows an identity credit input process using the Proxy Authentication Network of FIG. 1.

When an authentication is called by an application, under control of the entity, through the Identity Announcement Protocol, the process depicted in FIG. 33 begins. Another example of this process is depicted in FIG. 30. Those skilled in the art will see that the credentials are configured by the user, unlike other systems that require a specific credential to operate. This drawing also depicts the client encryption process in relation to the gathering of the credentials required by the identity credential profile.

Web Server or Application Configuration

As business entities requesting authentication will most likely host on a web or other application server, certain adjustments to the identity pairing need to take place. As all software objects, devices and entities are at all times authenticated when requesting data from another entity, a subclass table for a software entity is maintained in the tables. As above the device hosting the application is authenticated. However, on a web server hosting multiple sites, each site must be authenticated separately. This is performed by modifying the service control module and installing a DLL or other software for each site that authenticates each request individually. The software module would be a DLL in Microsoft IIS or an event sink in Apache. Those skilled in the art have created many methods for identifying software to an application. The only difference in embodiments of the invention for an application server is that more than one entity may use more than one device for authentication but only one set of credentials exists for the server.

When starting the server, and before the service control module accepts input from the various applications, a person must provide credentials to authorize each software application. While this may done in one credential input process, out of band authentication will be required to facilitate the pairing of software module to entity. When delivering a software module for an application, the DLL or called code from an event sink will have compiled into the server a unique encrypted identifier. This is process authentication and is another embodiment of the invention.

Errata

Most in use protocol designs, TLS, ISAKMP or other, typically employ methods for peer-to-peer communication protocol. There is a preliminary exchange in order to exchange secrets for communication. In addition nearly all cases the initial exchange is a form of asymmetric cryptography (Diffie-Hellman, El-Gamal etc) which for small devices introduces a computational overhead. In the Proxy Authentication Network all communications already contain the required information and no handshake or key exchange negotiation is required as the packet is introduced through a different medium than across the network. In one embodiment the client software will receive a seed value from a call center that is typed in by the user. The software contains what is expected at the server or further communications is blocked for a determinate amount of time. Upon a denial the party is sent a message with a reactivation number and a credential based call to a call center that interacts with the system to deliver the secret to the client and server. Further communication to the IP address is appended to the "drop table". In the case of this failure a notice acts to create a new identifier that is transmitted to the node access server.

In a security enabled environment, in order to protect the information, there can not be a reliance on peer negotiation as the devices upon which they are communicating are not authenticated. By introducing a third or even fourth party, in the system monitoring and assisted authentication function, the party of the first part interacts with the party of the second part by sharing information with a bi-directional unilateral authentication proxy between the parties of the third part and the party of the fourth part and so on as the desired level of authentication communication security is desired. The invention could also be simply a party of the third part acting solely as proxy to authenticate the user and device on behalf of the party of the first part and the party of the second part. In this way the parties' ability to access pre-encrypted data available to the system requires all parties to participate.

In any case where a network communication between two hosts require a session to take place, the packet expected by the server is pre-authenticated in a separate process for immediate key exchange setup. This is a shared secret distribution method. The separate process could include any process that allows the delivery of the packet outside of the network communication process. For example, the packet could be distributed on a compact disc medium along with client software to install on the target device. The communication server database is updated with an expected packet. In another frame of reference Alice and Bob need to authenticate securely. Alice and Bob are each given a matching session key from a trusted third party Carmen and pass messages through trusted third party Diaz who is already trusted by Carmen. The actual data is stored at Evelyn. Carmen and Diaz both authenticate requests to Evelyn for data on behalf of Alice and Bob.

The syntax of the IP Authentication Header is shown in Table 1.

TABLE 1

| Next Header | Length | RESERVED | |
|---|---|---|---|
| | Security Parameters Index | | |
| | Authentication Data (variable number of 32-bit words) | | |
| 1 2 3 4 5 6 7 8 | 1 2 3 4 5 6 7 8 | 1 2 3 4 5 6 7 8 | 1 2 3 4 5 6 7 8 |

The diagram above denotes an AH header. In the contemplated Hybrid protocol embodiment the Security Association and the SPI is already determined and other SPI parameters are removed from the protocol stack table of associated security parameters. The system utilizes the SPI internally for verifying the external appended SPI bit by also adding the SPI bit to the ESP packet. The AH carries the ESP packet (Encapsulated Security Payload) that contains credential data.

The online resource "Webopedia" defines proxy server as "A server that sits between a client application, such as a Web browser, and a real server. It intercepts all requests to the real server to see if it can fulfill the requests itself. If not, it forwards the request to the real server." Proxy servers are useful for caching content to accelerate the requests and for filtering requests. Some proxy servers support authentication, that is before the request is accepted, the client application must prove it is authorized to request the information.

The proxy authentication network is a server or plurality of servers that functions to proxy authentication requests for confirming the credentials of an entity or plurality of entities where under control of a client or server where the device accessing the medium or software making the request is authenticated to the proxy authentication network, the verification of the credentials under control of the proxy authentication network, authenticates or mutually authenticates one or more entities prevents more than one instance of the entity credentials to be used by more than one device accessing the proxy authentication network at one time stores encrypted entity data whose decryption keys are under control of one or more trusted servers or plurality of servers controls the access to said entity data on behalf of the authenticating entity or entities.

EXAMPLE IMPLEMENTATION

Figure 35:
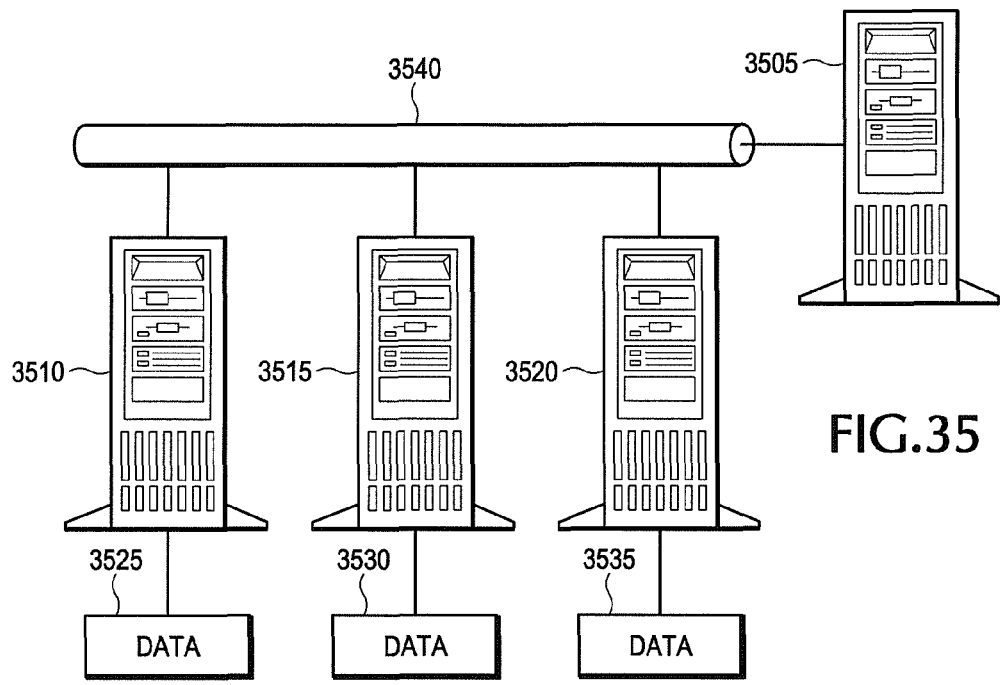
FIG. 35 shows various computers connected to the Proxy Authentication Network of FIG. 1.

FIG. 35 shows various computers that are part of the Proxy Authentication Network of FIG. 1. In FIG. 35, server 3505 is responsible for performing authentication. As such, server 3505 can store the various tables shown in FIGS. 5-9, among other data. Storages 3510, 3515, and 3520 store data for entities. This data, such as data 3525, 3530, and 3535, can be personally identifying data that entities do not want released except under specific circumstances. Server 3505 and storages 3510, 3515, and 3520 are shown as connected by a single network 3540. But a person skilled in the art will recognize that different networks can be used to connect server 3505 and storages 3510, 3515, and 3520. Further, although storages 3510, 3515, and 3520 are shown as connecting directly to server 3505, a person skilled in the art will recognize that the connections can be configured in any manner desired (for example, server 3505 can be directly connected to storage 3510, which can act as a gateway to storages 3515 and 3520).

Once a subscriber is registered with server 3505 and has data stored in one (or more) of storages 3510, 3525, and 3515, the subscriber can then perform any desired transaction. While such transactions often include the transfer of money for some reason, a person skilled in the art will recognize that any exchange can be negotiated using the Proxy Authentication Network, not just a transfer of money. For example, as discussed above with reference to FIGS. 14-15, the exchange can involve communications (that is, the exchange of information/data).

Figure 36:
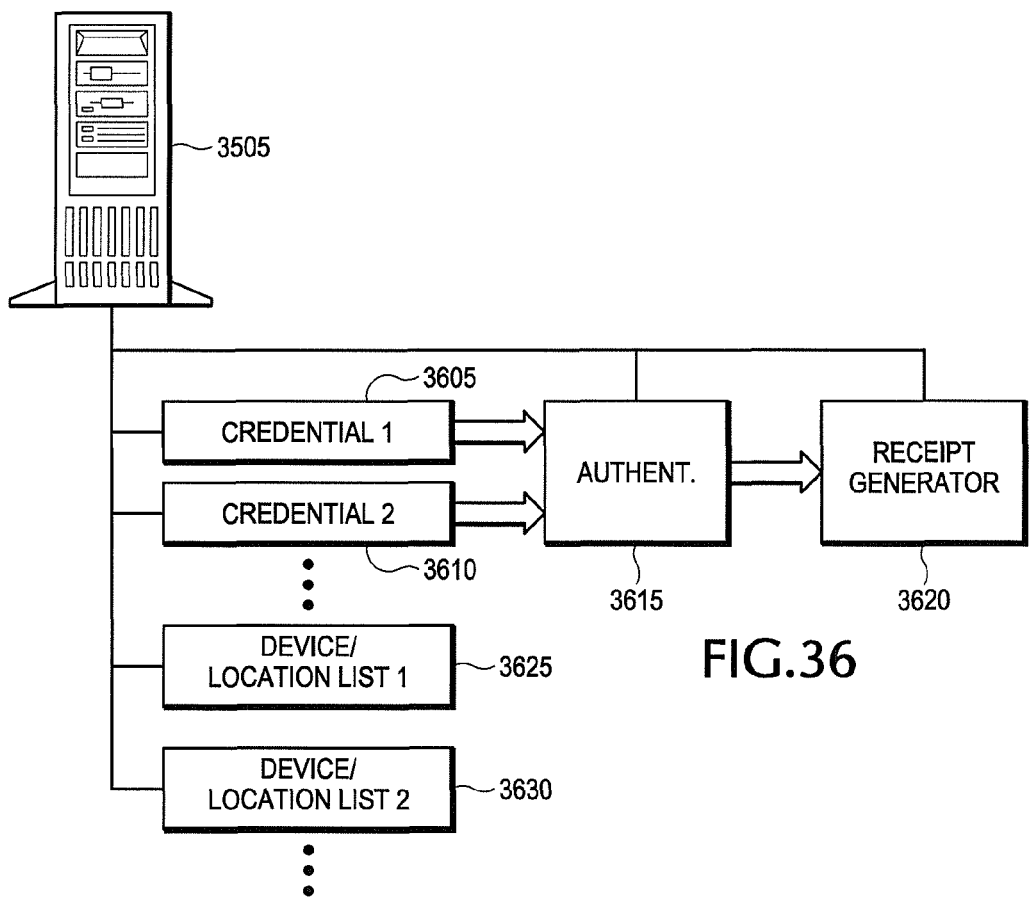
FIG. 36 shows the server of FIG. 35 storing credentials used to authenticate an entity.

FIG. 36 shows the server of FIG. 35 storing credentials used to authenticate an entity. In FIG. 36, server 3505 is shown as storing credentials 3605 and 3610. These credentials can be used to authenticate entities. To support this authentication process, server 3505 includes authenticator 3615. When an entity needs to be authenticated, the appropriate credential is located and used by authenticator 3615 to authenticate the entity. Server 3505 also includes receipt generator 3620, which is used to generate a receipt that identifies the subscribers to the system. The receipt generated by receipt generator 3620 is designed to identify the subscribers without providing any personal identifiable information about either of the subscribers. Although FIG. 36 shows only two credentials for two subscribers, a person skilled in the art will recognize that server 3505 can store credentials for any number of subscribers, and that receipt generator 3620 can generate a receipt for any number of subscribers in a transaction.

Server 3505 is also shown as including device/location lists 3625 and 3630. Device/location lists 3625 and 3630 identify combinations of devices and locations that are recognized for individual subscribers. For example, device/location list 3625 can identify recognized combinations of devices/locations for one subscriber, and device/location list 3630 can identify recognized combinations of device/locations for another subscriber. To provide some examples of recognized device/location combinations, one such combination might be a cell phone used at a particular ATM location. Another combination might be a personal computer using a particular IP address. A person skilled in the art will recognize other device/location combinations that can be used in the Proxy Authentication Network.

Figure 37:
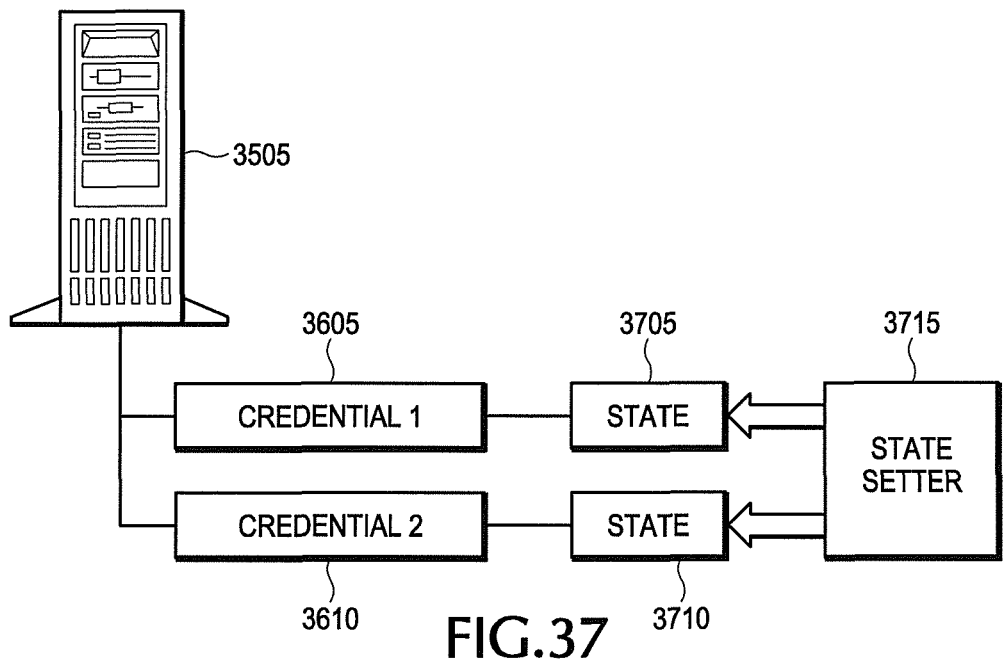
FIG. 37 shows the states of the credentials of FIG. 36 being changed.

FIG. 37 shows the states of the credentials of FIG. 36 being changed. Credentials 3605 and 3610 are shown as including states 3705 and 3710, respectively. Valid states for credentials 3605 and 3610 can include "in use" and "not in use". When a credential is in a "in use" state, the subscriber is currently using the Proxy Authentication Network for some purpose. By changing the state of the credential, the credential cannot be used at two places at the same time, which helps to protect against unauthorized duplicate use of the credential. Thus, when a subscriber begins an authentication using a credential, the Proxy Authentication Network sets the state of the credential to "in use". When a credential is in a "not in use" state, the credential is available for authentication of a subscriber, although no current authentication is being performed. The Proxy Authentication Network can change the state of a credential to "not in use" upon a direct instruction from a subscriber, or the Proxy Authentication Network can wait until the transaction is completed (or some interval thereafter).

To support changing a credential's state, server 3505 includes state setter 3715. State setter 3715 is responsible for changing states 3705 and 3710 as needed. As discussed above, the state can be changed during the use of the system. But the state of the credential can also at the direction of a subscriber. For example, a subscriber could instruct the system to disable use of the credential. In that case, the credential would not be available for authentication of the entity until the system is instructed to use the credential again.

Figure 38:
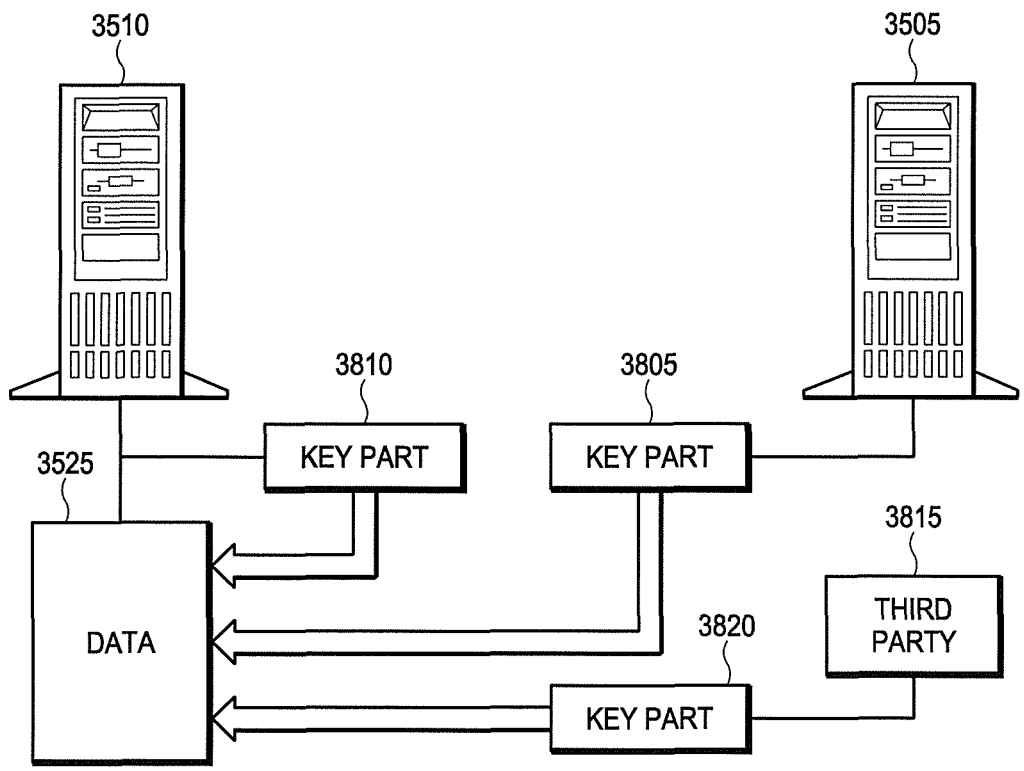
FIG. 38 shows an encryption key being assembled from various portions in the Proxy Authentication Network of FIG. 1.

FIG. 38 shows an encryption key being assembled from various portions in the Proxy Authentication Network of FIG. 1. In FIG. 38, various portions of the key are retrieved from different locations. For example, part 1 3805 of the key is shown as being stored by server 3505, part 2 3810 of the key is shown as being stored by storage 3510, and part 3 3815 of the key is shown as being stored by third party 3815. Because the key is divided among several parties, no one party can decrypt the data individually. Storage 3510 receives the various portions of the key, and assembles them into the complete key. Data 3525 can then be decrypted.

Figure 39:
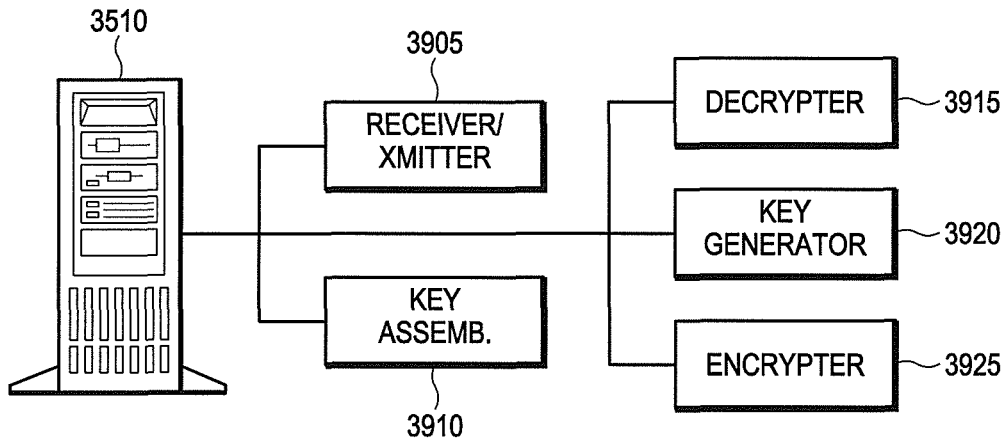
FIG. 39 shows components of the storage of FIG. 35 used in accessing data in the storage.

FIG. 39 shows components of the storage of FIG. 35 used in accessing data in the storage. Storage 3510 includes transmitter/receiver 3905, key assembler 3910, decrypter 3915, key generator 3920, and encrypter 3925. Transmitter/receiver 3905 is responsible receiving and transmitting information to and from storage 3510. For example, transmitter/receiver 3905 receives the parts of the key stored by other parties, and transmits the data (once accessed and suitably encrypted) to an appropriate party. Key assembler 3910 is responsible for assembling a key from the various portions. The assembled key can then be used by decrypted 3915 to decrypt the data.

Key generator 3920 is responsible for generating a new key that can be used to re-encrypt the data. The reason that the data is decrypted and then re-encrypted is that the original key remains secure: the new key can be used to encrypt the data for transmission to a party who is supposed to receive the data. To support this, encrypter 3925 can use the new key to re-encrypt the data.

In one embodiment, the new key generated by key generator 3920 is provided to the party in some secure manner. In another embodiment, the new key is generated based on data known to the both storage 3510 and the receiving party, so that the party can generate the key and decrypt the received data. In this embodiment, the key is generated can be partly generated based on additional data, which can be provided to the party receiving the encrypted data, and partly on data known to both storage 3510 and the receiving party. For example, the key can be generated based in part on the receipt (generated by receipt generator 3620 of FIG. 36) and some additional data (e.g., a random value). By generating a new key, the data can be protected against being viewed by an unauthorized party.

Figure 40A:
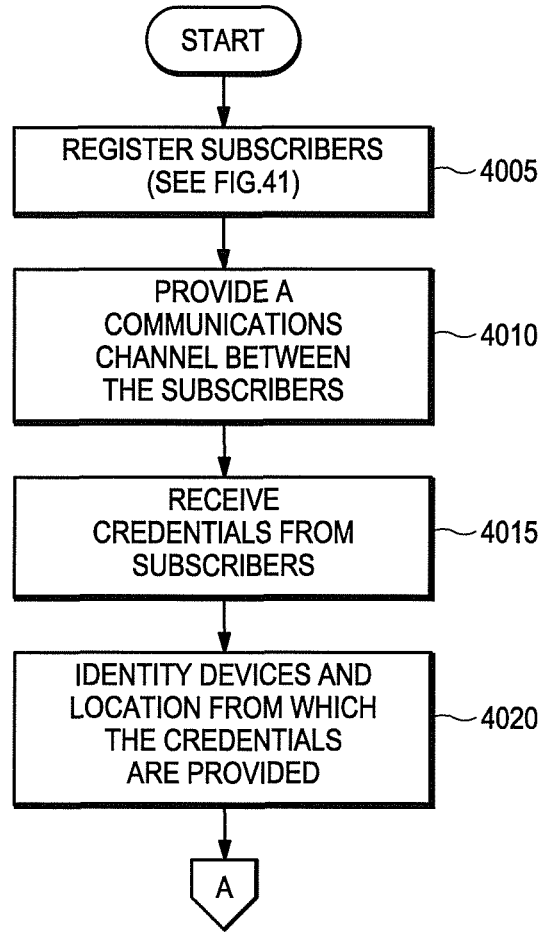
FIGS. 40A-40C show a flowchart of the procedure to authenticate an entity in the Proxy Authentication Network of FIG. 1.
Figure 40B:
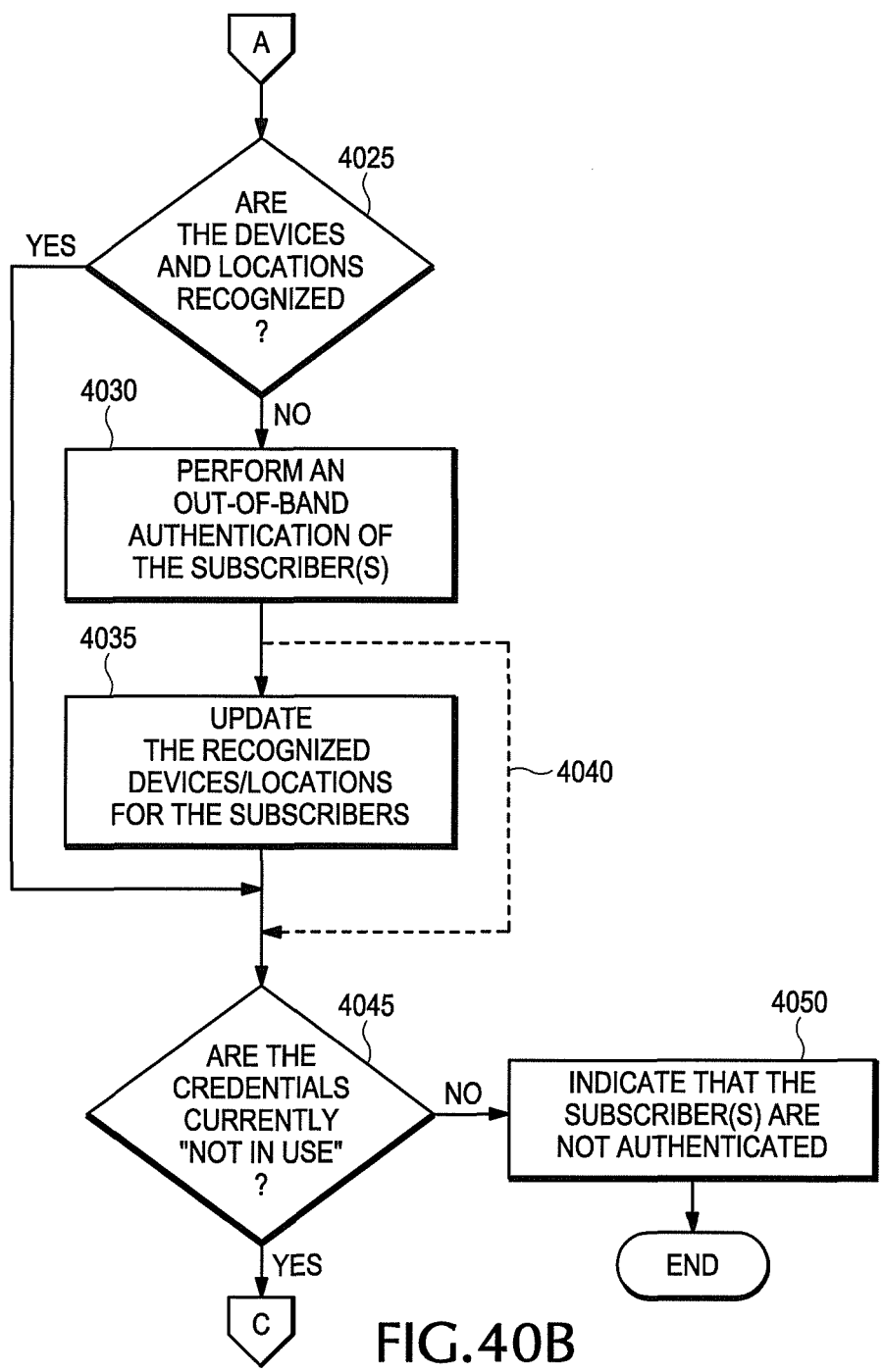
Figure 40C:
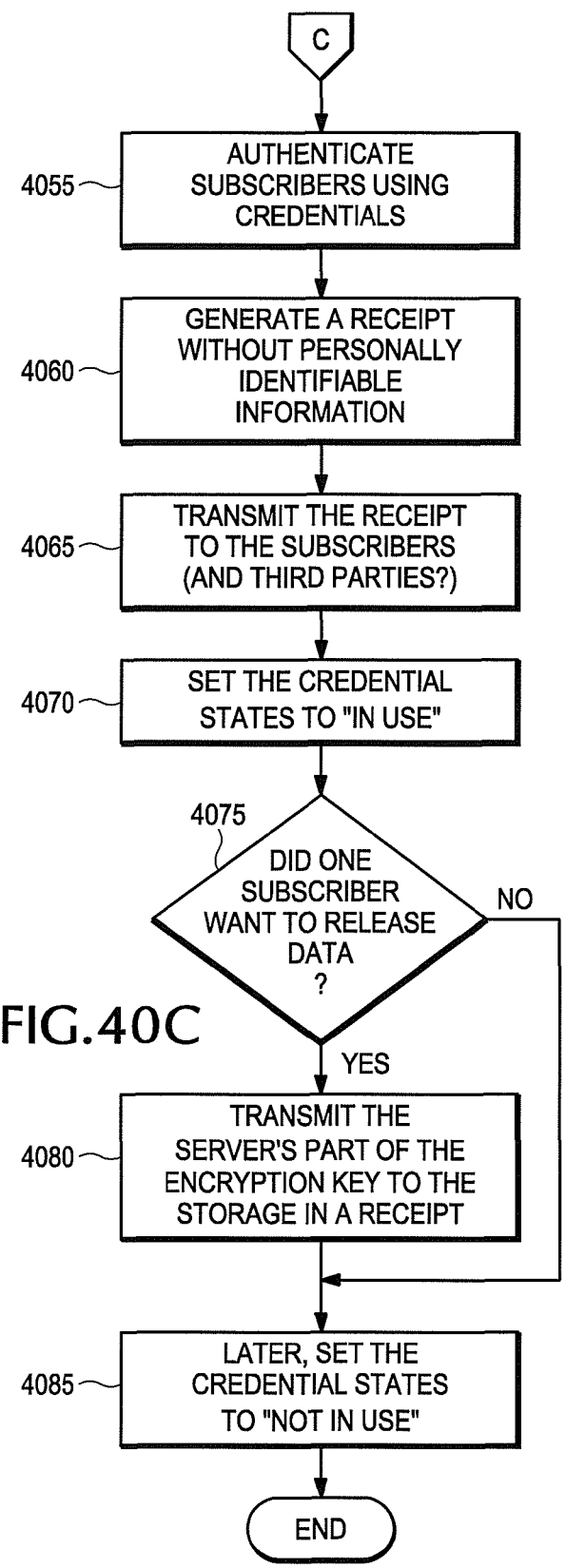
Figure 41:
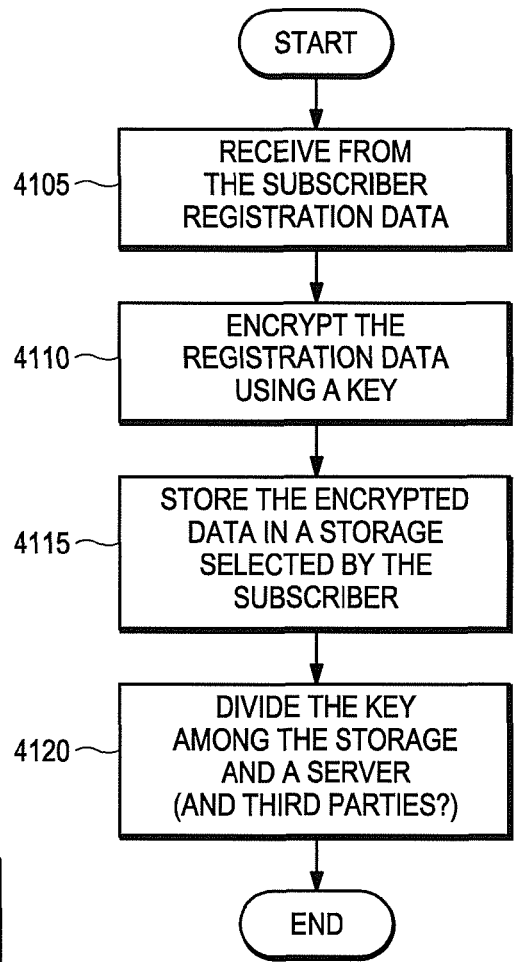
FIG. 41 shows a flowchart of the procedure to add data to a storage in the Proxy Authentication Network of FIG. 1.

FIGS. 40A-40C show a flowchart of the procedure to authenticate an entity in the Proxy Authentication Network of FIG. 1. In FIG. 40A, at step 4005, the Proxy Authentication Network registers subscribers. Details about how subscribers are registered is shown in FIG. 41. At step 4010, a communications channel is established between the subscribers. At step 4015, the Proxy Authentication Network receives credentials from the subscribers, and at step 4020, the Proxy Authentication Network identifies the devices and locations the subscribers are currently using.

At step 4025 (FIG. 40B), the Proxy Authentication Network checks to see if the device/location combinations are recognized (that is, in the list of registered devices/locations for the subscribers). If the device/location combination for either (or both) subscriber is not recognized, then at step 4030 the system performs an out-of-band authentication. Out-of-band authentication involves using some independent channel to authenticate the subscriber. Out-of-band authentication can be done automatically in some way (for example, using a device/location combination that is recognized), or can be done manually (involving an operator of some sort to perform the authentication). Once the subscriber is authenticated out-of-band, at step 4035 the system can update the list of recognized device/location combinations to recognize the device/location combination from which the subscriber submitted the credential. Step 4035 can be omitted, as shown by dashed line 4040.

Once the device/location combination from which the subscriber is submitting the credential is known to be acceptable, at step 4045 the Proxy Authentication Network checks that the subscribers' credentials are currently "not in use". As discussed above, if a credential is in the "in use" state, then there is the potential that someone is attempting to fraudulently use the credential. In that case, then at step 4050 the Proxy Authentication Network indicates that the subscribers are not authenticated.

If the credentials are not currently "in use", then at step 4055 (FIG. 40C) the Proxy Authentication Network authenticates the subscribers using their credentials. Once the subscribers are authenticated, then at step 4060 the Proxy Authentication Network can generate a receipt. As discussed above, this receipt is generated without including any personally identifiable information. At step 4065, the receipt is transmitted to the subscribers. The receipt can also be transmitted to other third parties who are being included in the communication. At step 4070 the Proxy Authentication Network sets the credentials of the subscribers to "in use".

At step 4075, the Proxy Authentication Network checks to see if one of the subscribers wants to release their data. If so, then at step 4080 the server transmits the portion of the encrypting key stored by the server to where the data is stored. This enables the storage to decrypt the data for transmission. Finally, at step 4085, the credentials of the subscribers are set back to "not in use". As discussed above, the credentials can be set to "not in use" either when the transaction ends, at the subscribers' direction, or after some interval (when the server assumes the transaction is complete).

FIG. 41 shows a flowchart of the procedure to add data to a storage in the Proxy Authentication Network of FIG. 1. At step 4105, the Proxy Authentication Network receives registration data from the subscribers. This registration data can be personally identifiable information. The subscriber can also provide the credential and/or the devices/locations from which the subscriber wants to be authenticated. It should be understood that the personally identifiable information is stored in storage, whereas the credential and the device/location combinations are typically stored in the server. So if the subscriber provides all of this information, then the data is partitioned based on what it is, and handled differently.

Regarding the personally identifiable information, at step 4110 the personally identifiable information is encrypted using a key. At step 4115, the encrypted data is stored. The storage for the encrypted data can be selected by the Proxy Authentication Network, or it can be selected by the subscriber (in case the subscriber has a bias about the storage of his/her/its personally identifiable information). At step 4120, the key used to encrypt the personally identifiable information is then divided. A portion of the key is saved at the storage, and a portion is saved at the server. Additional portions of the key can also be provided to third parties, as desired by the subscriber.

FIGS. 42A-42B show a flowchart of the procedure to access data in the Proxy Authentication Network of FIG. 1. In FIG. 42A, at step 4205, the storage receives a receipt of the subscriber's identity from the server. At step 4210, the storage receives a portion of the key used to encrypt the personally identifiable information from the server. At step 4215, the storage accesses the portion of the key stored by the storage. At step 4220, the storage can receive additional portions of the key from third parties. As shown by dashed arrow 4225, step 4220 can be omitted if the key is not shared among third parties.

At step 4230 (FIG. 42B), the storage assembles the key. At step 4235, the storage uses the key to decrypt the personally identifiable information. At step 4240, the storage generates a new key. In one embodiment, the new key is generated based on the receipt (received from the server in step 4205) and other data. At step 4245, the data is re-encrypted using the newly generated key. Finally, at step 4250, the re-encrypted data and the other data are transmitted to the requester of the data. Note that as the data is encrypted, it is protected from prying eyes. But given the additional data used by the storage to generate the key, the requester of the data is able to independently generate the encrypting key, and so decrypt the received data.

Figure 43:
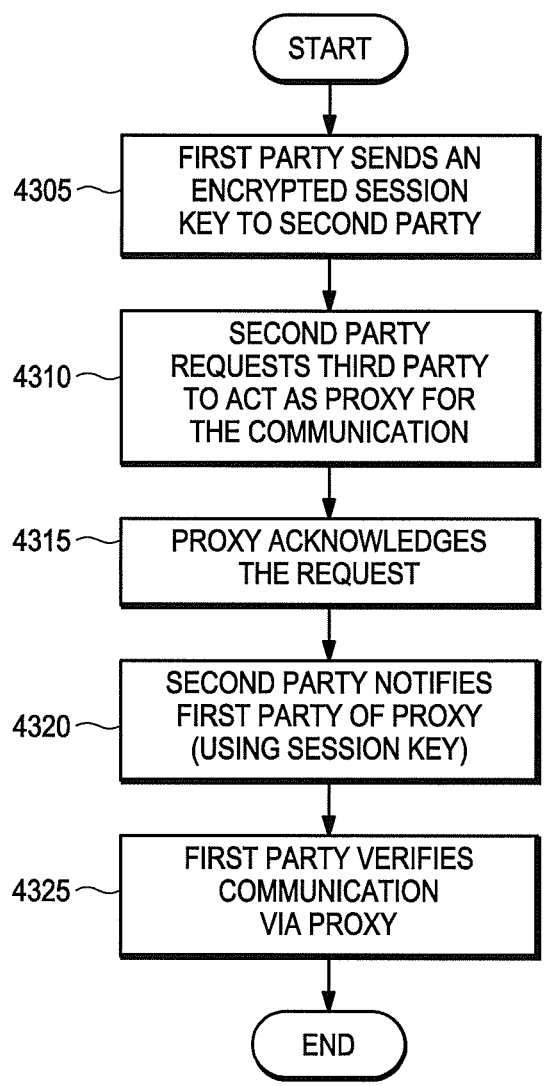
FIG. 43 shows a flowchart of the procedure to communicate using a proxy in the Proxy Authentication Network of FIG. 1.

FIG. 43 shows a flowchart of the procedure to communicate using a proxy in the Proxy Authentication Network of FIG. 1. At step 4305, one subscriber sends an encrypted session key to another subscriber. At step 4310, the second subscriber requests that a third party act as a proxy for the communication. At step 4315, the proxy acknowledges this request. At step 4320, the second subscriber notifies the first subscriber about the proxy. This notification can use the encrypted session key. At step 4325, the first subscriber verifies the communication using the proxy. At this point, the communication via proxy is arranged and can be used, satisfying the second subscriber's desire for communication via proxy.

The following discussion is intended to provide a brief, general description of a suitable machine (i.e., projector) in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc., which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

GLOSSARY

Entity An entity is defined as a business, corporation, partnership, or other fictitious or real persons who have registered with the system. The term user can be used interchangeably with the term entity. Typically, a user is meant to describe a physical entity performing an operation. The term business is considered to be a business, corporation, or partnership entity registered with the system hosting an application that is requesting authentication from the proxy authentication network. The credentials of a business, or an employee performing functions on behalf of the business entity, must be registered with the system.

Credential A credential is one or more combination of identifiers used by the system to identify an entity or operator to the system.

Master Credential A master credential is defined as a credential that is stored by the system and may or may not participate in authenticating an entity to the system.

Operator An operator is defined as having control of one or more servers within the system.

Identity An identity is defined as the credentials presented by an entity for authentication to the system.

Location A location is defined as the point of an interaction by an entity authenticating.

Master location A master location is defined as the sovereign storage location of personally identifiable entity data and/or a master credential.

Slave Location A slave location is any entity data storage location possessing personally identifiable information regarding an entity that is participating in the system that is not the master location.

Subscriber An entity that has subscribed to the Proxy Authentication Network. Where the term entity is used, it should be clear from context whether the entity is a subscriber or not.

Entity Data Entity data is defined as data or credentials.

APPENDIX A

IPv6 Authentication Header and Encapsulated Security Payload

Timo Aalto
Tik-110.551 Internetworking Seminar
Department of Computer Science
Helsinki University of Technology
*aalto@snakemail.hut.fi*

Abstract

*Every IPv6 host must support two security payloads, Authentication Header (AH) and Encapsulated Security Payload (ESP), as IP layer security mechanisms. Because security is an integral part of IPv6, it will be available on all platforms. AH provides message authentication and integrity. ESP provides message confidentiality and the integrity. ESP may also provide authentication if appropiate algorithms are used optionally. The IP Security Architecture (IPSEC) is defined in such a way that security mechanisms and key management are independent from each other. Mechanisms and management are separated by an interface called the security association (SA).*

Table of Contents

1. Introduction
2. IP Security Architecture
2.1 Security Associations (SA) and Security Policy (SP)
2.2 Key and SA management
2.3 Authentication Header (AH)
2.4 Encapsulated Security Payload (ESP)
2.5 Control and Logic of the Mechanisms
3. AH and ESP Use and Limitations
3.1 Security Gateway Functionality
3.2 Security Services for Upper Layers
3.3 Services for Routing Protocols
3.4 Cost/Benefit Analysis of Using Cryptographic Algorithms
3.5 Limitations of the IP Security Mechanisms
4. IPSEC Implementation Approaches
4.1 Possibilities in placing IPSEC to TCP/IP stack
4.2 Independence of the Key Management Mechanism
4.3 Independence of the Cryptographic Algorithms
4.4 Security of the Keys in the Host
5. Summary
References
Terms

1. Introduction

The authentication header (AH) and encapsulated security payload (ESP) are the security mechanisms of the Internet protocol security architecture. The IPSEC mechanisms AH and ESP provide authentication, integrity and confidentiality security services. The AH and ESP are defined for both IPv6 and IPv4. The implementation of the security mechanisms is mandatory for IPv6 and optional for IPv4.

The IP security architecture is defined as an integral part of IPv6. Thus, every vendor, who claims to offer IPv6 compliant implementation, must support authentication header and encapsulated security payload. Support for the AH and ESP does not mean that these services must be used, but they must be available if needed [20]. "If a security is provided at the Internet level, it becomes a standard service that all applications can use." [4]. The application can request the operating system to set up a security association before starting a TCP connection or a UDP exchange.[4]

Although the use of authentication, integrity and encryption adds IP prosessing costs and increases communication latency, the availability of security services for end-use and infrastructure protection is worth the penalty. [20]

2. IP Security Architecture

The IP security architehture is defined by the IETF in RFC 1825 [1], RFC 1826 [2], and RFC 1827 [3]. The IP security architecture can be described using the formal model presented in [5]. Using the concepts of this model, the IP security architecture consists of security variables, mechanisms, control, and management. The figure below presents the conceptual model [5].

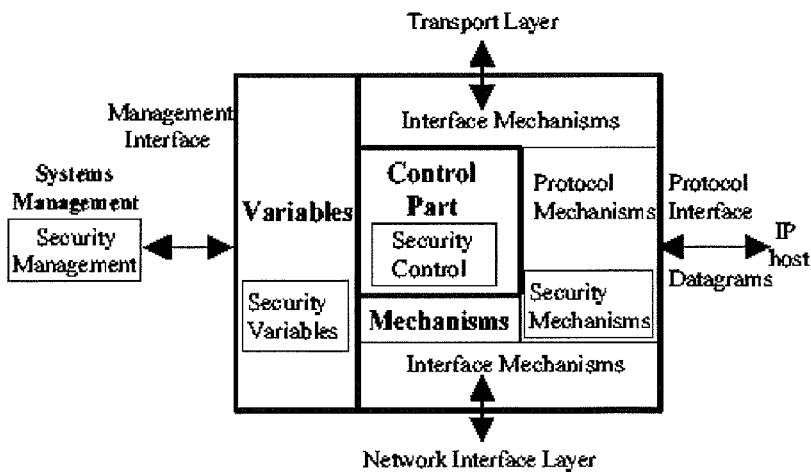

2.1 Security Associations

The use of the AH or ESP requires that senders and receivers agree on a key, on an authentication or encryption algorithm and on set of additional parameters needed in the use of algorithm. "This set of agreements constitues a security association between senders and receivers" [4]. From the implementation point of view, the security association contains all the variables that are needed for the control and calculation of the AH and ESP.

The security association separates the key management and the security mechanisms from each other. The key management updates the variables in the security association and the mechanisms read and use those values. "The only coupling between the key management protocol and the security protocol is with the security parameter index (SPI)" [2, 3].

A security association is one-way; a communications session between two hosts will normally have two security associations in use, one for each direction. The sending host uses the sending userid and destination address to select appropriate security association (and SPI). "The receiving host uses the combination of SPI value and destination address to distinguish the correct association" [1]. The receiver-orientation of the security association implies that the receiver selects the SPI value. This prevents the conficts between manually configured and automatically configured security associations. [1]

A security association can be either host-oriented or user-oriented. A host-oriented security association supports the use of the same session key for all the users in the same host. If user-oriented security associations are supported, then all users will have separate session keys in use.

Security policy with the enforcement of such a policy controls the use of the IP layer security mechanisms. Host-oriented and user-oriented security associations are selected on the basis of the security policy. Security policy controls the choice of appropriate security association. From the implementation point of view, the security policy defines all the variables that are needed to enforce the security policy when selecting correct security association and SPI for the datagrams.

Using the concepts of security association and security policy, the security context can be defined to consist of the two security associations and security policy records associated with a given flow of IP packets [18]. A security context should be thought of as a management concept denoting the security variables and mutual trust shared by the communicating parties [5].

Examples for a security association and a security policy are given in tables 1 and 2.

| Security Parameter | Example value |
|---|---|
| SPI (Security Parameter Index) | 2916 |
| AH Algorithm | MD5 |
| AH Algorithm Mode | Keyed |
| AH Transform | RFC 1828 |
| AH Key(s) | a 128 bit MD5 key |
| AH Mode | Entire Datagram |
| ESP Algorithm | DES |

| | |
|---|---|
| ESP Algorithm Mode | CBC |
| ESP Transform | RFC 1829 |
| ESP Key(s) | a 56 bit DES key |
| ESP Mode | Transport |
| ESP Synch/Init Vector Size | 64 |
| Lifetime | an absolute time in Unix Time format |
| IPSO/CIPSO Sensitivity Label | Nuclear/Classified |

Table 1: An example of a security association

| Security Parameter | Example value |
|---|---|
| SPI (Security Parameter Index) | 2916 |
| IP Destination Address | 128 bit IPv6 address value |
| IP Source Address | 128 bit IPv6 address value |
| Protocol | TCP |
| TCP/UDP Destination Port | 23 |
| TCP/UDP Source Port | 1234 |
| Userid | Unix UID or other credentials |

Table 2: An example of a security policy record with user-oriented keying enforcement

2.2 Key and SA Management

Key and SA management are separated from IP security mechanisms by the security association interface. The management and the mechanisms are coupled only via SPI values.

Key management is responsible for establishing and updating the variables in the security associations.

RFC 1825 [1] defines the key management requirements for all IPv6 implementations.

- Implementations must support manual configuration of security associations.
- Implementations should support Internet standard key management protocol once a one is published.
- It must be possible to have more than one concurrent security association between two endpoints.
- Implementations on multi-user hosts should support user-oriented security associations. "All such implementations must permit the configuration of host-oriented keying"[1].
- An IP host must take reasonable steps to protect the keys and other security association information.

In manual key management, the system's own keys, and also the keys of the communicating systems are configured manually to the system. This may work in a small and static environment, but does not scale. [1]

Widespread use of IP security will require an Internet standard scalable key management protocol [1]. A number of candidates of the key management protocols have been proposed: ISAKMP [22], SKIP [23, 24, 25, 26, 27], Oakley [28], Photuris [29, 30], and SKEME [31]; so far none of them has been adopted as a standard. A more descriptive information about IPv6 key management protocols can be found e.g. in [33].

Most of the key management protocols assume an authenticated public key of the other party to be available. Work is ongoing in the IETF to specify DNS security extensions [32], where the public keys of the IP hosts will be available. In addition to pure technical solutions an Internet-wide public-key infrastructure is required.

2.3 Authentication Header

The purpose of the authentication header is to convey the authentication information in the IP datagram. The authentication information is calculated using all the fields of the datagram that do not change in transit [1, 2]. The authenication header is placed in IPv6 after the fragmentation and end-to-end headers and before ESP and transport-layer headers [2]. Authentication header has the payload type 51 [21].

An example of an authenticated IPv6 header is presented below.

```
+------------+--------------------+-------------+-------+---------------+
| IPv6 Header| Hop-by-Hop/Routing | Auth Header | Others| Upper Protocol|
+------------+--------------------+-------------+-------+---------------+
```

The syntax of the authentication header

The IP Authentication Header has the following syntax [2]:

```
+----------------+----------------+----------------+----------------+
| Next Header    | Length         |           RESERVED              |
+----------------+----------------+----------------+----------------+
|                    Security Parameters Index                      |
+----------------+----------------+----------------+----------------+
|                                                                   |
+     Authentication Data (variable number of 32-bit words)         |
|                                                                   |
+----------------+----------------+----------------+----------------+
 1 2 3 4 5 6 7 8 1 2 3 4 5 6 7 8 1 2 3 4 5 6 7 8 1 2 3 4 5 6 7 8
```

- 8 bits wide next header field identifies the next payload after the Authentication Payload.
- 8 bits wide payload length field indicates the length of the authentication Data field in 32-bit words.
- 16 bits wide reserved field is reserved for future use. It shall be set to all zeros when sent.
- 32 bits wide SPI field identifies the security association for this datagram.
- The authentication data field has a variable length and its contens depend on a specification of the authentication transform, for example RFC 1828 [12] or RFC 1851 [13].

Calculation of the Authentication data

The calculation of the authentication data occurs prior to fragmentation for outbound datagrams and after the reassebly for inbound datagrams [1].

For outbound datagrams the calculation proceeds as follows:

- The security association is selected accoding to the security policy for the datagram D.
- A transmission-independent version D' of the datagram D is obtained.
  All the fields that change in transit are marked to zero. IPv6 hop count is set to zero, all options whose C bit is set are set to zero [4]. The details can be found in [2].
  The authentication data field is set to zero.
  The D' must be set as it appears to the receiver. "If the routing header is used, IPv6 destination is set to the final destination, the routing header content is set to the value that it should have upon arrival, and the address index will be set accordingly" [4].
- Compute the authentication data to the datagram according to the transformation specification.
- Add authentication data to the message D.

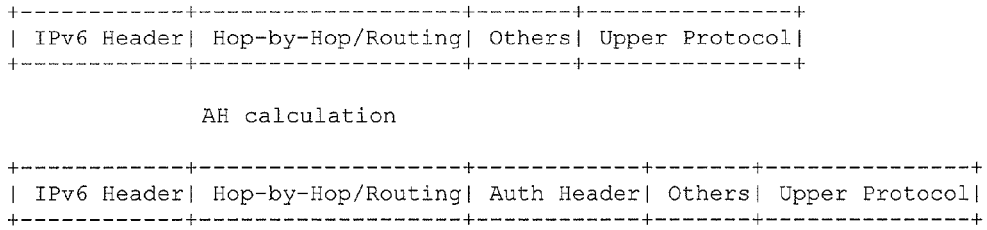

For inbound datagrams the calculation proceeds as follows:

- For the incoming datagram, the security policy for the datagram is first checked.
- The correct security association is selected according to the SPI field in the datagram.
- A transmission-independent version D' of the datagram D is obtained.
- The authentication data is computed according to the transformation specification.
- The authentication data is compared to the received authentication data.

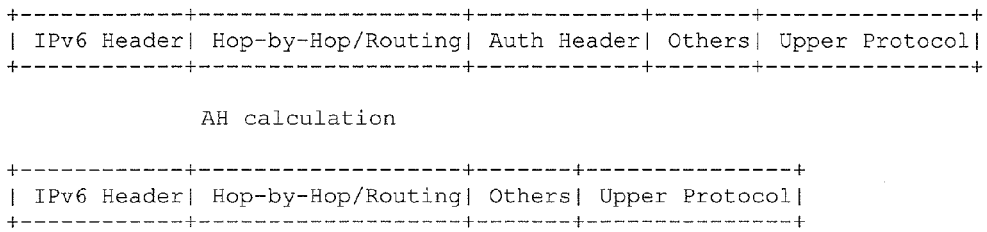

Conformance Requirements

Implementations that claim conformance with the authentication header, as an authentication algorithm must support at least keyed MD5 transform as descriped in RFC 1828 [12]. The implentations must support manual key management, must fully implement AH as it is descriped in the RFC 1826 [2], and must comply with all the requirements specified in RFC 1825 [1, 2].

In addition to the mandatory keyed MD5 transform alternative AH transforms can be supported. At the moment, keyed SHA transform [13] was been specified. Own AH transforms are also possible, if used among closed group of hosts supporting this specific transform.

2.4 Encapsulated Security Payload

The purpose of the encapsulated security payload is to convey the encrypted data of the IP datagram. The encrypted data is obtained by applying a specified encryption transform to the data to be protected.

"ESP may appear anywhere after the IP header and before the final transport-layer protocol" [3]. The encapsulated security payload has the payload type 50 [21].

An IPv6 datagrams with ESP is presented below:

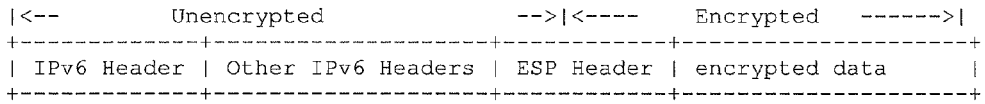

The ESP can be used in two modes. Tunnel mode ESP encapsulates an entire IP datagram inside ESP and adds a cleartext IPv6 header. Transport mode ESP encapsulates an upper layer protocol inside ESP.[1]

The syntax of the Encapsulated Security Payload

The IP Encapsulated Security Payload has the following syntax [3]:

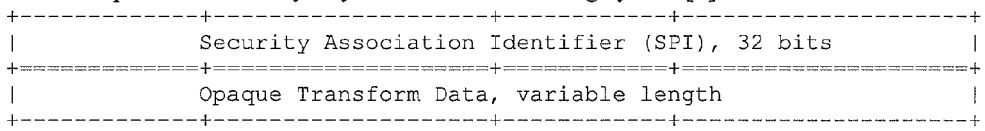

32-bit wide SPI identifies the security association for this datagram. The SPI field is the only unencrypted and transform-independent field in the ESP.

The contents of the Opaque Transform Data are specified in the transformation specifications.

Encapsulated Security Payload Processing [3]

Tunnel-mode ESP

Outbound datagrams:

- The security association is selected accoding to the security policy for the datagram D.
- The original datagram D is encapsulated into the ESP.
- The appropriate encryption transform is applied to the ESP.

- The encrypted ESP is encapsulated in a cleartext IP datagram D' as the last payload.

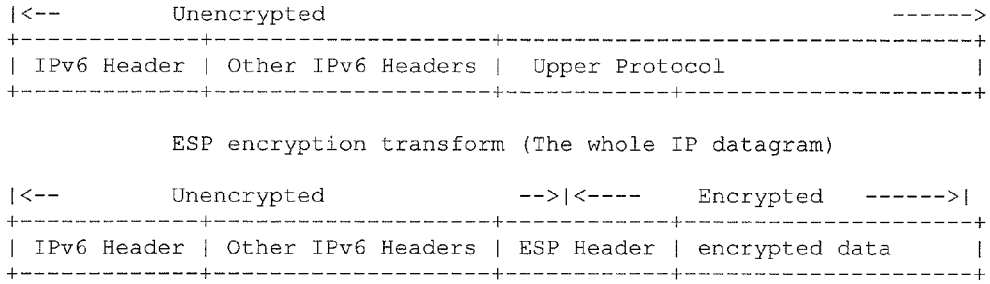

Inbound datagrams:

- For the incoming datagram, the security policy for the datagram D' is first checked.
- The correct security association is selected according to the SPI field in the datagram D'.
- The cleartext IP header and cleartext optional IP payloads are stripped off.
- The appropriate decryption transform is applied to the encrypted ESP part.
- If decryption succeeds, the contents of the decrypted ESP part is the original datagram D.

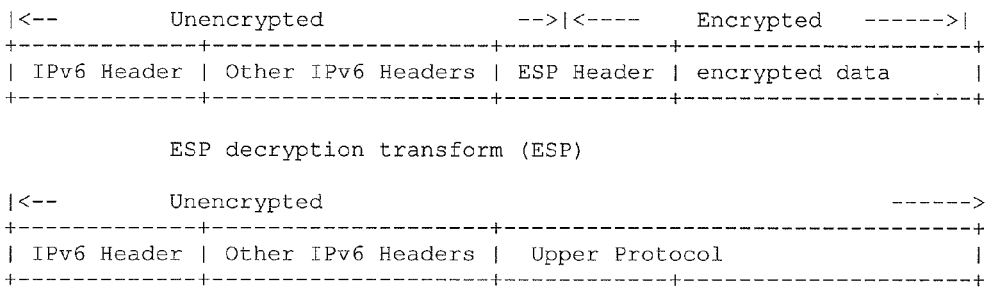

Transport-mode ESP

Outbound datagrams:

- The security association is selected accoding to the security policy for the datagram D.
- The original transport layer frame is encapsulated into the ESP.
- The appropriate encryption transform is applied to the ESP.
- The encrypted ESP is encapsulated in a cleartext IP datagram as the last payload.

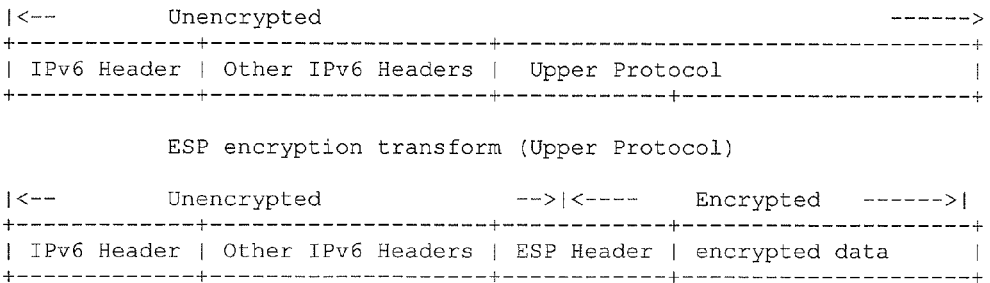

Inbound datagrams:

- For the incoming datagram, the security policy for the datagram is first checked.
- The correct security association is selected according to the SPI field in the datagram.
- The appropriate decryption transform is applied to the encrypted ESP.
- If decryption succeeds, the original transport-layer is removed from the ESP.

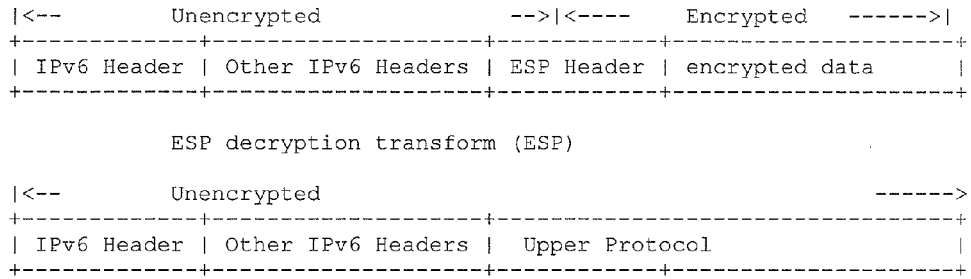

Conformance Requirements

Implementations that claim conformance with the encapsulated security payload must support DES CBC algorithm as an encryption transform as descriped in RFC 1829 [6]. The implementations must support manual key management, must fully implement ESP as it is descriped in RFC 1827 [3], and must comply with all the requirements specified in RFC 1825 [1]. [3]

In addition to the mandatory DES CBC ESP transform [6] alternative ESP transforms can be supported. At the moment Triple DES transform [7], DES CBC plus MD5 transform [8], and Combined DES-CBC, MD5 and replay prevention security transform [9] have been specified. Own ESP transforms are also possible, if used among a closed group of hosts supporting this specific transform.

2.5 Control and Logic of the Mechanisms

The control of the AH and ESP mechanisms for outgoing and incoming traffic is based on the security policy and security associations. For outbound and inbound datagrams the security policy determines the correct security association for the datagram. The security association in turn determines which transforms are applied to the datagrams and how they are applied.

Combining security mechanisms

Authentication, integrity and confidentiality are different services. The authentication header guarantees that message comes from the right origin and has not been altered; the ESP guarantees that messages are not revealed to other parties.

Some ESP transformations [8, 9] provide authentication, integrity and confidentiality. If such transformations are not available, the IPSEC specifications allow the combined use of the AH and ESP security mechanisms. The AH should always be used, if the used ESP transformation and algorithm does not guarantee integrity for the encrypted messages. Authentication, integrity and confidentiality can be achieved by using both AH and ESP [3].

There are many possible ways to combine AH and ESP, depending on which data is to be authenticated. The following three cases visualize different possibilities.

Case 1: Transport mode ESP and AH authenticating the entire datagram

Outbound packet:

The ESP is first applied to the transport layer data and ESP is added to the datagram. Then the AH is calculated across the entire IP datagram. AH is placed before ESP.

```
|<--         Unencrypted                              ------>
+-------------+--------------------+------------------+
| IPv6 Header | Other IPv6 Headers |  Upper Protocol  |
+-------------+--------------------+------------------+

ESP encryption transform (Upper Protocol)

|<--         Unencrypted                -->|<----- Encrypted ------>|
+-------------+--------------------+------------+----------------+
| IPv6 Header | Other IPv6 Headers | ESP Header | encrypted data |
+-------------+--------------------+------------+----------------+

AH calculation (The whole datagram)

|<--         Unencrypted                        -->|<----- Encrypted ------>|
+------------+---------------------+------------+------------+----------------+
| IPv6 Header| Hop-by-Hop/Routing | Auth Header| ESP Header | encrypted data |
+------------+---------------------+------------+------------+----------------+
```

Inbound packet:

The authentication and integrity with the AH are first checked for the whole datagram. Then the ESP transform decryption is applied to the ESP part.

```
|<--         Unencrypted                        -->|<----- Encrypted ------>|
+------------+---------------------+------------+------------+----------------+
| IPv6 Header| Hop-by-Hop/Routing | Auth Header| ESP Header | encrypted data |
+------------+---------------------+------------+------------+----------------+

AH calculation (The whole datagram)

|<--         Unencrypted                -->|<----- Encrypted ------>|
+-------------+--------------------+------------+----------------+
| IPv6 Header | Other IPv6 Headers | ESP Header | encrypted data |
+-------------+--------------------+------------+----------------+

ESP calculation (ESP)

|<--         Unencrypted                              ------>
+-------------+--------------------+------------------+
| IPv6 Header | Other IPv6 Headers |  Upper Protocol  |
+-------------+--------------------+------------------+
```

Case 2: Tunnel mode ESP and AH authenticating the entire datagram.

Outbound packet:

The ESP is applied to the entire original datagram. Then other plaintext IP headers are appended to the ESP header. Finally AH is calculated over the resulting datagram normally. [3]

```
|<--         Unencrypted                              ------>
+--------------+--------------------+-----------------+
| IPv6 Header  | Other IPv6 Headers | Upper Protocol  |
+--------------+--------------------+-----------------+

ESP encryption transform (The whole datagram)

|<--         Unencrypted             -->|<----- Encrypted ------>|
+--------------+--------------------+------------+----------------+
| IPv6 Header  | Other IPv6 Headers | ESP Header | encrypted data |
+--------------+--------------------+------------+----------------+

AH calculation (The whole datagram)

+-------------+--------------------+------------+------------+----------------+
| IPv6 Header | Hop-by-Hop/Routing | Auth Header| ESP Header | encrypted data |
+-------------+--------------------+------------+------------+----------------+
```

Inbound packet:

First the authenticity and integrity of the entire datagram is verified normally. Then the normal ESP transformation is applied.

```
+-------------+--------------------+------------+------------+----------------+
| IPv6 Header | Hop-by-Hop/Routing | Auth Header| ESP Header | encrypted data |
+-------------+--------------------+------------+------------+----------------+

AH calculation (The whole datagram)

|<--         Unencrypted             -->|<----- Encrypted ------>|
+--------------+--------------------+------------+----------------+
| IPv6 Header  | Other IPv6 Headers | ESP Header | encrypted data |
+--------------+--------------------+------------+----------------+

ESP calculation (ESP)

|<--         Unencrypted                              ------>
+--------------+--------------------+-----------------+
| IPv6 Header  | Other IPv6 Headers | Upper Protocol  |
+--------------+--------------------+-----------------+
```

Case 3: Tunnel mode ESP and AH authenticating only the ESP part of the datagram.

Outbound packet:

The authentication data is first calculated for the datagram to be encrypted later. AH is placed normally to the datagram. Then the ESP is applied to the entire IP datagram.

```
+-------------+--------------------+---------------+
| IPv6 Header | Hop-by-Hop/Routing | Upper Protocol|
+-------------+--------------------+---------------+

AH calculation (The whole datagram)
```

```
+-------------+------------------+------------+---------------+
| IPv6 Header| Hop-by-Hop/Routing| Auth Header| Upper Protocol|
+-------------+------------------+------------+---------------+

ESP calculation (The whole datagram)

|<--        Unencrypted             -->|<----- Encrypted ------>|
+-------------+------------------+------------+---------------+
| IPv6 Header | Hop-by-Hop/Routing| ESP Header | encrypted data |
+-------------+------------------+------------+---------------+
```

Inbound packet:

The ESP decryption transformation is applied to the ESP part. After the ESP is removed, the authentication and integrity are verified for the datagram without ESP.

```
|<--        Unencrypted             -->|<----- Encrypted ------>|
+-------------+------------------+------------+---------------+
| IPv6 Header | Hop-by-Hop/Routing| ESP Header | encrypted data |
+-------------+------------------+------------+---------------+

ESP calculation (ESP)

+-------------+------------------+------------+---------------+
| IPv6 Header| Hop-by-Hop/Routing| Auth Header| Upper Protocol|
+-------------+------------------+------------+---------------+

AH calculation (The whole datagram)

+-------------+------------------+---------------+
| IPv6 Header| Hop-by-Hop/Routing| Upper Protocol|
+-------------+------------------+---------------+
```

Security Failure Processing

If the authentication verification fails, the receiver should discard the datagram as invalid and must record the authentication failure in the system log with the information specified in [2]. If the ESP decryption processing fails for the datagram, the receiver should discard the datagram and the failure must be recorded to the system log with the information specified in [3].

There is also an Internet draft for the ICMP security failure messages [11]. This work is progress.

3. AH and ESP Use and Limitations

This chapter presents using possibilities for the IPSEC mechanisms, discusses the cost of using cryptographic algorithms, presents services that IPSEC does not provide and presents attacks that are not in the scope of IPSEC protection.

3.1 Security Gateway Functionality

The AH and ESP support security between two hosts, between host and security gateway and between two security gateways.

"A security gateway is a system which acts as the communication gateway between external untrusted systems and trusted hosts on their own subnetwork" [1]. "A trusted subnetwork contains hosts and routers that trust each other not to engage in active or passive attacks and trust that the underlying communication channel isn't being attacked"[1]. The security gateway provides security services for the trusted hosts when they communicate with the external untrusted systems.

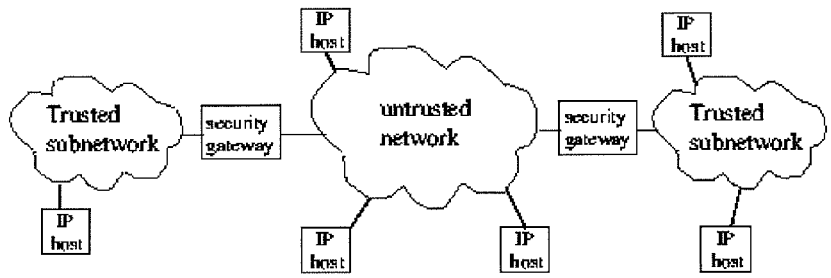

When a security gateway provides services on behalf of hosts on a trusted subnet, the security gateway is responsible for establishing the security association on behalf of its trusted host and for providing security services between the security gateway and external system(s)[1].

3.2 Security Services for Upper Layers

Secure applications can utilize the security services implemented at the IP layer. Secure applications may request to send and receive authenticated, intact and encrypted IP datagrams. The availability of these IP layer security services for the application layer programs requires the presence of user-oriented keying in a multi-user environment and security service support from the network programming interfaces. The network programming interface support for security services might be for example be new options to the sockets [4] or security API [18].

3.3 Security Services for Routing Protocols

"Network integrity cannot be maintained if routing protocols are not secured"[4]. Intruders may disrupt the communication or divert some connections by forging routing updates. Routing protocols should be run on top of security associations between the routers. [4]. Especially authentication and integrity of routing information is important to the security of routing protocols, confidentiality is not always necessary. "Using IP security is probably a good alternative to the definition of protocol-specific authentication or encryption functions" [4].

3.4 Cost/Benefit Analysis of Using Cryptographic Algorithms

The use of AH and ESP increases the IP protocol processing costs and communication latency. In the case of AH, the increased latency is caused by the calculation and comparison of the authentication data. In the case of ESP, the increased latency is caused by the encryption and decryption of the ESP. [1, 2, 3]

"Public-key algorithms are slow. Symmetric algorithms are generally at least 1000 times faster than public-key algorithms" [15]. However public key algorithms with long key lengths provide in general better security than symmetric ones with short key lengths. Running cryptographic algorithms on hardware and parallerizing the computation of the cryptographic algorithms speeds up the computation. The use of cryptographic algorithms is a trade between benefits and costs, the stronger security is wanted, the bigger is the cost of computing cryptographic algorithm.

Below is a table comparing encryption speeds of some block ciphers on a 33 MHz 486SX: [15]

| Algorithm | Encryption Speed | Key length |
|---|---|---|
| DES | 35 KB/s | 56 bits |
| 3DES | 12 KB/s | 112 bits |
| IDEA | 70 KB/s | 128 bits |

Below is a table comparing encryption speeds of some hash functions on a 33 MHz 486SX. [15]

| Algorithm | Encryption Speed | Hash Lenght |
|---|---|---|
| MD5 | 174 MB/s | 128 bits |
| SHA | 75 MB/s | 160 bits |

3.5 Limitations of the IP Security Mechanisms

The AH and ESP do not provide security against *traffic analysis*. It is not economical to provide protection against traffic analysis at the IP layer. One approach in the protection against the traffic analysis is the use of bulk link encryption, another is sending false traffic in order to increase the noise in the data listened by the traffic analyst. [1]

AH or ESP do not provide *non-repudiation* when used with the default algorithms (keyed MD5 and DES). Use of certain algorithms, for example, RSA with appropriate transformation provides non-repudiation. Non-repudiation should be concerned with the application layer security.

The AH keyed MD5 (RFC 1828) [12], AH keyed SHA (RFC 1852) [13], ESP DES DBC (RFC 1829) [6], or ESP Triple-DES (RFC 1851) [7] transformations do not protect against *replay attacks*. ESP transformation: "Combined DES-CBC, MD5 and Replay Prevention Security Transform" has been proposed [9]. This transformation may replace RFC 1829 [6] as a ESP conformance requirement. Protection against replay attacks may be also provided at the upper protocol layers.

The IPSEC mechanisms do not provide protection against all the *Denial of Service attacks* . It is hard to protect against all the denial of service attacks, for example a power cut caused by the enemy.

4. IPSEC Implementation Approaches

This chapter presents implementation issues of the IPSEC. An example IPv6 implementation containing IPSEC is described in [19]. An example of IPv4 AH implementation is described in [17]. Some of the issues presented here are raised from [18] and from the author's own work with IPv4 IPSEC prototype implementing both AH and ESP with manual key management into the Solaris 2.X environment.

4.1 Possibilities in placing IPSEC to TCP/IP stack

The IPSEC is logically defined as a part of the upper half of the IP layer as shown in the figure below.

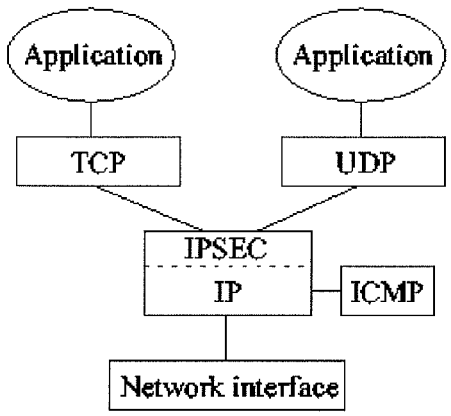

There are basically three ways to implement IPSEC as part of the logical IP layer:

1. IPSEC can be implemented above the IP layer. Only a transport mode ESP is then possible. This design choice requires the source code to be available and an implementatation of the TCP - IP logical interface.
2. IPSEC can be implemented inside the IP layer. This design choice requires the IP layer source code to be available.
3. IPSEC can be implemented below the IP layer. This choice is independent of the TCP/IP stack implementation. If IPSEC is implemented below the IP layer, fragmentation and reassembly have to be reimplemented.

The benefits and drawbacks of implementing IPSEC below IP layer are described rigorously in [17].

4.2 Independence of the Key Management Mechanism

One design objective of the IPSEC specifications is to separate key management and security mechanisms from each other. The design of a well-defined security association interface to the implementation makes is possible to replace key management part with new key management protocols when they are specified. It also makes it easier to change the existing key management protocol to the better one, for example, when security holes are found from the key management protocol.

4.3 Independence of the Cryptographic Algorithms

One desing objective of the IPSEC specifications is to separate IP security mechanisms AH and ESP from the cryptographic algorithms and transformations. The design of a well-defined protocol - algorithm interface to the implementation makes it possible to easily add new transformations and algorithms to the IPSEC after they are specified. Also, cryptographic algorithms can easily be replaced with stronger and better ones, if security holes are found from the existing one without changing the whole AH and ESP implementation. A well-defined and implemented interface makes it easier to put the algorithms on a separate hardware.

4.4 Security of the Keys in the Host

One requirement for the IPSEC key management is to pay special attention to the security of the keys in the IP host system. A secure way is to put the keys outside the host operating system into a separate hardware. The key parameters on the OS level security associations represent the keys indirectly [18]. The actual keys stays at the hardware, and a key index is used to refer to a specific key [18].

5. Summary

The IPSEC security mechanisms AH and ESP belong to IPv6 as integral parts. The presence of the mechanisms at the Internet layer provides wide availability of the security services for the applications and the Internet infrastructure as a whole.

The authentication header provides authentication and integrity. The encapsulated security payload provides confidentiality, and in addition integrity and authentication, if appropriate transforms and algorithms are used. Keyed MD5 transform must be implemented in AH compliant implementations and DES CBC transform must be implemented in ESP compliant implementations.

The Internet standard key management protocol and existing public key infrastructure is a prerequisite for wide-spread use of the IP security architecture among different organizations and persons in the international environment. The work is ongoing in the IETF to specify key management protocols and to provide technical support for public key infrastructure.

The requirement to support mandatory ESP in IPv6 and existing US export regulations may create problems to the manufactures to make IPv6 implementations. "One could thus select to develop the encryption products in a country such as Finland or Switzerland, which do not regulate export, assemble IPv6 package there, and export it from this neutral country to the whole world. Alternatively, one could ask developers in each country to produce an national version of ESP and DES-CBC, integrate it locally with IPv6 product, and distribute it nationally." [4].

References

[1]
    R. Atkinson. *Security Architecture for Internet Protocol*, RFC 1825, NRL, 1995

[2]
    R. Atkinson. *IP Authentication Header*, RFC 1826, NRL, 1995

[3]

[4] R. Atkinson. *IP Encapsulating Security Payload*, RFC 1827, NRL, 1995

[5] C. Huitema. *IPv6 The New Internet Protocol*, Prentice Hall, New Jersey, 1996

[6] A. Karila. *Open Systems Security - an Architectural Framework*, Dissertation, Helsinki University of Technology, Espoo, 1991

[7] P. Karn, P. Metzger, and W. Simpson. *The ESP DES-CBC Transform*, RFC 1829, Qualcomm, Inc., Piermont, Daydreamer, August 1995.

[8] P. Karn, P. Metzger and W. Simpson. *The ESP Triple DES Transform*, RFC 1851, Qualcomm, Inc., Piermont, Daydreamer, September 1995.

[9] P. Karn, P. Metzger and W. Simpson. *The ESP DES-CBC plus MD5 Transform*, Work in Progress draft-simpson-esp-des1md5-01, Qualcomm, Inc., Piermont, Daydreamer, September 1995.

[10] J. Hughes. *Combined DES-CBC, MD5 and Replay Prevention Security Transform*, Work in Progress draft-ietf-ipsec-esp-des-md5-00, Network Systems Corp., February 1996

[11] H. Krawczyk. *Keyed-MD for Message Authentication*, Work in Progress draft-krawczyk-keyed-md5-01, November 1995

[12] P. Karn and W. Simpson. *ICMP Security Failures Messages*, Work in Progress draft-ietf-ipsec-icmp-fail-01, Qualcomm, Inc., Daydreamer, February 1996.

[13] P. Metzger and W. Simpson. *IP Authentication with Keyed MD5*, RFC 1828, Piermont, Daydreamer, August 1995.

[14] P. Metzger and W. Simpson. *IP Authentication with Keyed SHA*, RFC 1852, Piermont, Daydreamer, September 1995.

[15] R. Rivest. *The MD5 Message-Digest Algorithm*, RFC 1321, MIT and RSA Data Security, Inc., April 1992.

[16] B. Schneier. *Applied Cryptography*, Second Edition, John Wiley & Sons, New York, 1996.

[17] J. Touch. *Report on MD5 Performance*, RFC 1810, USC/Information Sciences Institute, June 1995.

[18] D. Wagner, S. Bellowin. *A "Bump in the Stack" Encryptor for MS-DOS Systems*, SNDSS'96 Proceedings, February 1996

[19] P. Nikander, T. P. Aalto. *A Modular, STREAMS based IPSEC for Solaris 2.X Systems*, Working Papers, Helsinki University of Technology, 1996

[20] R. Atkinson, D. McDonald, B. Phan, C. Metz, K. Chin. *Implementation of IPv6 in 4.4 BSD*, USENIX 1996 Annual Technical Conference Proceedings, San Diego, California, January 1996

[21] S. Bradner, A. Mankin. (editors), *IPng Internet Protocol Next Generation*, Addison-Wesley, Massachusetts, 1996

[22] J. Reynolds, J. Postel. *ASSIGNED NUMBERS*, RFC 1700, ISI, 1994

[23] D. Maughan, M. Schertler. *Internet Security Association and Key Management Protocol (ISAKMP)*, Work in Progress draft-ietf-ipsec-isakmp-04, National Security Agency, February 1996

[23] A. Aziz, T. Markson, H. Prafullchandra. *Simple Key-management For Internet Protocols (SKIP)*, Work in Progress draft-ietf-ipsec-skip-06, Sun Microsystems, Inc., December 1995

[24] A. Aziz, T. Markson, H. Prafullchandra. *SKIP Extensions for IP Multicast*, Work in Progress draft-ietf-ipsec-skip-mc-00, Sun Microsystems, Inc., December 1995

[25] A. Aziz, T. Markson, H. Prafullchandra. *SKIP Algorithm Discovery Protocol*, Work in Progress draft-ietf-ipsec-skip-adp-00, Sun Microsystems, Inc., December 1995

[26] A. Aziz, T. Markson, H. Prafullchandra. *X.509 Encoding of Diffie-Hellman Public Values*, Work in Progress draft-ietf-ipsec-skip-x509-00, Sun Microsystems, Inc., December 1995

[27] A. Aziz, T. Markson, H. Prafullchandra. *Encoding of an Unsigned Diffie-Hellman Public Values*, Work in Progress draft-ietf-ipsec-skip-udh-00, Sun Microsystems, Inc., December 1995

[28] A. Aziz. *SKIP extension for Perfect Forward Secrecy (PFS)*, Work in Progress draft-ietf-ipsec-skip-pfs-00, Sun Microsystems, Inc., February, 1996

[29] H. K. Orman. *The Oakley Key Determination Protocol*, Work in Progress draft-ietf-ipsec-oakley-00, University of Arizona, February 1996

[30] P. Karn and W. Simpson. *The Photuris Session Key Management Protocol*, Work in Progress draft-ietf-ipsec-photuris-09, Qualcomm, Inc., Daydreamer, February 1996.

[31] W. Simpson. *Photuris Extensions*, Work in Progress draft-ietf-ipsec-photuris-ext-01, Daydreamer, November 1995.

[32] H. Krawczyk. *SKEME: A Versatile Secure Key Exchange Mechanism for Internet*, SNDSS'96 Proceedings, February 1996

[33] D. Eastlake, C. Kaufman. *Domain Name System Security Extensions*, Work in Progress draft-ietf-dnssec-secext-09, CyberCash & Iris, January 1996

M. Korhonen. IPv6 Key Management, Seminar Presentation, Helsinki University of Technology, May 1996

Glossary

The term definitions below are copied from [1].

| | |
|---|---|
| Authentication | The property of knowing that the data received is the same as the data that was sent and that the claimed sender is in fact the actual sender. |
| Integrity | The property of ensuring that data is transmitted from source to destination without undetected alteration. |
| Confidentiality | The property of communicating such that the intended recipients know what was being sent but unintended parties cannot determine what was sent. |
| Encryption | A mechanism commonly used to provide confidentiality. |
| Non-repudiation | The property of a receiver being able to prove that the sender of some data did in fact send the data even though the sender might later desire to deny ever having sent that data. |
| SPI | Acronym for "Security Parameters Index". An unstructured opaque index which is used in conjunction with the Destination Address to identify a particular Security Association. |
| Security Association | The set of security information relating to a given network connection or set of connections. This is described in detail below. |
| Traffic Analysis | The analysis of network traffic flow for the purpose of deducing information that is useful to an adversary. Examples of such information are frequency of transmission, the identities of the conversing parties, sizes of packets, Flow Identifiers used, etc. |

APPENDIX B

IPv6 Key Management

Markku Korhonen
Tik- 110.551 Internetworking Seminar
Department of Computer Science
Helsinki University of Technology
markorho@snakemail.hut.fi

Abstract

*IPv6 security architecture and related security mechanisms are designed in such a way that Internet users who want security will have those mechanisms, and the users who do not need these mechanisms, are not adversely affected. In IPv6 key management protocol is coupled to the other security mechanisms only via the Security Association (SA) implemented with Authentication Header (AH) and Encapsulating Security Payload (ESP). The Internet community has not yet agreed on a IPv6 Key Management protocol and there are several key management proposals available. In this paper some of those alternatives are briefly presented.*

Table of Contents

1. IPv6 security mechanisms
2. Key management
2.1 Introduction to key management
2.2 Some forms of key management
2.3 IPv6 Key Management Requirements
3. Photuris
3.1 Introduction to Photuris
3.2 The Design of Photuris
3.3 Photuris Exchanges
3.4 Attacks that the Photuris guards against
4. Simple Key-Management for Internet Protocols (SKIP)
4.1 Introduction to SKIP
4.2 Basics of the key structure
4.3 Manual distribution of the master key
4.4 Zero-Message Master Key Update Algorithm
4.5 Attacks that the SKIP guards against
5. Internet Security Association and Key management Protocol
5.1 Introduction to ISAKMP
5.2 ISAKMP Requirements
5.3 ISAKMP Architecture and packet Exchanges
5.4 Attacks that the ISAKMP guards against
6. Domain Name System (DNS) Security Extensions
6.1 Introduction to DNS security extensions 6.2 Overview of the Extensions
7. A Versatile Secure Key Exchange Mechanism for Internet (SKEME)
7.1 Introduction to SKEME
7.2 The Basic Protocol and its Phases
8. Conclusions
References

1. IPv6 security mechanisms

IPv6 security architecture and related mechanisms are designed in such a way that Internet users who desire security will have security mechanisms, and the users who do not need these mechanisms, will not be adversely affected [8]. These mechanisms are not tied to any specific cryptographic algorithms, so they can be altered without affecting the other parts of the implementation. To ensure interoperability standard default algorithms are also specified.

A Security Association (SA) is specified [6] to be a relationship or a contract between two or more communicating entities that describes how they will utilize security services to communicate securely. This shareable contract information must be agreed upon all the entities. When accessing SA attributes, entities use an identifier refered to as the Security Parameter Index (SPI) that belongs to the key-exchange procedure. When the packets are sent to a receiver the SPI is chosen by the receiver. Each station must remember the SPI used by its partners to identify the security context.

Two basic IPv6 security mechanisms are the Authentication Header (AH) [6] and the Encapsulating Security Payload (ESP) [7], which in some cases might be combined to obtain the desired security properties.

The IPv6 Authentication Header (AH) provides integrity and authentication for IPv6 datagrams by computing a cryptographic authentication function over the IPv6 datagram and using a secret authentication key in this computation [6]. The sender computes the authentication data for static fields just prior to sending the authenticated IPv6 packet and the receiver verifies the correctness of the authentication data upon reception. Non-repudiation might be provided by some (e.g. asymmetric) authentication algorithms used with the Authentication Header. The default authentication algorithm is keyed MD5 [24], which like all symmetric algorithms cannot provide non-repudiation. Confidentiality and traffic analysis protection are not provided by the AH.

The IPv6 Encapsulating Security Payload (ESP) provides integrity, authentication, and confidentiality for IPv6 datagrams by encapsulating either an entire IPv6 datagram or only the upper-layer protocol data inside the ESP, encrypting most of the ESP contents, and finally a new cleartext IPv6 header is appended to the ESP [7]. The recipient of the datagram removes and discards the cleartext IPv6 header and options, decrypts the ESP, processes and removes the ESP headers, and then processes the data as normally.

A more descriptive information about AH and ESP can be found e.g., in [1].

2. Key management

2.1 Introduction to key management

The key management protocol is coupled to the other security mechanisms only via the SA. IPv6 is not intended to support so-called "in-band" key management, where the key management data is carried in a distinct IPv6 header. Instead it will primarily use the so-called "out-of-band" key management, where the key management data will be carried by an upper layer protocol such as UDP or TCP. This permits clear decoupling of the key management mechanism from the other security mechanisms, so it is possible to replace key management method with another one and without having to modify the implementations of the other security mechanisms [8].

In [25] key management concerns issues like Generating keys, Transferring keys, Verifying keys, Using keys, Updating keys, Storing keys, Back-up keys, Lifetime of keys, Destroying keys, etc. In this presentation our focus is more limited and not all the topics mentioned above are covered here. Our main interest is focused on key exchange protocols. It has been shown, in [13], that key exchange must be coupled to authentication.

In [20], the properties of key exchange protocols are defined to include the key establishment method, authentication, symmetry, perfect forward secrecy, and back traffic protection. The meaning of those terms is presented below in according to reference mentioned above.

In Key Establishment, the two common methods of using public key cryptography are key transport and key generation. An example of key transport is the use of the RSA algorithm [25], to encrypt a randomly generated session key with the other party's public key. The encrypted random key is then sent to the recipient, who decrypts it using his private key. At this point, both sides have the same session key. An example of key generation is the use of the Diffie-Hellman Algorithm (DH) [25], that generates a session key based on public and secret information held by both users. The DH algorithm is begun by two parties exchanging public information. Each party then mathematically combines the other's public information along with their own secret information to compute a shared secret value. This secret value can be used as a session key or as a key for encrypting a randomly generated session key.

Key exchange authentication may be done during the protocol or after protocol completion. Authentication of the key exchange during the protocol is provided when each party provides proof it has the secret session key before the end of the protocol. Proof can be provided by encrypting known data in the secret session key during the protocol exchange. Authentication after the protocol must occur in following communications. Authentication during the protocol is preferred so subsequent communications are not initiated if the secret session key is not established with the desired party.

A desirable key exchange symmetry is achieved if either party can initiate the exchange and exchanged messages can cross in transit without effecting the key that is generated.

Perfect Forward Secrecy is provided by a key exchange protocol if disclosure of long-term cryptographic keying material (e.g. public signature keys) does not compromise previously generated keys. Past session keys will not be obtainable if the long-term key is compromised in perfect forward secrecy.

Back Traffic Protection is provided by the independent generation of each key in a such way that subsequent keys are not dependent on any previous key. Past session keys will not be obtainable if the current session key is compromised in back traffic protecion.

What follows is a brief discussion of a few alternative forms for key management. However, multicast Key Distribution is not covered here.

2.2 Some forms of key management

The simplest form of key management is manual key management, where a person manually configures each system with its own and other parties key. The method can be quite practical in small and static environments.

There are a number of key management algorithms that have been described in the public literature. Needham and Schroeder have proposed a key management algorithm which is based on a centralised key distribution system [21, 22]. This algorithm is used in the Kerberos Authentication System [18]. Diffie and Hellman algorithm on the other hand does not require a centralised key distribution system [12, 19].

Use of IPv6 security will require an Internet-standard scalable key management protocol. There is work in progress to add signed host keys to the Domain Name System [14]. The DNS keys enable the originating party to authenticate key management messages with the other key management party using an asymmetric algorithm. The two parties could then create a shared session key using DH or other means.

There are two keying approaches for IPv6. In the host-to-host keying approach, all users of a host share the same key to be used with all users on another communicating host. In the user-to-user keying approach, every user has a unique session key.

2.3 IPv6 Key Management Requirements

In [8] IPv6 Key Management Requiremets are specified as follows:

"All IPv6 implementations must support manual key management and should support an Internet standard key management protocol once it is approved. All IPv6 implementations must permit the configuration and use of user-to-user keying for traffic originating at that system and may additionally permit the configuration of host-to-host keying for traffic originating at that system as an added feature to make manual key distribution easier and give the system administrator more flexibility" [8].

"A device that encrypts or authenticates IPv6 packets originated on other systems, for example a dedicated IP encryptor or an encrypting gateway, cannot generally provide user-to-user keying for traffic originating on other systems. Hence, such systems must implement support for host-to-host keying for traffic originating on other systems and may implement support for user-to-user keying for traffic originating on other systems. The method by which keys are configured on a particular system is implementation-defined" [8].

In the rest of this paper, some proposed Ipv6 key management protocols are briefly introduced. These are Photuris, SKIP, ISAKMP, DNS security extensions and SKEME but because of the limited scope of this seminar some protocols e.g. Oakley [23] are excluded here.

3. Photuris

3.1 Introduction to Photuris

The Internet community has not agreed on a key distribution method for IPv6, but the leading proposal [15] is called Photuris [17]. It is based on zero knowledge exchanges, followed by authentication of the exchanging parties.

Photuris is a session-key management protocol intended to be used with the IPv6 AH and ESP Security Protocols. In Photuris, a wide variety of session-key generation techniques are supported and it is independent of any particular party identification method or certificate format.

The following description of Photuris is mainly based on Christian Huitema's clear presentation in [15]. However, for the sake of clarity explicit references are not commonly indicated in the text.

3.2 The Design of Photuris

The Photuris is based on the zero-knowledge key exchange algorithm of Diffie and Hellman (DH). In the original DH proposal parties A and B both know a prime number $p$ and a generator $g$. The party A then chooses a random number $x$ as an exponent and computes the value $n = g^x \mod p$ that is transferred to B. B, respectively, chooses a random number $y$, computes the value $m = g^y \mod p$ and transfers the value to A. At this stage A knows $m$ and $x$, B knows $n$ and $y$ while third parties may know $m$ or $n$, but cannot obtain either of exponents $x$ or $y$. A and B can then compute the session key as follows: $z = n^y \mod p = m^x \mod p = g^{xy} \mod p$. This shared secret key could the be used by the encryption or the authentication algorithm. The DH exchange can be implemented with other mathematical techniques, such as elliptic curve groups [17].

3.3 Photuris Exchanges

The Photuris protocol (see figure 1) starts by a cookie exchange, followed by a DH exchange that will either prevent the clogging attack or lead the intruder to disclose its IP-address. Finally the signature message exchange take place.

```
Initiator                                                    Responder
---------------------------------------------------------------------
cookie-request------------------------------------------------->
<----------------------------------------------------cookie-response
key-request---------------------------------------------------->
<-------------------------------------------------------key-response
computation                                                computation
Signature------------------------------------------------------>
<-----------------------------------------------------------Signature
```
Figure 1. The Photuris exchange

3.3.1 Cookie exchange

The cookie request contains a 128-bit initiator chosen cookie, that is a random number used as an exchange identifier. The cookie request also contains a list of groups to designate how the DH exchange has implemented. The current draft [17] supplies three groups, identified by their 8-bit numbers.

When a responder receives a cookie request, it examines the list of groups provided by the requestor and chooses an appropriate one. The responder will then in turn compute a responder cookie, e.g. by applying a MD5 to a string composed of the source address and UDP port of the message, the initiator cookie, and a secret number drawn by the responder when it was initialized.

The cookie response contains a selected group index, a copy of the initiator cookie, a responder cookie, a responder public value, and a list of attributes. The responder cookie identifies the exchange for the responder. The format of responder public value depends on the selected group. The list of attributes contains a set of transforms, in order of responder preference. Attributes are identified by an 8-bit type number.

Initiators associate a timer with each exchange. If the response does not arrive within a certain time, the procedure will be retried with a different initiator cookie. The cookie value is changed because the responder may keep copies of the recently received requests and refuse to serve them more than once. Saturated receivers may also ignore incoming cookie requests, if too many SA's are active at the same time.

Once the initiator has received the cookie response, it chooses a half-key and the corresponding public value in the indexed group, the number space chosen by the responder. It also chooses the attributes that will be used in the SA in the initiator-to-responder direction and sends a key request message.

3.3.2 Key exchange

The key request indicates the SPI that will be used in the responder-to-initiator direction and the lifetime of this SA. The group index, initiator cookie, and the responder cookie are further copied from the cookie response message. The initiator public value is a variable precision integer. The initiator transform parameter indicates the transforms chosen by the initiator from the responder's list followed by a list of attribute numbers. The message is completed by the initiator list of attributes. When the responder receives a key request message, it first checks the validity of the responder cookie. A message with an incorrect cookie is ignored. If the message is acceptable, the responder chooses its own half of the key, as well as a set of transforms from the initiator's attribute list and a key transform that will be used in the exchange of signatures.

The session keys can be computed immediately after the exchange of half-keys. The session key will be formally composed of the DH shared secret, concatenated with the SPI, the SPI owner cookie and the peer cookie. The actual key will then be shortened by applying a one-way function such as MD5 to this string to obtain a set of 128 bits used in the SA. The particular hash function that will be used is chosen from the initiator's list of attributes and indicated in the key transform parameter. A different key will be used in each direction.

The short lifetime of the SA (e.g. 30 seconds) is chosen by the responder. Long lifetimes increase the risk of compromising the key. It is preferable to reinitiate the SA and to compute new keys.

3.3.3 Signature exchange

The signature exchange is needed because neither cookie exchange nor the DH exchange cannot prove the identity of the parties. The signature request message sent by the initiator contains the initiator and receiver cookies, an electronic signature, the certificates used for that signature and some additional attributes. The signature transforms will typically consist of a one-way function followed by an RSA exponentiation with the private key of initiator. The particular one-way function, public key exponentiation method, and the public key certification method are chosen from the responder's list of attributes.

The transform is applied to a string made of the session key, concatenated with the initiator's public value, the responder's public value, and optionally the identifiying public key, certificate, or distinguishing name of the sender. Inclusion of the public values in the string guarantees that a man in the middle has not substituted its own value. If the verification succeeds, the responder computes its own signature and sends it to the initiator. It it fails, an error message is sent and the SA is not established.

3.4 Attacks that the Photuris guards against

The original DH algorithm has certain known weaknesses [15]: It does not provide any information about the identities of the parties, it is subject to the man-in-the-middle attack and the involved heavy computational load can be used in a clogging attack.

Using zero-knowledge exchanges the keys are computed when needed and the exchange does not require any preexisting infrastructure such as key servers or certificate servers.

Photuris supports a variety of authentication methods that can be coupled with the key exchange [17]. Adequate authentication will prevent the man-in-the-middle attack. Photuris uses a set of predefined primes that avoids the long computation required to discover long prime numbers and also enables stations to choose random half-keys and to compute the corresponding exponentation in advance.

4. Simple Key-Management for Internet Protocols (SKIP)

4.1 Introduction to SKIP

Simple Key-Management for Internet Protokols (SKIP) is a key management protocol intended to be used with Internet Protocols like IPv6 with AH and ESP. SKIP provides privacy and authentication for communicating parties. Basic SKIP definition [3] does not define method to discover algorithms other party supports, but there are enhancement [4] that enables this. In this paper key management for only basic SKIP [3] is covered.

In order to implement SKIP, each IP based source and destination shall have a DH [12] public value. This value can be authenticated by use of X.509 certificates [5], Secure DNS [14] or PGP certificates [9] etc.

4.2 Basics of the key structure

Brief description of SKIP that follows is mainly based on [3], even though it might not be explicitly mentioned in the text.

An IP source I has a secret value i, and a public value $g^i$ mod p and a destination node J has values j and $g^j$ mod p respectively. A mutually authenticated shared secret is defined as $g^{ij}$ mod p.

The key $g^{ij}$ mod p is called the long-term secret, and from it a key Kij can be derived by taking the low order key-size bits of $g^{ij}$ mod p. Kij is used as the key for a block Symmetric Key CryptoSystem (SKCS) like DES, RC2 or IDEA.

A Kij is an implicit pairwise shared key that does not need to be sent in any packet or negotiated out-of-band. The destination node can compute this shared key (Kij) simply by knowing the source node's authenticated public value.

By using Kij a transient packet key Kp is encrypted. This packet key is used when IP packet encryption / authentication take place. Because Kij is valid for a relatively long period of time, the IP data traffic is not encrypted using key Kij. Kij is called a master key because it encrypts only other keys.

In order to prepare a packet for transmission to recipient J there is no need for communication with node J. When the recipient J receives this packet, it also computes the shared secret Kij and saves it to be used later. By using Kij it obtains Kp, and by using Kp it obtains the original IP packet.

If the source node I changes the Kp, the receiving IP node J can discover this fact without having to perform a computationally expensive public key operation. It uses the previously saved value Kij to decrypt the encrypted packet key Kp. Thus, without requiring communication between ends, the packet encrypting / authenticating keys can be changed by the transmitting side and discovered by the receiving side.

4.3 Manual distribution of the master key

If in the SKIP an authenticated public key distribution infrastructure is not available, nodes may use the manual distribution of keying information. In these cases the master key Kij should be one of the keys that are manually established.

Because of the master keys Kij and traffic encryption keys Kp are separated, it is possible for the SKIP to automatically update Kp's even when manual master key distribution is utilized.

4.4 Zero-Message Master Key Update Algorithm

The implicit pairwise master keys can be used to generate an arbitrary number of implicit master keys referred as Kijn, by making the master keys be a function of a counter "n". The counter value n can only be incremented. "It is used to prevent re-use of compromised traffic authentication keys as well as to provide coarse-grain playback protection of data traffic. In the event that a particular traffic authentication key is compromised its re-use is prevented by updating the implicit master key Kij and by never re-using a master key" [3].

In [3] Kij must be 256 bits long and if Kij is derived from g^ij mod p, then the low order 256 bits are used as the input to the Kijn calculation. Master key computation is presented in fully detail in [3].

Although the descriptions above have utilized classic DH, the protocols can be applied to any public key agreement system, that is defined as a system where one combines another's public and one's own private value to compute a pairwise shared secret.

4.5 Attacks that the SKIP guards against

The SKIP is not vulnerable to intruder in the middle types of attacks [3], because the DH public parameters are long-term and authenticated.

If the packet authentication keys Kp are ever compromised, then the master key update algorithm described in [3] precludes the re-use of compromised keys. This is because even if a particular traffic key Kp is compromised, the current implicit key Kijn is not compromised, and therefore the attacker would not be able to compute the encryption of Kp in Kijn. "Without knowing the encryption of Kp under the Kijn, an attacker cannot re-use past compromised keys Kp to any advantage" [3].

Also, even if all the keys Kp encrypted in a given Kijn are compromised, an attacker cannot learn anything about other Kp or to learn Kijn. "Knowing or even choosing Kp keys, and using that to learn Kijn is equivalent to a known or chosen plain-text attack on a Kijn, and that should be infeasible even given a very large number of known / chosen Kp keys as long as the key-encryption algorithm is practically secure against a known / chosen text attack" [3]. If the key-encryption algorithm is secure against a known / chosen text attack then is also SKIP secure.

In order to prevent resource clogging attacks, a recommended solution is to pre-compute and cache master keys Kij, based either on usage patterns of the machine or through administrative action mentioned in [3].

5. Internet Security Association and Key Management Protocol

5.1 Introduction to ISAKMP

"Internet Security Association and Key Management Protocol (ISAKMP) combines the security concepts of authentication, key management, and SAs to establish the required security for government, commercial, and private communications on the Internet" [20].

The ISAKMP defines procedures and packet formats to establish and negotiate SA's and to modify or delete them. These packet formats provide a consistent method of exchanging key generation and authentication data that is independent of the key generation technique, encryption algorithm or authentication mechanism.

The description of ISAKMP below is based on draft [20] even though it might not be explicitly mentioned in the text.

5.2 ISAKMP Requirements

ISAKMP exchanges must support strong authentication. With ESP and AH protection of subsequent communications from passive eavesdroppers is achieved.

For authentication ISAKMP utilizes digital signatures, based on public cryptography, but there is no specific signature algorithm or certificate authority (CA) that must be used. There are other strong authentication systems available (e.g. [18]), which could be specified.

An agreeded basic set of security attributes is established in an initial protocol exchange between source and destination node and this set provides protection for subsequent ISAKMP exchanges. This set also indicates the authentication and key exchange method that will be used in the ISAKMP protocol. After this initial identity authentication and required key generation, another security attribute exchange takes place to establish the complete SA which will be used for subsequent communications by the entity that invoked ISAKMP. In the ISAKMP protocol users can choose key establishment algorithms according their requirements.

5.3 ISAKMP Architecture and Packet exchanges

The following figure is a high level view of the placement of ISAKMP in a network architecture.

```
+-------------+                        +------------------+
! Negotiation !    Situation           ! Application      !
! Server      !<-------                ! Process          !
+-------------+          !             +------------------+
! ISAKMP      !          !             ! Appl Protocol    !
+-------------+          !             +------------------+
       !                 v                     !
+---------------------------------------------------------+
!                    Sockets                              !
+---------------------------------------------------------+
!              Transport Protocol (TCP / UDP)             !
+---------------------------------------------------------+
!                       IP                                !
+---------------------------------------------------------+
!                 Link Layer Protocol                     !
+---------------------------------------------------------+
```
Figure 2. ISAKMP Relationships "The negotiation server is an application process which interfaces with the different policy databases (security, network access, cryptographic, authentication, etc.) that a system may require" [20]. Negotiation Server calls ISAKMP to deliver the data required to establish an SA and key and authenticate the exchange. The negotiation server itself can be invoked manually by a user or automatically by a security protocol when an SA is required.

The situation contains the identification and other information required by the negotiation server to make policy decisions. Upon completion of SA negotiation the SPI is returned.

As an example the Base Exchange is shown in figure 3. The Identity Protection Exchange and the Authentication Only Exchange can be found with full details in [20].

SA Initialization, Key Exchange and Authentication, and SA Negotiation comprise the base exchange. The base exchange contains the minimum number of packet exchanges in order to reduce SA establishment overhead.

```
     Initiator       Direction     Responder        Note
     ISA_INIT_REQ    =>
                     <=            ISA_INIT_RESP
                                                    Basic SA selected
     ISA_AUTH&KE_REQ =>
                     <=            ISA_AUTH&KE_RESP
                                                    Identity Verified
                                                    Key Generated
                                                    Encryption Begun
     ISA_NEG_REQ     =>
                     <=            ISA_NEG_RESP     SA Completed
```
Figure 3. Base Exchange

5.4 Attacks that the ISAKMP guards against

As noted by Karn [17], absolute protection against denial of service is impossible, but the use of cookie exchange provides a technique for making it easier to handle.

ISAKMP prevents connection hijacking by linking the authentication, key exchange and security association exchanges [20]. This linking also prevents man-in-the-middle types of attacks from being successful, because partial SA's will not be created.

6. Domain Name System (DNS) Security Extensions

6.1 Introduction to DNS security extensions

Domain Name System (DNS) Security Extensions provide data integrity and authentication services to resolvers or applications through the use of cryptographic digital signatures, which are included in secured zones as resource records (RR).

The extensions also provide for the storage of authenticated public keys that can support general public key distribution service as well as DNS security. By using these public keys, security aware resolvers can learn the authenticating key of zones in addition to those for which they are initially configured. Keys associated with DNS names can be made to support other protocols and key types.

This short introduction is fully based on a draft [14], even though not always explicitly expressed so below.

6.2 Overview of the Extensions

The DNS protocol security extensions provide three distinct services: key distribution, data origin authentication, and transaction and request authentication, which all are briefly presented.

6.2.1 Key Distribution

Resource records (RR's) are defined to associate keys with DNS names. KEY RR includes an algorithm identifier, the actual public key parameters, and a variety of information flags.

6.2.2 Data Origin Authentication and Integrity

Authentication is provided by associating with RR's digital signatures. A single private key is used to sign for an entire zone. "If a security aware resolver reliably learns the public key of the zone, it can verify, for signed data read from that zone, that it was properly authorized and is reasonably current" [14]. This data origin authentication key belongs to the zone.

For a resolver to reliably learn the public key by reading it from DNS, the key itself must be signed. To provide a reasonable degree of security, the resolver must be staticly configured with at least the public key of one zone, where it can securely read the public keys of other secure zones.

6.2.3 DNS Transaction and Request Authentication

In order to provide protection for DNS requests or for message headers, transaction authentication can be added. "This authentication means that a resolver can be sure it is at least getting messages from the server it thinks it queried, that the response is from the query it sent, and that these messages have not been diddled in transit [14].

The KEY RR is used to document a public key that is associated with a DNS name. This can be the public key of a zone, a host or other end entity, or a user. A KEY RR is authenticated by a SIG RR.

6.2.4 The SIG Resource Record

The SIG or signature RR is the fundamental way that data is authenticated in the secure DNS.

The SIG RR authenticates other RRs of a particular type, class, and name and binds them to a time interval and the signer's domain name. This is done using cryptographic techniques with the signer's private key. The signer is frequently the owner of the zone from which the RR originated.

The zone private keys should be kept and used in off-lineand in non-network connected physically secure machines only. The master copy of the zone file should be off net and should not be updated based on an unsecured network communication. Secure resolvers need to be configured with some trusted on-line public key information.

7. SKEME: A Versatile Secure Key Exchange Mechanism for Internet

7.1 Introduction to SKEME

SKEME [19] is a secure and versatile key exchange protocol for key management over Internet. It consists of a compact protocol that supports a variety of security models. SKEME provides clear tradeoffs between security and performance scenarios without incurring in unnecessary system complexity. SKEME supports key exchange based on public key, key distribution center or manual installation and provides for fast and secure key refreshment. In addition, SKEME selectively provides forward secrecy, allows for replaceability and negotiation of underlying cryptographic primitives and addresses privacy issues as anonymity and repudiation. The following description and the introduction above is based on [19].

7.2 The Basic Protocol and Its Phases

There are three basic phases in the SKEME protocol: SHARE, EXCH and AUTH. In SHARE the parties exchange "half-keys" encrypted under each other's public key and then combine the half-keys via a hash function to produce the shared key K0. The message structure of SHARE, EXCH and AUTH is as follows:

```
SHARE                       EXCH                   AUTH
---------------------------------------------------------------------------
A -> B: PKEB (KA)           A -> B: gx mod p       A -> B: FK0 (gy,gx, idA, idB)
B -> A: PKEA (KB)           B -> A: gy mod p       B -> A: FK0 (gx,gy, idB, idA)
K0 = H (KA, KB)
```

The EXCH -phase is used to exchange DH exponents. The authentication of this DH exchange is complished in a AUTH phase, which uses the shared key K0 from SHARE to autenticate DH exponents. The combination of the EXCH and AUTH phases provides the protocol with the strong perfect forward secrecy (PFS). FK0 represents a pseudorandom function using key K0 and that provides the functionality of a message authentication.

For the sake of communications efficiency, the above phases can be combined unto three messages as described below:

```
A
            PKEB ( idA , KA ), gx
    ------------------------------------------------->B
                                                          K0 = H (KA,KB )
            PKEA ( KB ), gy , FK0 (gx, gy, idB, idA)
    <-------------------------------------------------
K0 = H (KA, KB )
            FK0 (gy, gx, idA, idB)
    ------------------------------------------------->
            SK := H (gxy mod p )
```

Some variations of this basic protocol can be found in [19].

8. Conclusions

From the users point of view, the IPv6 security mechanism including key management protocols will have a lot of flexibility and alternatives to choose from. Users are not tied to any specific implementation but they can change an applied method / implementation when their needs change or for other reasons. It seems obvious that the forthcoming key management protocol will be a Photuris-like protocol, and propably Photuris itself. It has the previously mentioned advantages, the clear theoretical basis and its advantages are quite well approved.

References

[1]
    T. Aalto. IPv6 Authentication Header and Encapsulated Security Payload, Seminar Presentation, Helsinki University of Technology, May 1996

[2]  A. Aziz, T. Markson, H. Prafullchandra.*Certificate Discovery Protocol*, draft-ietf-ipsec-cdp-00.txt, Dec 1995

[3]  A. Aziz, T. Markson, H. Prafullchandra. *Simple Key-Management For Internet Protocols (SKIP)*, draft-ietf-ipsec-skip-06.txt, Dec 1995

[4]  A. Aziz, T. Markson, H. Prafullchandra. *SKIP Algorithm Discovery Protocol*, Internet Draft, draft-ietf-ipsec-skip-adp-00.txt, Dec 1995

[5]  A. Aziz, T. Markson, H. Prafullchandra. *X.509 Encoding of Diffie-Hellman Public Values*, Internet Draft, draft-ietf-ipsec-x509-00.txt, Dec 1995

[6]  Randall Atkinson. *IPv6 Authentication Header*, RFC 1826, Aug 1995.

[7]  Randall Atkinson. *IPv6 Encapsulating Security Payload*, RFC 1827, Aug 1995

[8]  Randall Atkinson. *Security Architectute for the Internet Protocol*, Internet Draft, RFC 1825, Aug 1995

[9]  D. Atkins, W. Stallings, P. Zimmerman. *PGP Message Exchange Formats*, draft-atkins-pgpformats-01.txt Work In Progres, Jul 1995

[10]  S. O. Bradner, A. Mankin. *IPng, Internet protocol next generation*, Addison-Wesley 1996

[11]  S. Deering, S. Hinden. *Internet Protocol, Version 6 (IPv6) Specification*, RFC 1883, Dec 1995

[12]  W. Diffie, M. Hellman, *New Directions in Cryptography*, IEEE Transactions on Information Theory, Vol. IT-22, No. 6, Nov 1976, pp. 644-654.

[13]  W. Diffie, M.Wiener, P. Van Oorschot. *Authentication and Authenticated Key Exchanges*, Designs, Codes, and Cryptography, 2, 107-125, Kluwer Academic Publishers, 1992.

[14]  D. Eastlake , C. Kaufman. *Domain Name System Protocol Security Extensions*, draft-ietf-dnssec-secext-09.txt, Jan 1996

[15]  C. Huitema. *IPv6: The New Internet Protocol*, Prentice Hall, 1996

[16]  Arto Karila. *Open Systems Security - an Architectural Framework* , Doctoral Dissertation, Helsinki University of Technology, Espoo 1991

[17]  P. Karn, Qualcomm, W. A. Simpson, Daydreamer. *The Photuris Session Key Management Protocol*, draft-ietf-ipsec-photuris-09.txt, Jan 1996

[18]  J. Kohl, B. Neuman. *The Kerberos Network Authentication Service (V5)*, RFC-1510, DDN Network Information Center, 10 Sep 1993, RFC 1510

[19]

[20] H. Krawczyk. *SKEME: A Versatile Secure Key Exchange Mechanism for Internet*, Proceedings, Symposium on Network and Distributed System Security, Feb 22-23,1996, San Diego, California

[21] D. Maughan, M. Schertler. *Internet Security Association and Key management Protocol (ISAKMP)*, draft-ietf-ipsec-isakmp-04.txt, Nov 1995

[22] R. M. Needham, M. D. Schroeder. *Using Encryption for Authentication in Large Networks of Computers*, Communications of the ACM, Vol. 21, No. 12, December 1978, pp. 993-999.

[23] R. M. Needham, M. D. Schroeder. *Authentication Revisted*, ACM Operating Systems Review, Vol. 21, No. 1., 1981.

[24] H. K. Orman. *The Oakley Key Determination Protocol*, Work in Progress, draft-ietf-ipsec-oakley-00.txt, University of Arizona, Feb 1996

[25] R. Rivest. *The MD5 Message-Digest Algorithm*, RFC 1321, Apr 1992

[26] Bruce Schneier. *Applied Cryptography, second edition, Protocols, Algorithms and Source Code in C*, John Wiley & Sons, Inc, 1995

W. Simpson. *Photuris Extensions Internet Draft* draft-ietf-ipsec-photuris-ext-01.txt, Nov 1995

The invention claimed is:

1. A system for performing a transaction, comprising:
   a first storage to store first personally identifiable information for a first subscriber, the first personally identifiable information not including a certificate, where the first storage is managed by a first party;
   a second storage to store second personally identifiable information for a second subscriber, the second personally identifiable information not including a certificate;
   a server storing a first credential for the first subscriber and a second credential for the second subscriber, neither the first credential nor the second credential including a certificate, where the server is managed by a second party that is different from the first party and the first credential and the second credential each have a state;
   an authenticator to authenticate the first subscriber using the first credential and the second subscriber using the second credential; and
   a receipt generator to generate a receipt that identifies the first subscriber and the second subscriber without providing the personally identifiable information about the first subscriber and the second subscriber.

2. A system according to claim 1, wherein the server stores a first list of combinations of devices and locations recognized by the server for authenticating the first subscriber and a second list of combinations of devices and locations recognized by the server for authenticating the second subscriber.

3. A system according to claim 1, wherein the authenticator supports out-of-band authentication of the first subscriber and the second subscriber.

4. A system according to claim 3, further comprising a manual out-of-band authenticator to manually authenticate the first subscriber using the first credential and the second subscriber using the second credential.

5. A system according to claim 1, further comprising a state setter to change the states of the first credential and the second credential.

6. A system according to claim 5, wherein the state setter is operative to change the state of the first credential to disable the first credential responsive to a request by the first subscriber.

7. A system according to claim 6, wherein the state setter is operative to change the state of the first credential to enable the first credential responsive to a request by the first subscriber.

8. A system according to claim 5, wherein the state setter is operative to set the states of the first credential and the second credential to "in use" after the first subscriber and the second subscriber are authenticated by the authenticator.

9. A system according to claim 5, wherein the state setter is operative to set the states of the first credential and the second credential to "not in use" after the transaction is completed.

10. A system according to claim 5, wherein the authenticator is operative to verify that the state of the first credential is "not in use" and the state of the second credential is "not in use".

11. A system according to claim 1, wherein the first storage stores the first personally identifiable information as an encrypted data encrypted using a key.

12. A system according to claim 11, wherein:
    the first storage stores a first portion of the key; and
    the server stores a second portion of the key.

13. A system according to claim 12, wherein a trusted third party stores a third portion of the key, where the trust third party is different from both the first party and the second party.

14. A system according to claim 11, wherein the first storage includes:
    a receiver to receive at least the second portion of the key from the server;
    a key assembler to assemble the key from the first portion and the second portion;
    a decrypter to decrypt the encrypted data;
    a key generator to generate a new key based on the receipt and on other data;
    an encrypter to encrypt the decrypted data using the new key; and
    a transmitter to transmit the encrypted identity and the other data to a requester.

15. A system according to claim 14, wherein:
    the receiver is operative to receive a third portion of the key from a trusted third party; and
    the key assembler is operative to assemble the key from the first portion, the second portion, and the third portion.

16. A system according to claim 1, wherein the server includes the authenticator and the receipt generator.

17. A system according to claim 1, wherein the first storage includes the second storage.

18. A system according to claim 1, further comprising a third storage, the third storage including:
    a third data for the first subscriber, the third data encrypted using a key;
    a first portion of the key;
    a receiver to receive at least a second portion of the key from the server;
    a key assembler to assemble the key from the first portion and the second portion;
    a decrypter to decrypt the encrypted data;
    a key generator to generate a new key based on the receipt and on other data;
    an encrypter to encrypt the decrypted data using the new key; and
    a transmitter to transmit the encrypted identity and the other data to a requester.

19. The system of claim 1, wherein the receipt generator is operative to generate the receipt responsive to the transaction between the first subscriber and the second subscriber.

20. A system according to claim 4, wherein the manual out-of-band authenticator is operative to authenticate the first subscriber using the first credential and the second subscriber using the second credential by an human operator.

21. A method for a first subscriber and a second subscriber to perform a transaction using a server, comprising:
    registering the first subscriber;
    registering the second subscriber;
    receiving a first credential from the first subscriber, the first credential including a state and not including a certificate;
    receiving a second credential from the second subscriber, the second credential including a state and not including a certificate;
    authenticating the first subscriber using the first credential by the server;
    authenticating the second subscriber using the second credential by the server; and
    providing the first subscriber and the second subscriber with a receipt, the receipt identifying the first subscriber and the second subscriber without providing personally identifiable information about the first subscriber and the second subscriber.

22. A method according to claim 21, further comprising providing the first subscriber and the second subscriber with a communications channel.

23. A method according to claim 21, wherein authenticating the first subscriber includes verifying that the first credential is being provided from a device at a location, both the device and the location recognized by the server.

24. A method according to claim 23, wherein authenticating the first subscriber further includes:
performing an out-of-band authentication of the first subscriber if the device or location is not recognized by the server; and
automatically updating the server to recognize the device at the location for the first credential if the out-of-band authentication is successful.

25. A method according to claim 23, wherein authenticating the first subscriber further includes setting the state of the first credential to "in use".

26. A method according to claim 25, further comprising setting the state of the first credential to "not in use" after a period of time.

27. A method according to claim 25, further comprising setting the state of the first credential to "not in use" responsive to completing the transaction.

28. A method according to claim 23, wherein authenticating the first subscriber further includes verifying that the state of the first credential is "not in use".

29. A method according to claim 21, wherein registering the first subscriber includes:
storing data for the first subscriber in a storage selected by the first subscriber;
encrypting the data stored in the storage using a key; and
dividing the key among at least the storage and the server.

30. A method according to claim 29, wherein dividing the key includes dividing the key among at least the storage, the server, and a trusted third party, where the storage is managed by a first party, the server is managed by a second party, and the first party, the second party, and the trusted third party are all different from each other.

31. A method according to claim 29, further comprising providing the part of the key stored at the server to the storage responsive to a request from the first subscriber.

32. A method according to claim 31, wherein providing the part of the key stored at the server includes transmitting the part of the key stored at the server in a second receipt.

33. A method according to claim 21, wherein providing the first subscriber and the second subscriber with a receipt includes providing at least one additional party to the transaction with the receipt.

34. A method according to claim 33, wherein providing at least one additional party to the transaction with the receipt includes providing at least one additional party to the transaction with the receipt by the server.

35. A method for releasing data stored in a storage encrypted by a key, comprising:
receiving a receipt of identity from a server;
receiving a first portion of the key from the server;
accessing a second portion of the key from the storage;
assembling the key from at least the first portion and the second portion;
decrypting the data;
generating a new key based in part on the receipt of identity from the server and in part on other data;
re-encrypting the data using the new key;
transmitting the re-encrypted data to a requester; and
transmitting the other data used in generating the new key to the requester.

36. A method according to claim 35, wherein:
receiving a receipt of identity includes receiving the receipt of identity from the server over a secure channel; and
receiving a first portion of the key includes receiving the first portion of the key from the server over the secure channel.

37. A method according to claim 35, wherein:
transmitting the re-encrypted data to a requester includes transmitting the re-encrypted data to the requester over a secure channel; and
transmitting the other data used in generating the new key includes transmitting the other data used in generating the new key to the requester over the secure channel.

38. A method according to claim 35, wherein:
the method further comprises receiving a third portion of the key from a trusted third party; and
assembling the key includes assembling the key from the first portion, the second portion, and the third portion.

* * * * *